United States Patent
Takeo et al.

(10) Patent No.: US 10,122,901 B2
(45) Date of Patent: Nov. 6, 2018

(54) CONTROL UNIT, IMAGING UNIT, AND METHOD OF CONTROLLING LIQUID-CRYSTAL LOW PASS FILTER

(71) Applicant: SONY CORPORATION, Tokyo (JP)

(72) Inventors: Akira Takeo, Saitama (JP); Tadayuki Hirano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/326,850

(22) PCT Filed: Jul. 23, 2015

(86) PCT No.: PCT/JP2015/070955
§ 371 (c)(1),
(2) Date: Jan. 17, 2017

(87) PCT Pub. No.: WO2016/021418
PCT Pub. Date: Feb. 11, 2016

(65) Prior Publication Data
US 2017/0208228 A1    Jul. 20, 2017

(30) Foreign Application Priority Data
Aug. 7, 2014 (JP) ................... 2014-161126

(51) Int. Cl.
*H04N 5/225* (2006.01)
*G02F 1/133* (2006.01)

(52) U.S. Cl.
CPC ....... *H04N 5/2254* (2013.01); *G02F 1/13318* (2013.01)

(58) Field of Classification Search
CPC ................... H04N 5/2254; G02F 1/13318
See application file for complete search history.

(56) References Cited

U.S. PATENT DOCUMENTS

2009/0169126 A1*  7/2009  Masuda ............ H01L 27/14621
                                                                        382/255

FOREIGN PATENT DOCUMENTS

| JP | 09-15535 A    | 1/1997 |
| JP | 2013-217971 A | 10/2013 |

OTHER PUBLICATIONS

International Search Report and Written Opinion of PCT Application No. PCT/JP2015/070955, dated Oct. 20, 2015, 5 pages of English Translation and 5 pages of ISRWO.

(Continued)

Primary Examiner — Twyler Haskins
Assistant Examiner — Fayez Bhuiyan
(74) Attorney, Agent, or Firm — Chip Law Group

(57) ABSTRACT

A control unit includes a controller controlling a polarization state of a liquid crystal layer of a liquid-crystal low pass filter to be any of a first polarization state, a second polarization state, and an intermediate polarization state between the first polarization state and the second polarization state. In output of a plurality of image data from an imaging element, the controller controls the polarization state of the liquid crystal layer to be the first polarization state or the second polarization state when first image data of the image data is outputted, and the controller controls the polarization state of the liquid crystal layer to be the intermediate polarization state when one or more of second and subsequent ones of the image data are outputted.

16 Claims, 33 Drawing Sheets

(56) References Cited

OTHER PUBLICATIONS

International Preliminary Report on Patentability of PCT Application No. PCT/JP2015/070955, dated Feb. 16, 2017, 7 pages of English Translation and 3 pages of IPRP.

* cited by examiner

[ FIG. 1 ]
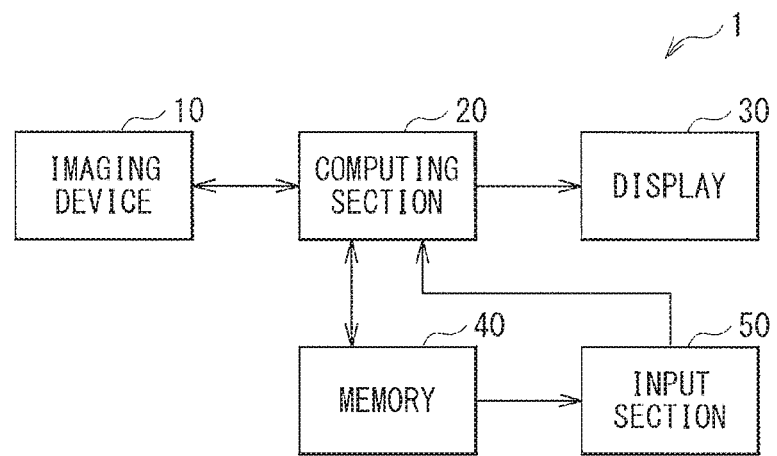
[ FIG. 2 ]
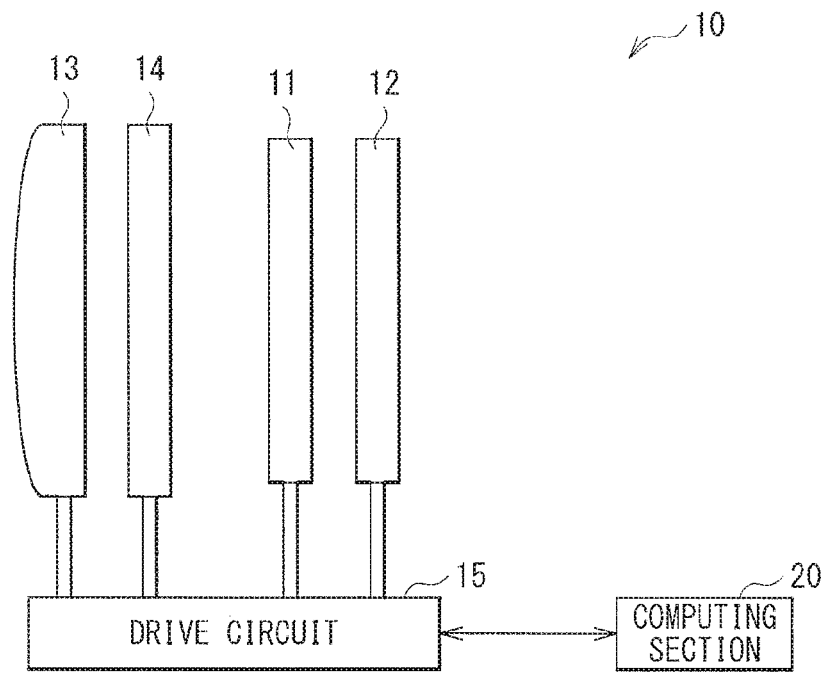

[FIG. 3]
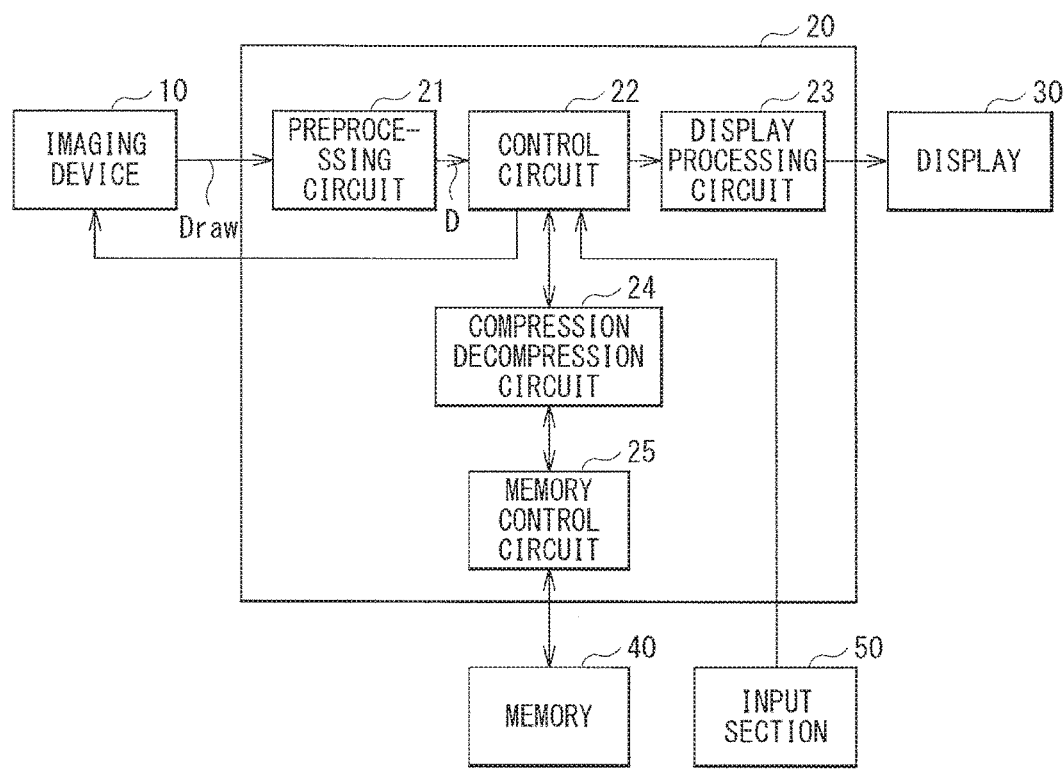

[FIG. 4]
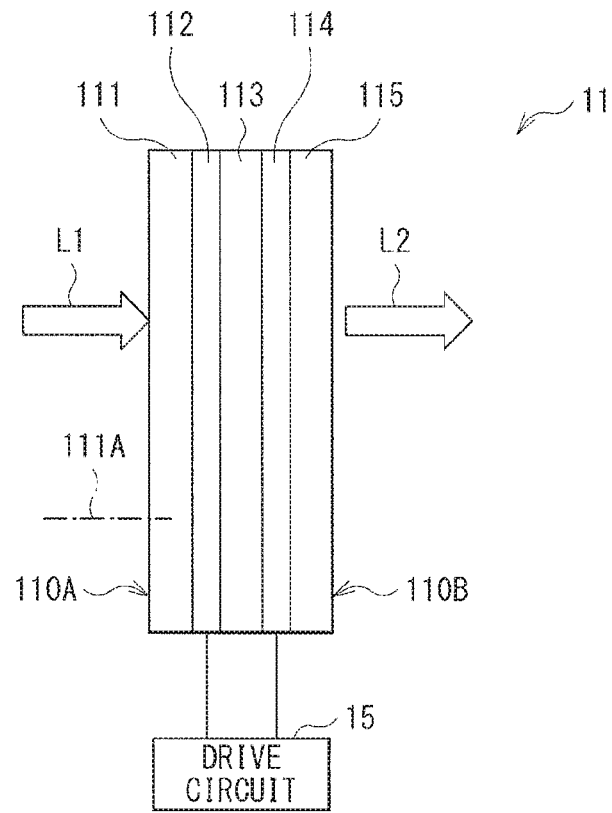
[FIG. 5]
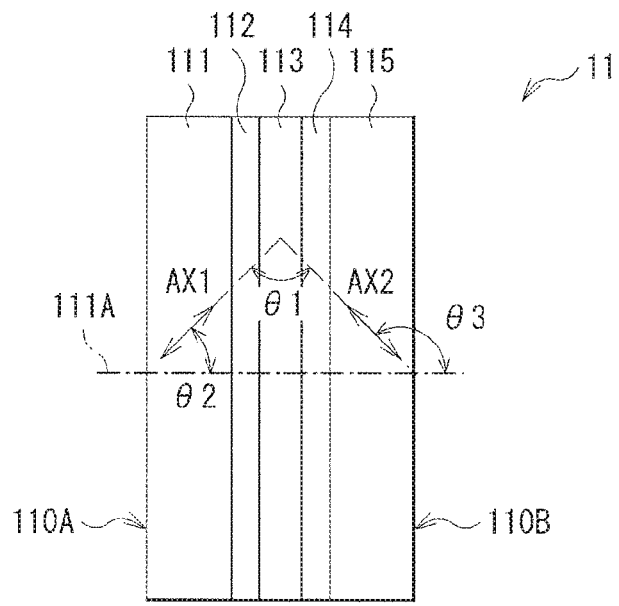

[FIG. 6A]
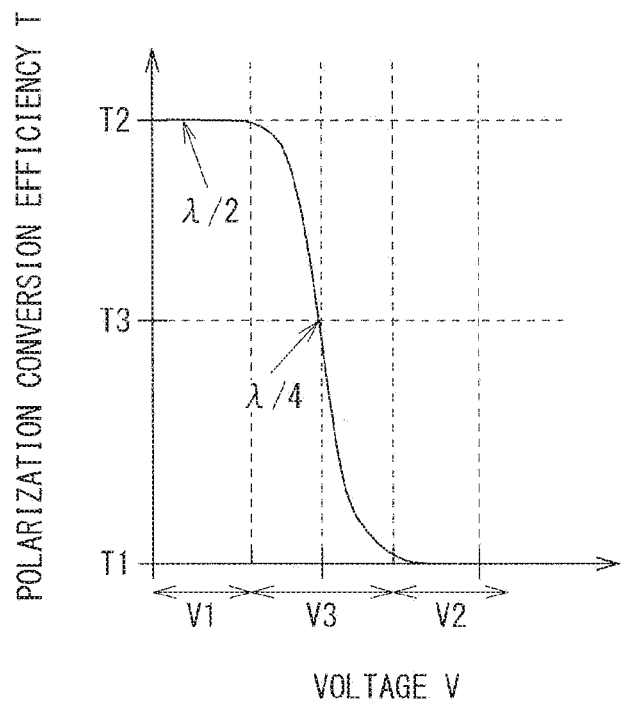
[FIG. 6B]
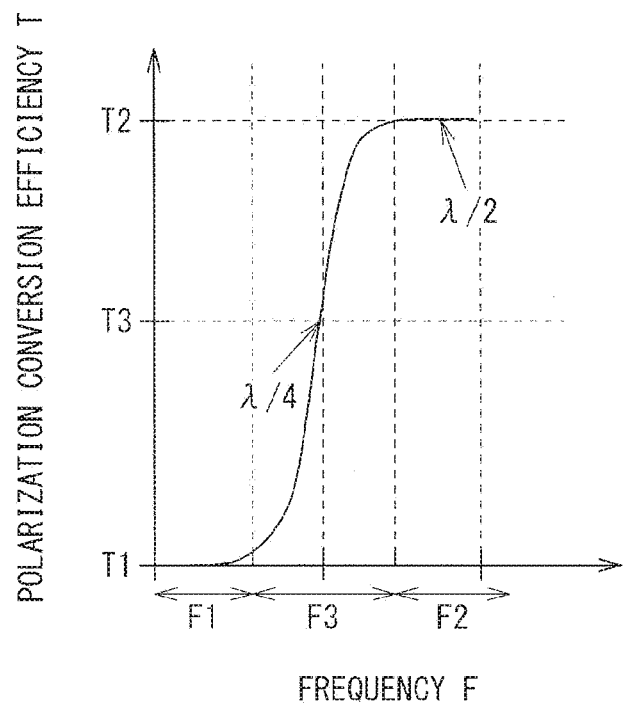

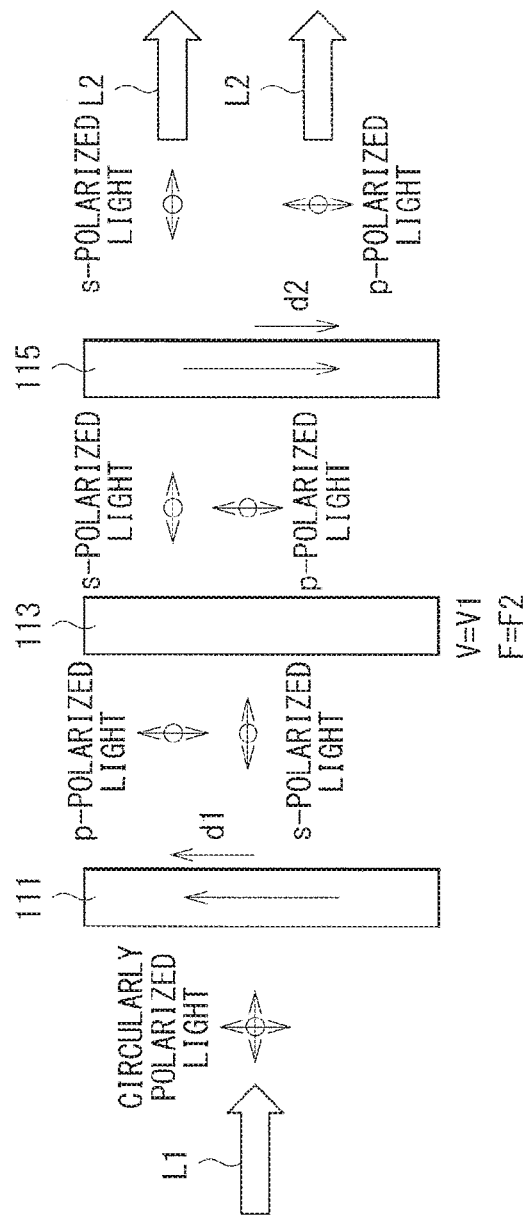

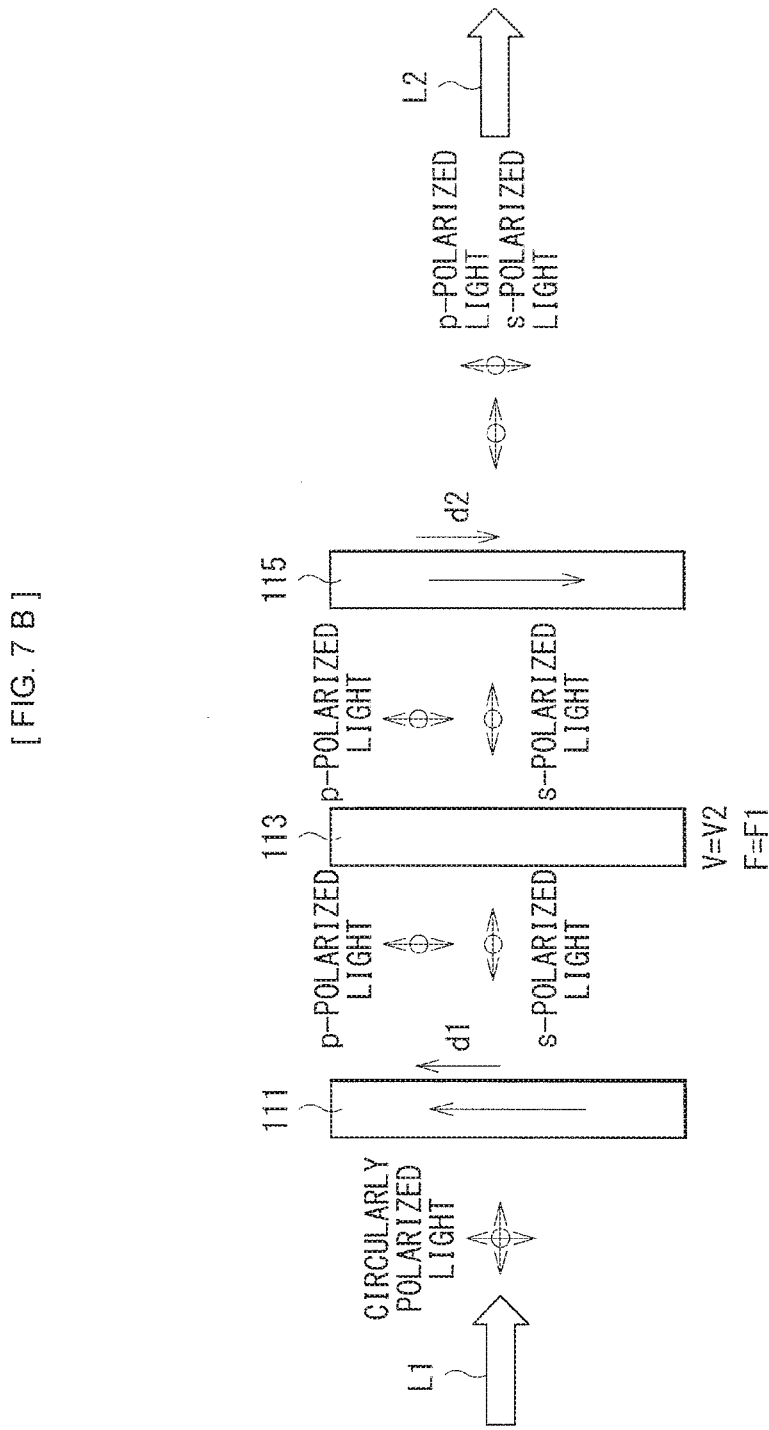

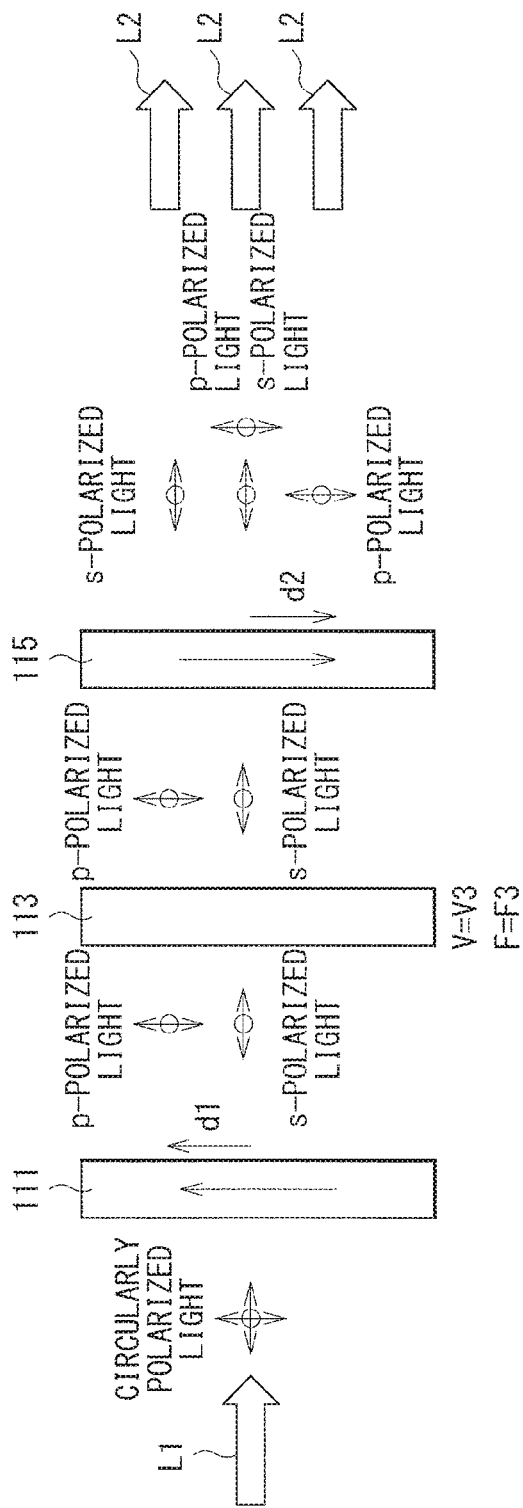

[ FIG. 8A ]
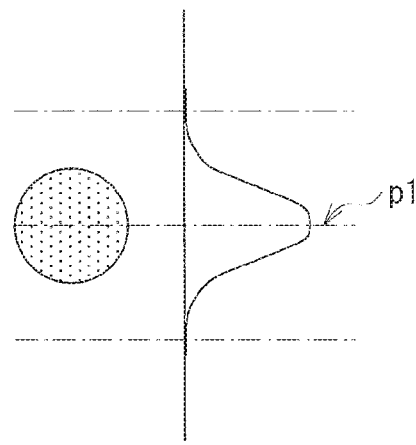
POINT-IMAGE
EXPANSION ON
IMAGE DATA
POINT-IMAGE
INTENSITY
DISTRIBUTION
[ FIG. 8B ]
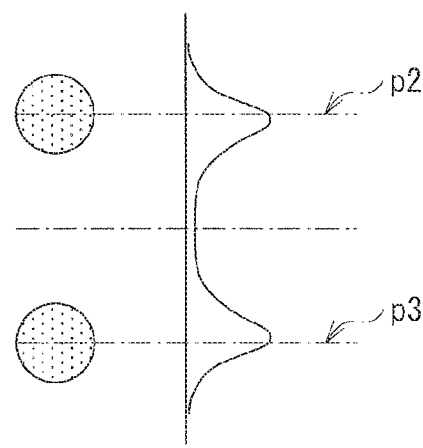
POINT-IMAGE
EXPANSION ON
IMAGE DATA
POINT-IMAGE
INTENSITY
DISTRIBUTION

[FIG. 8C]
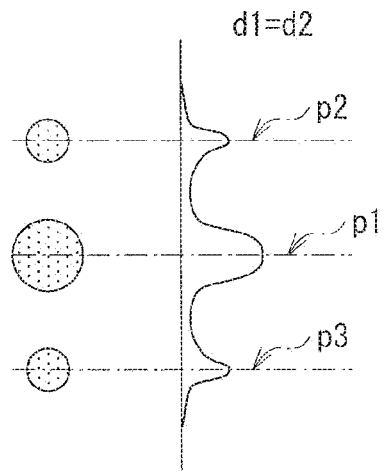
[FIG. 8D]
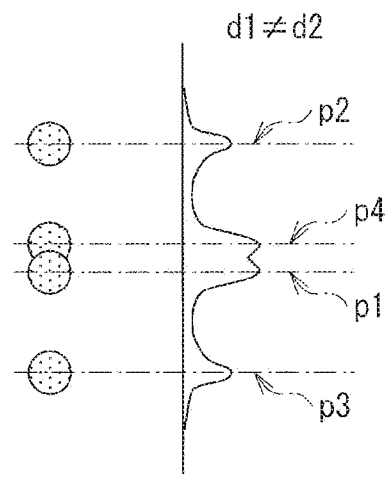

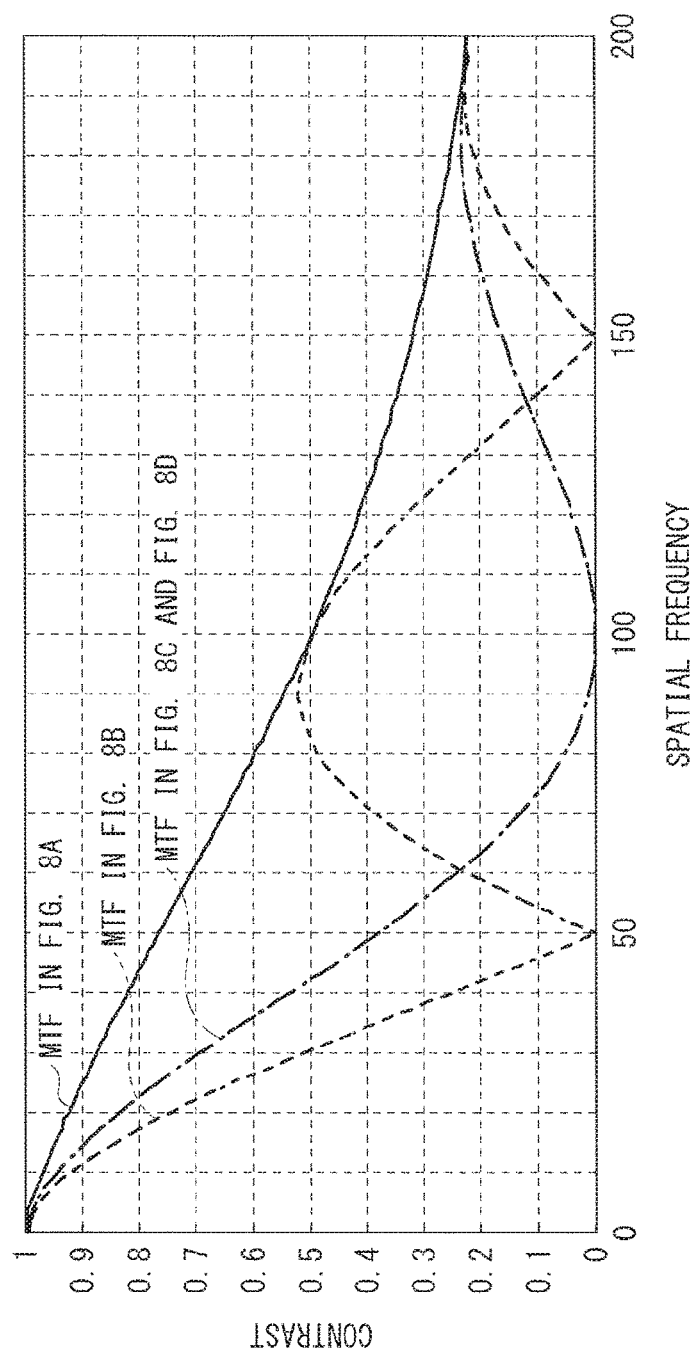
[FIG. 9]

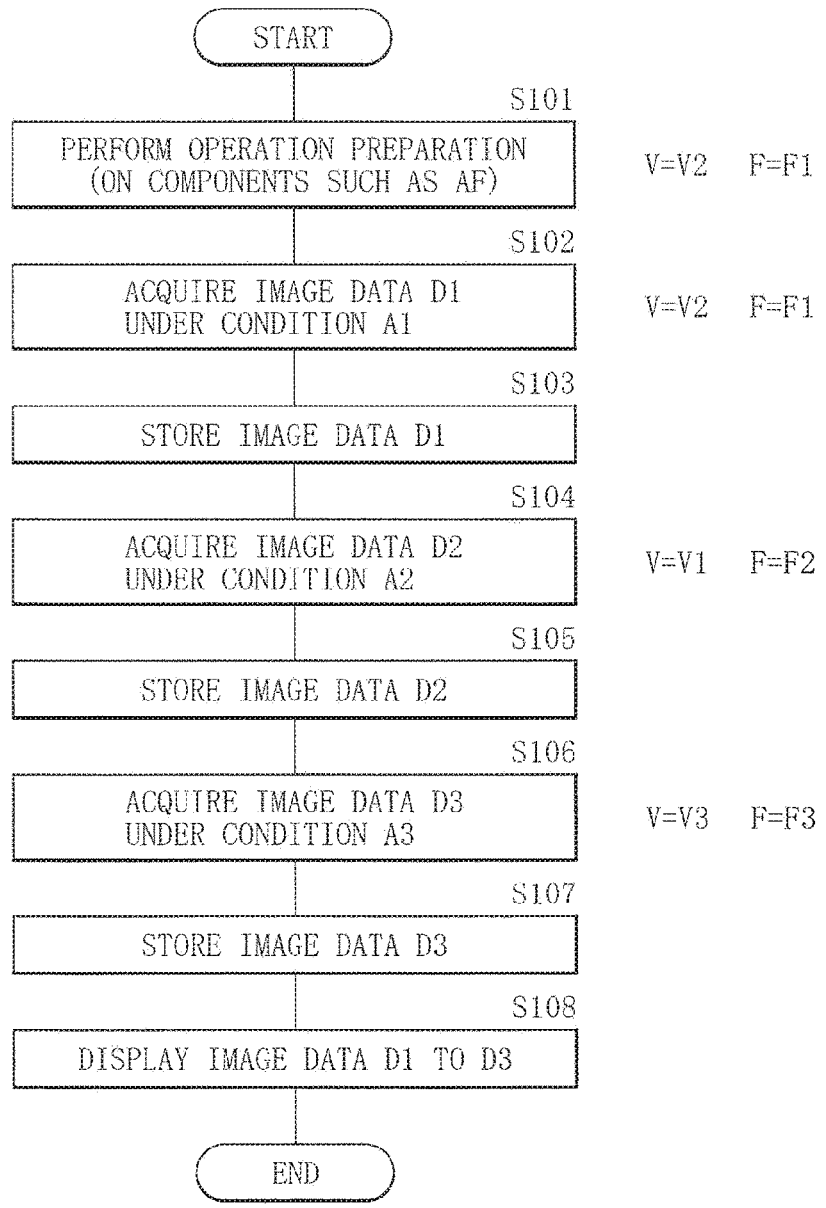
[ FIG. 10 ]

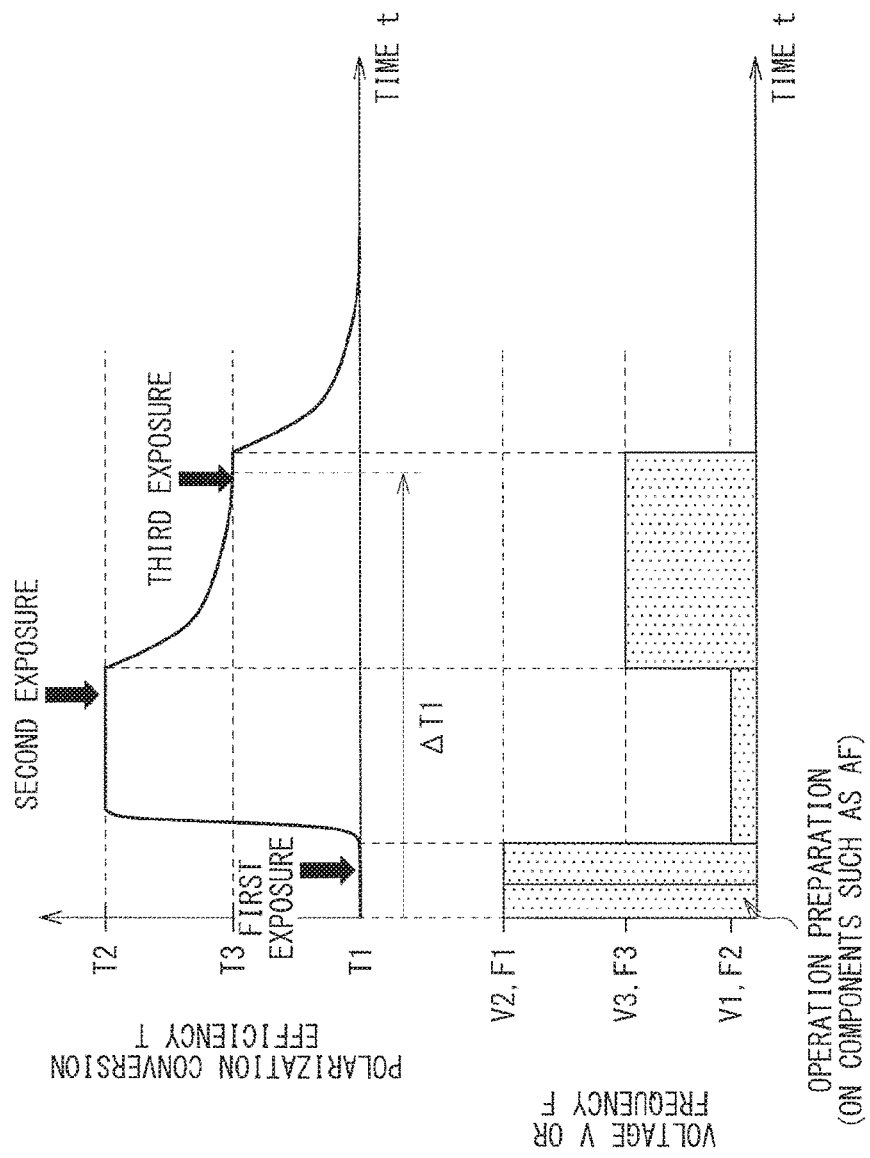
[ FIG. 11 ]

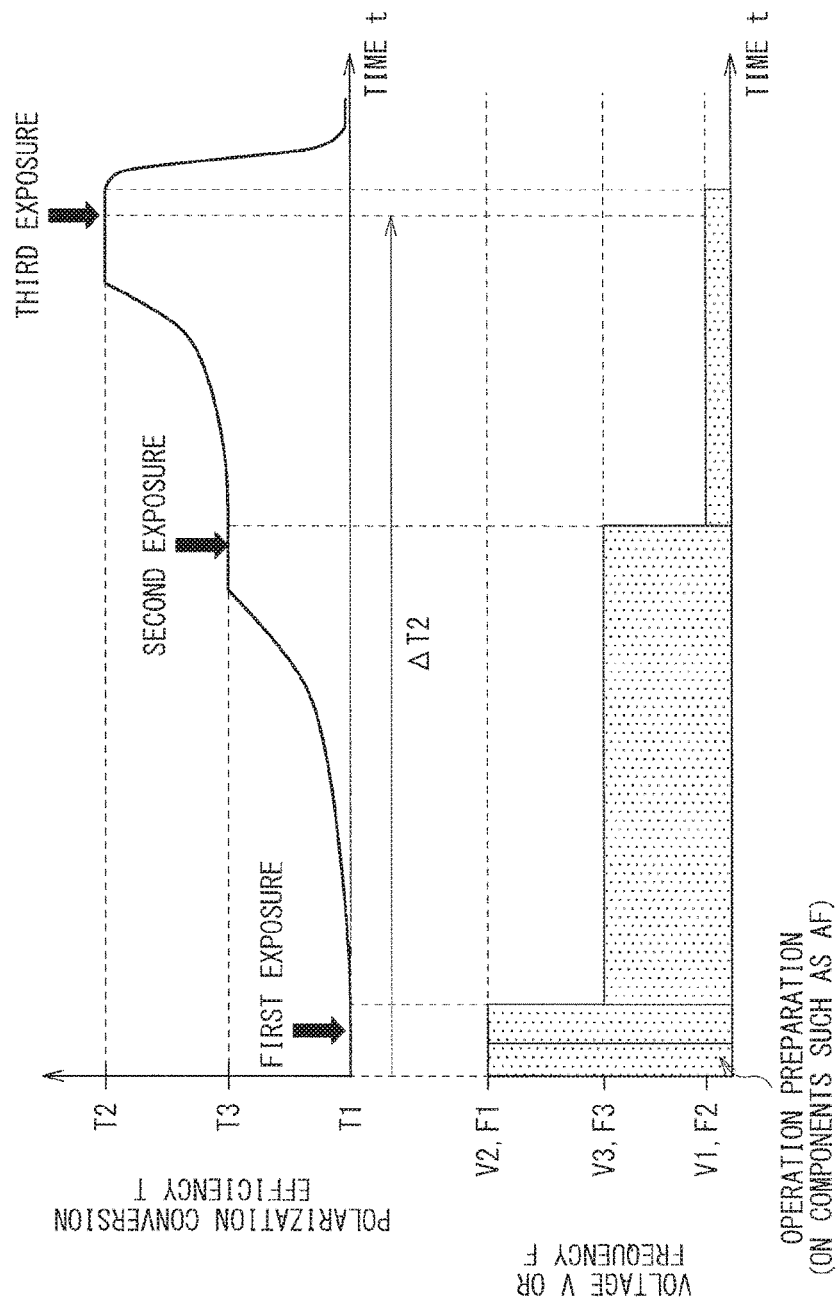
[FIG. 12]

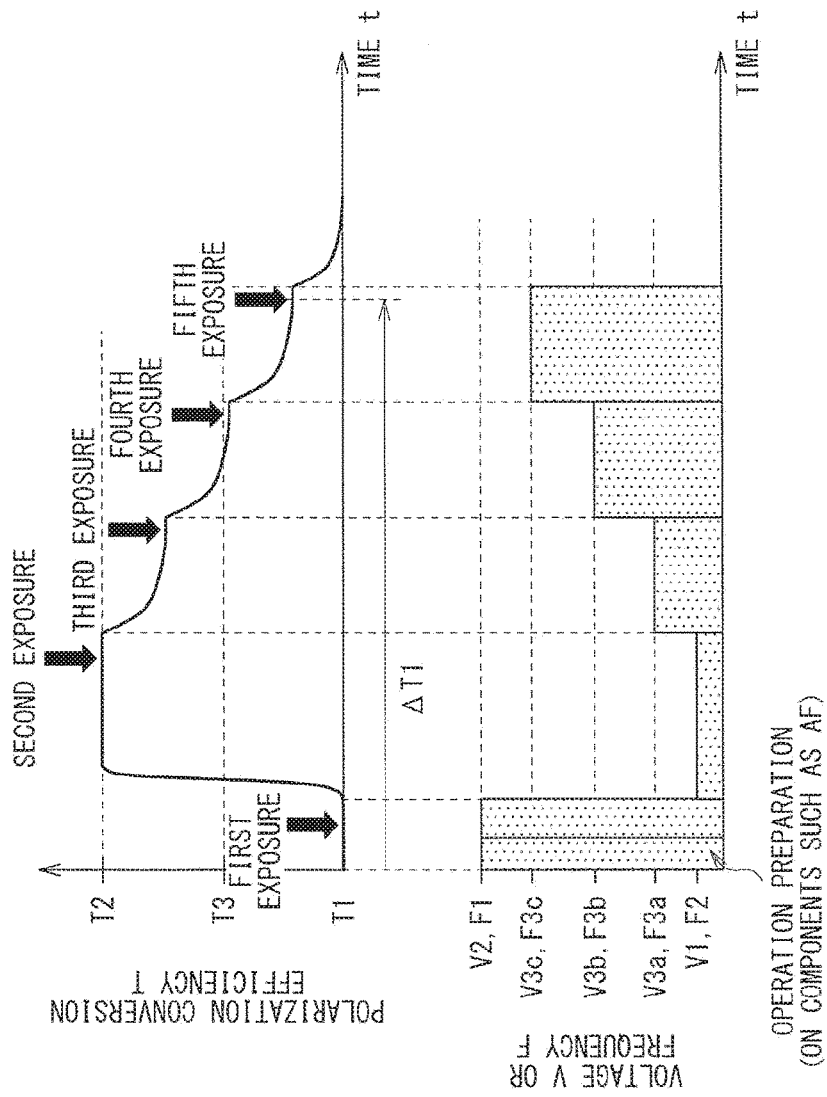
[FIG. 13]

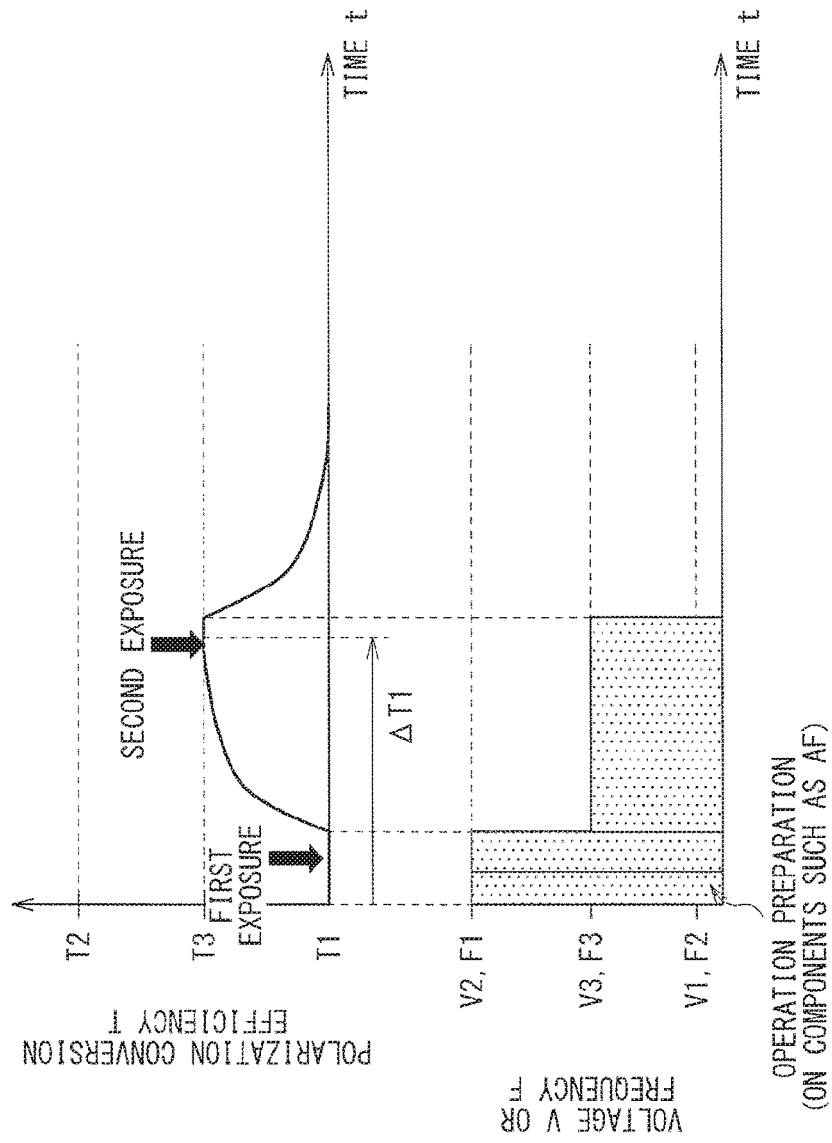
[FIG. 14]

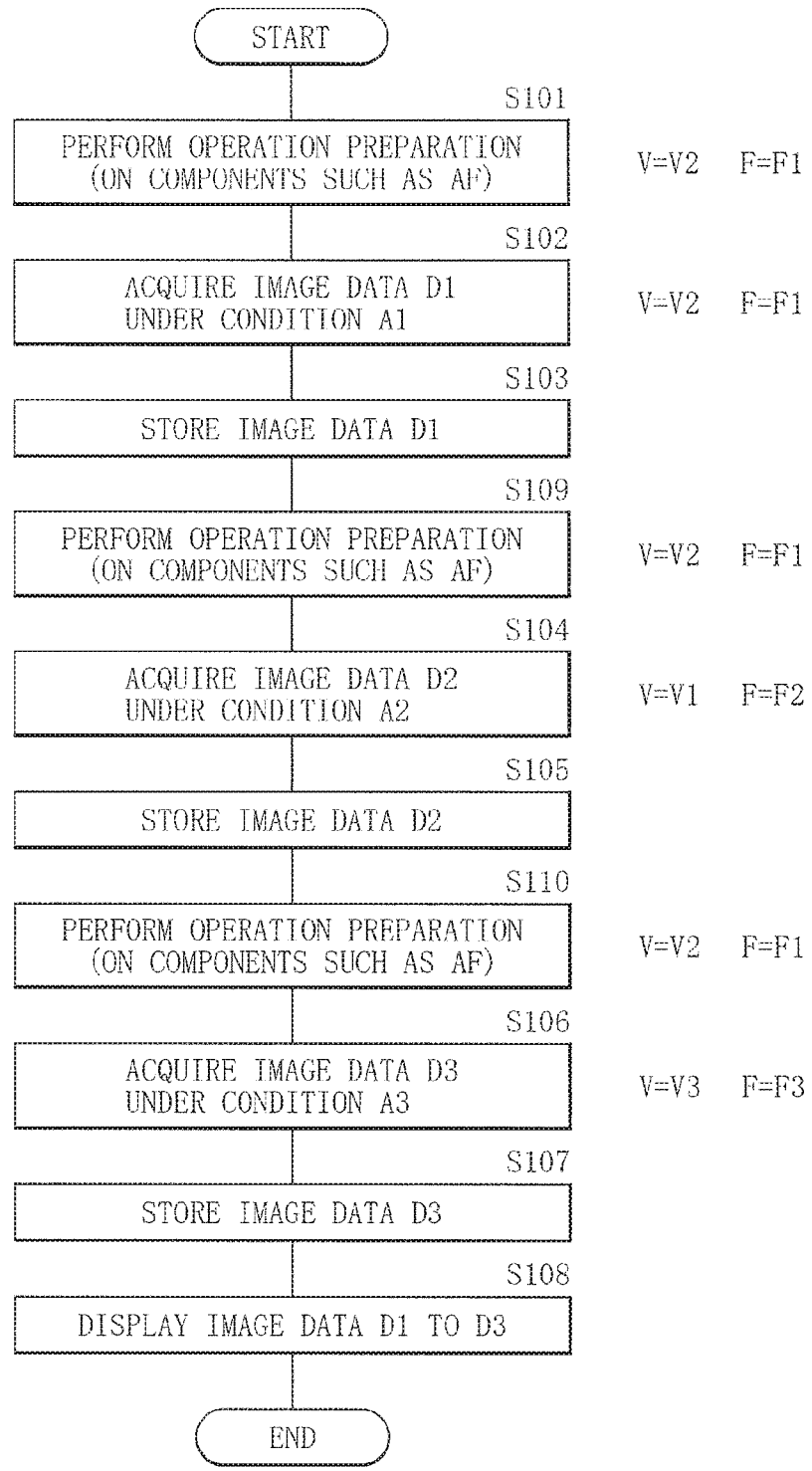
[ FIG. 15 ]

[ FIG. 16 ]
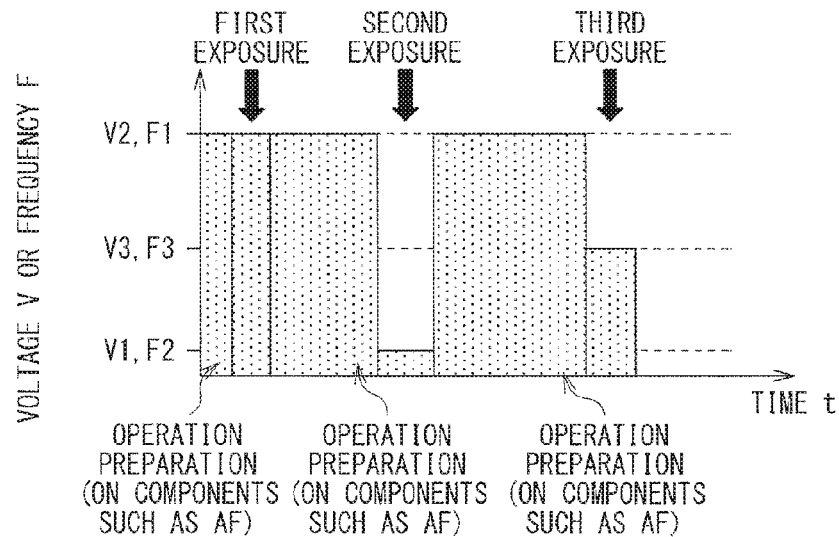
[ FIG. 17 ]
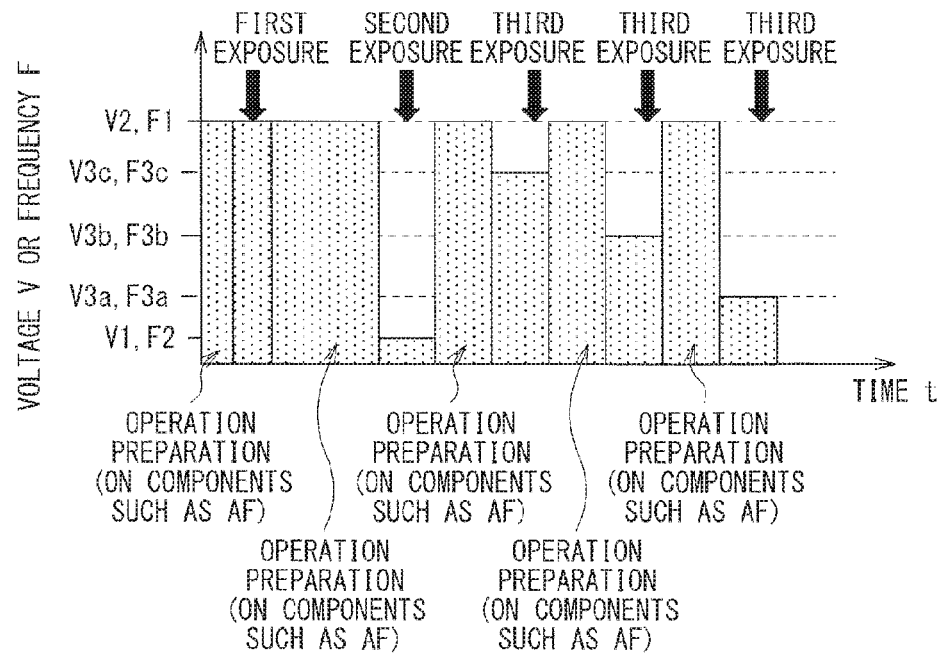

[ FIG. 18 ]
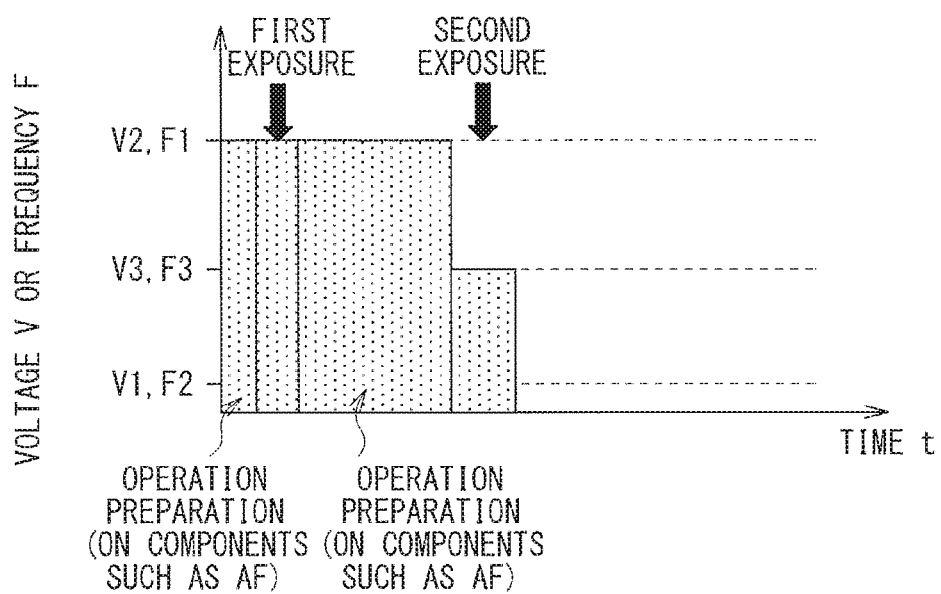
[ FIG. 19 ]
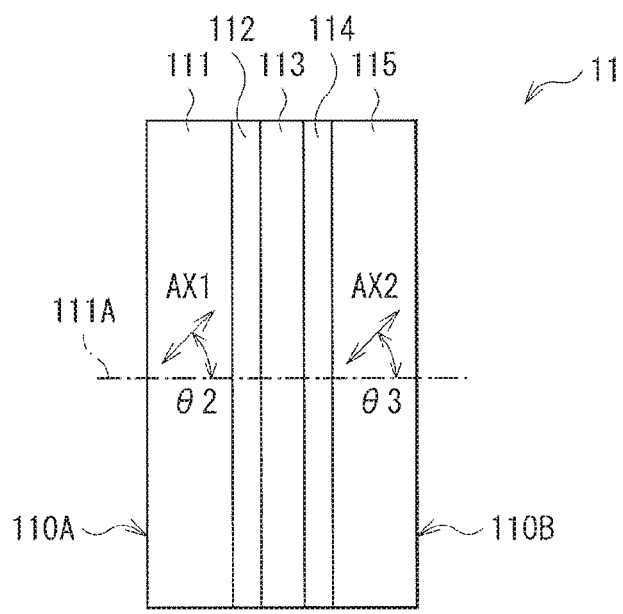

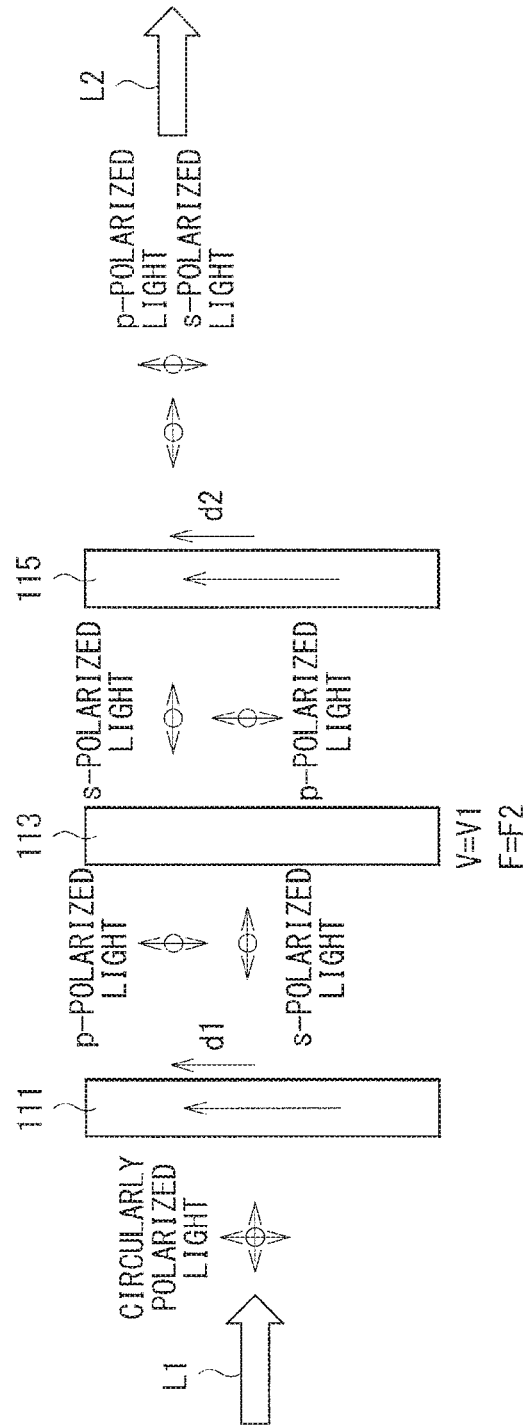

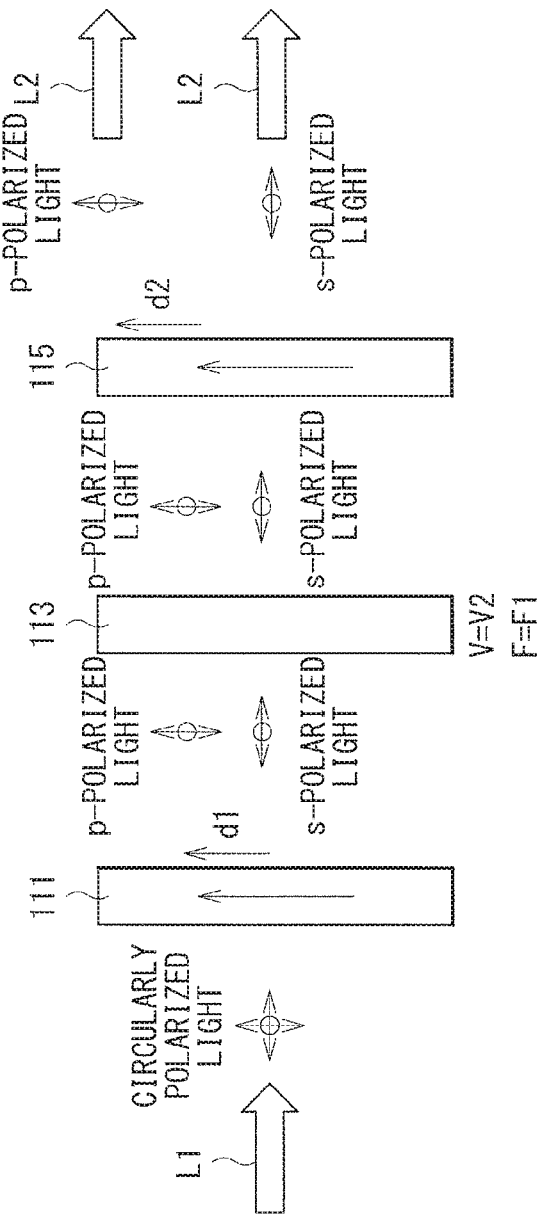
[FIG. 20B]

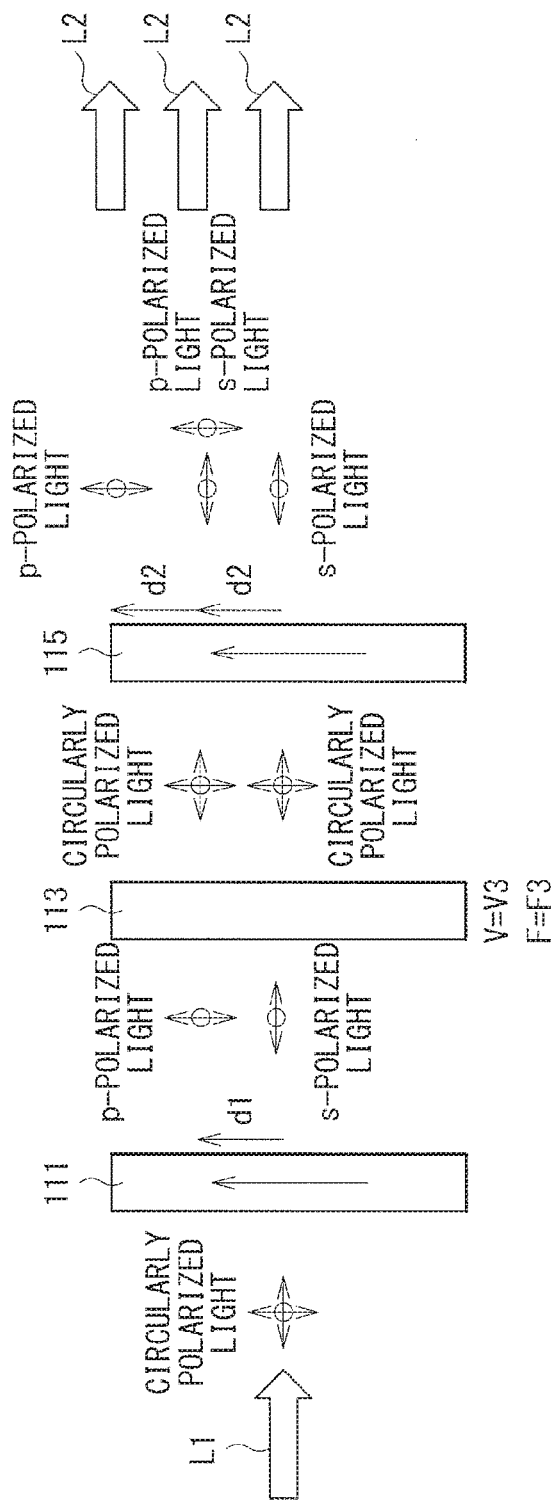

[ FIG. 21A ]
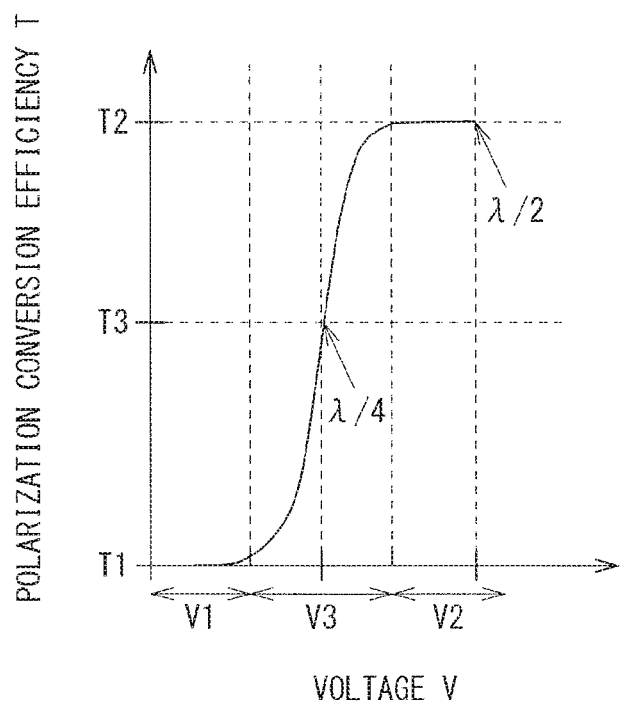
[ FIG. 21B ]
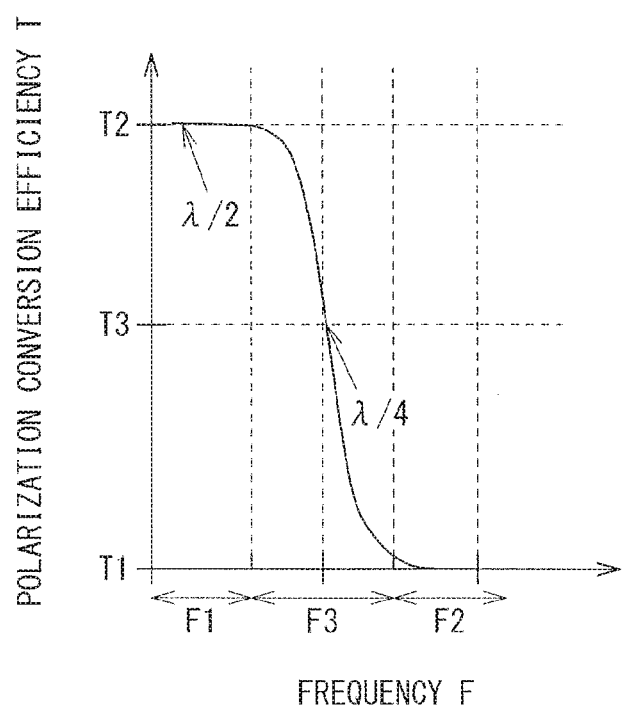

[ FIG. 22 ]
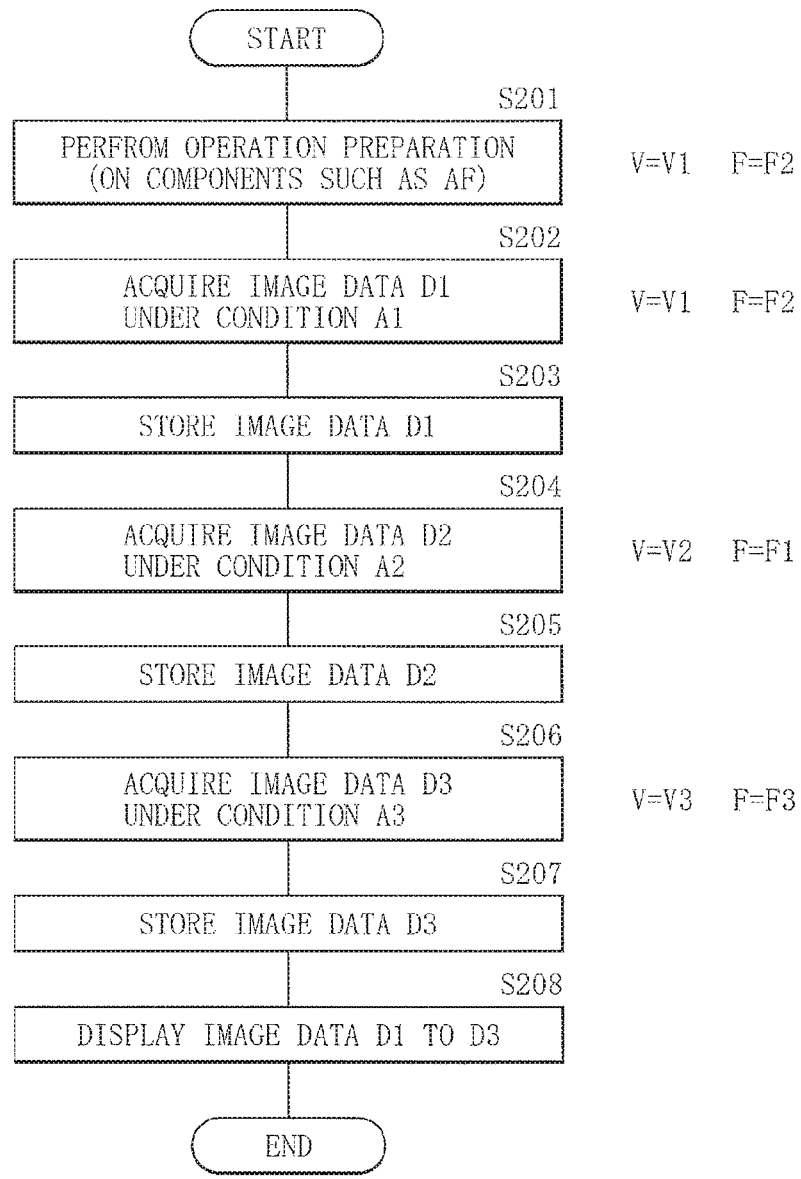

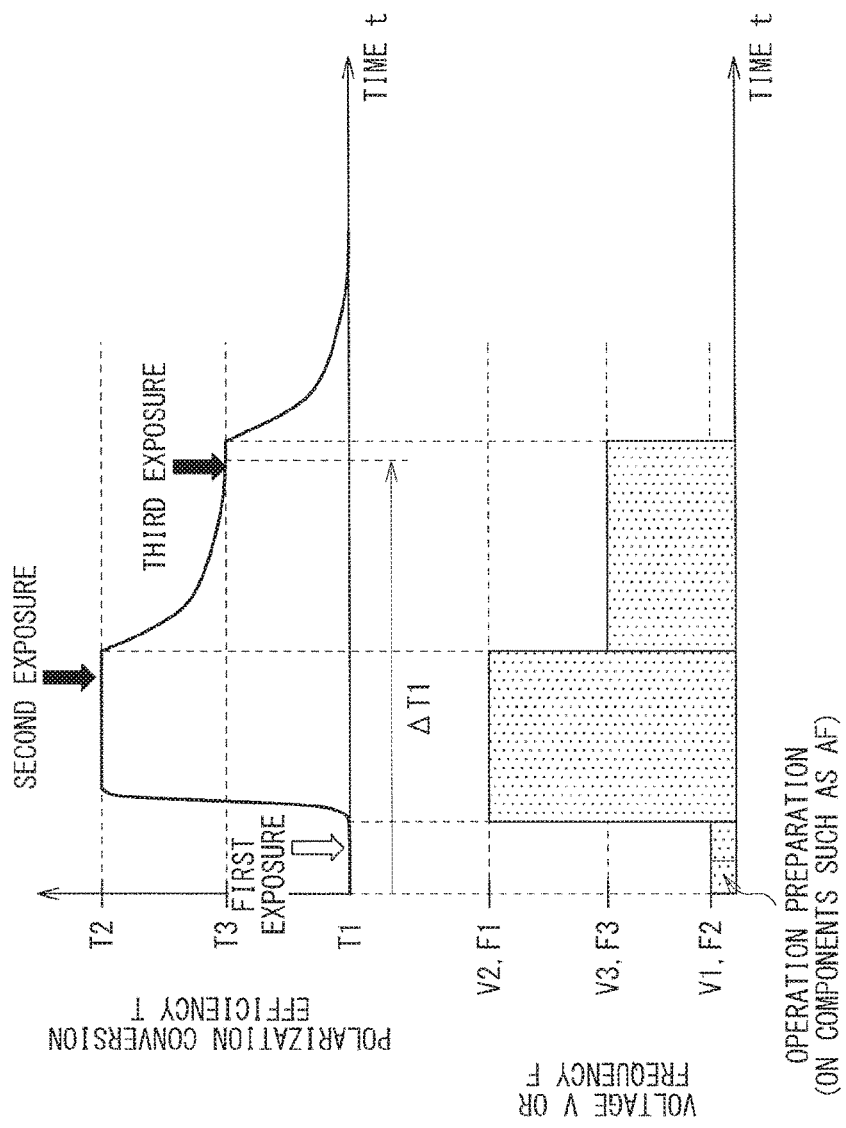
[FIG. 23]

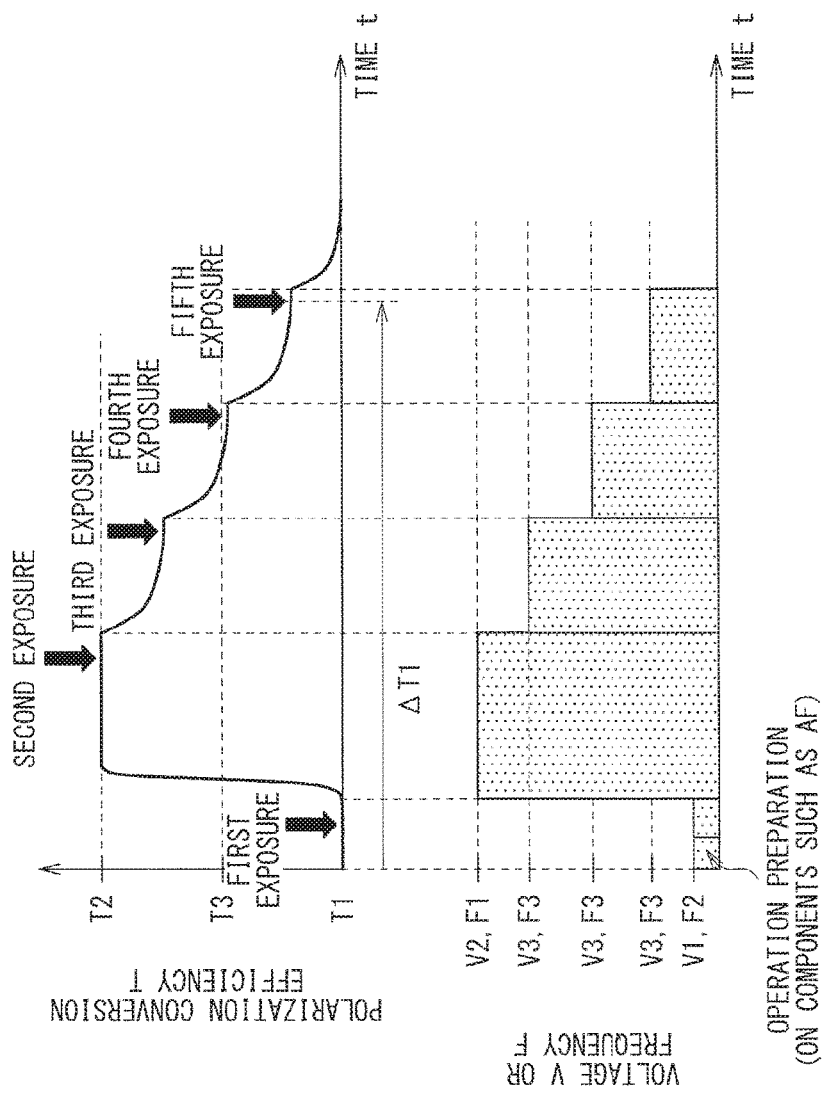
[FIG. 24]

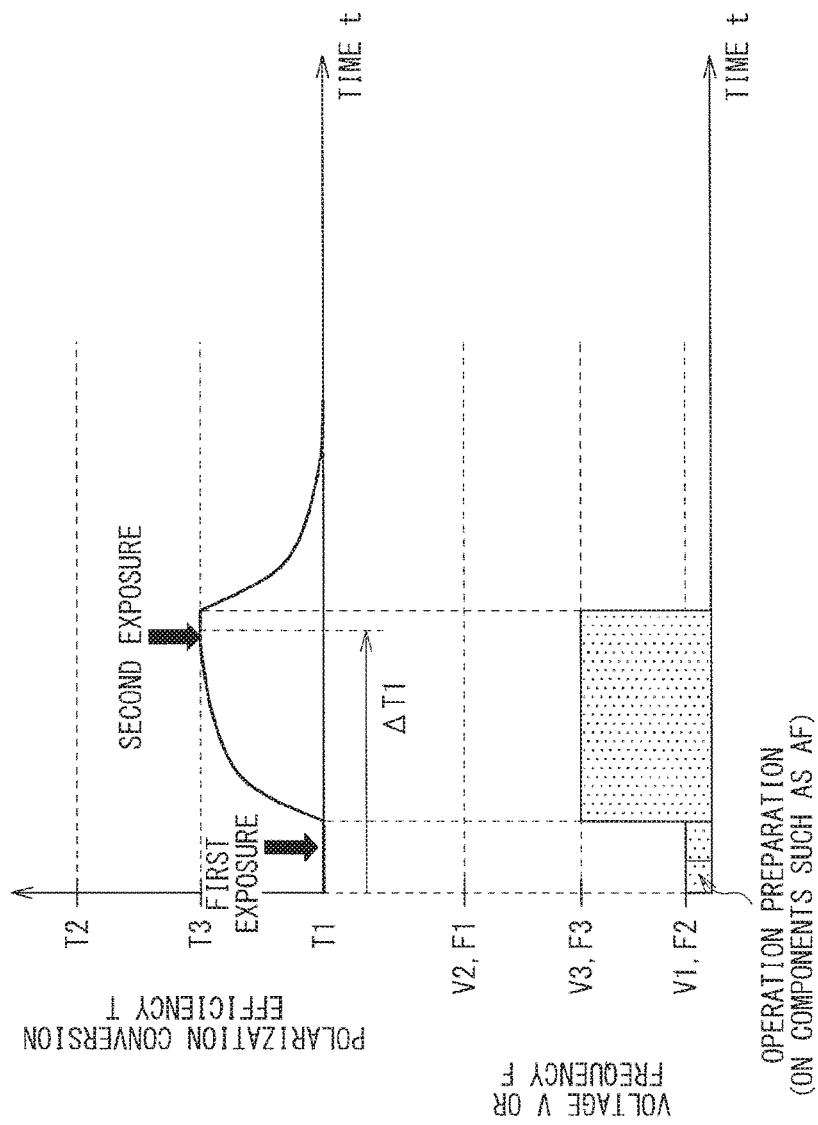
[FIG. 25]

[ FIG. 26 ]
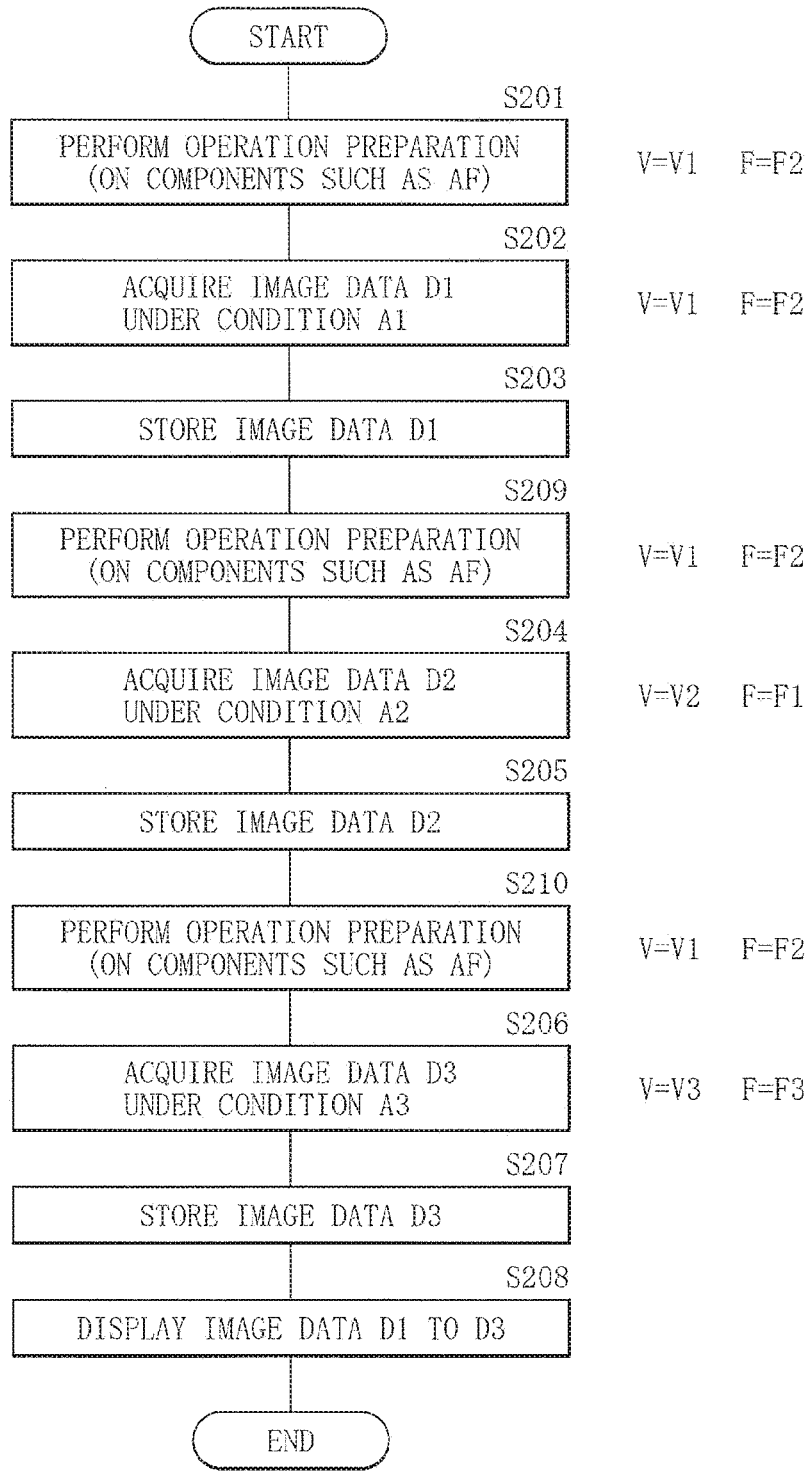

[ FIG. 27 ]
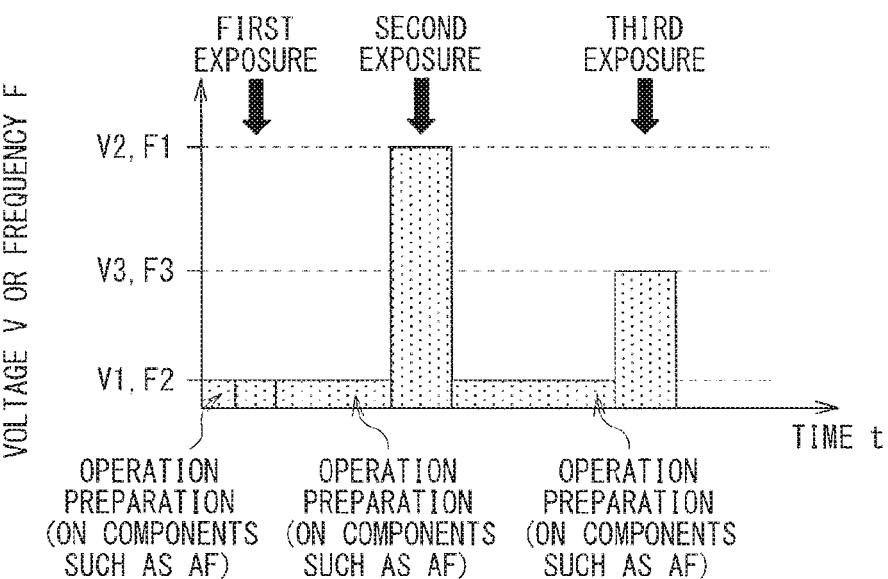
[ FIG. 28 ]
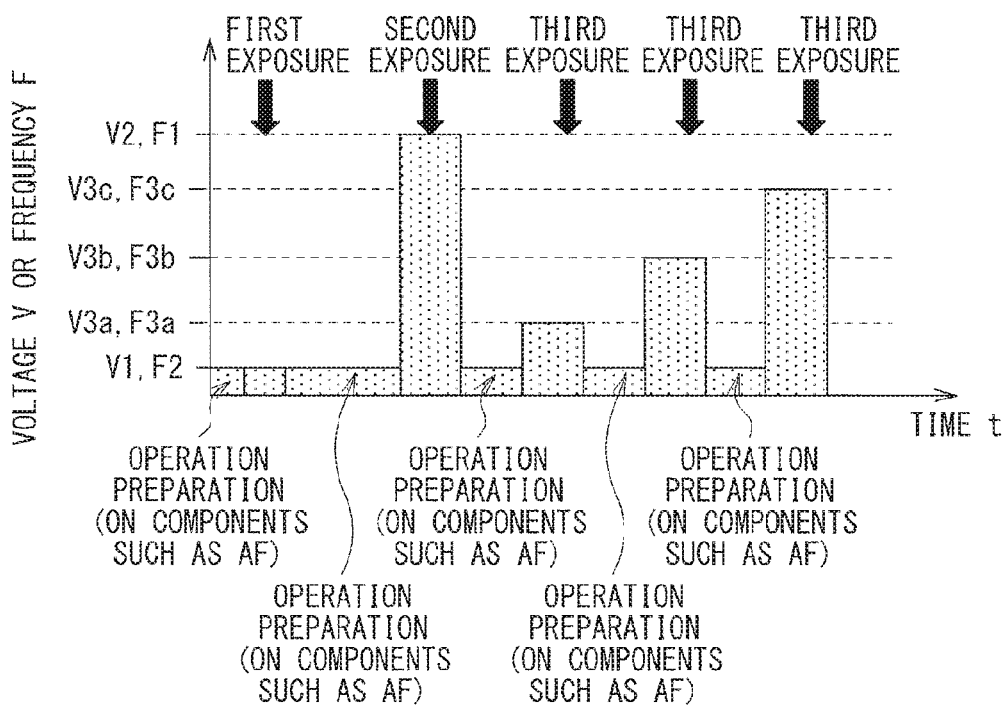

[ FIG. 29 ]
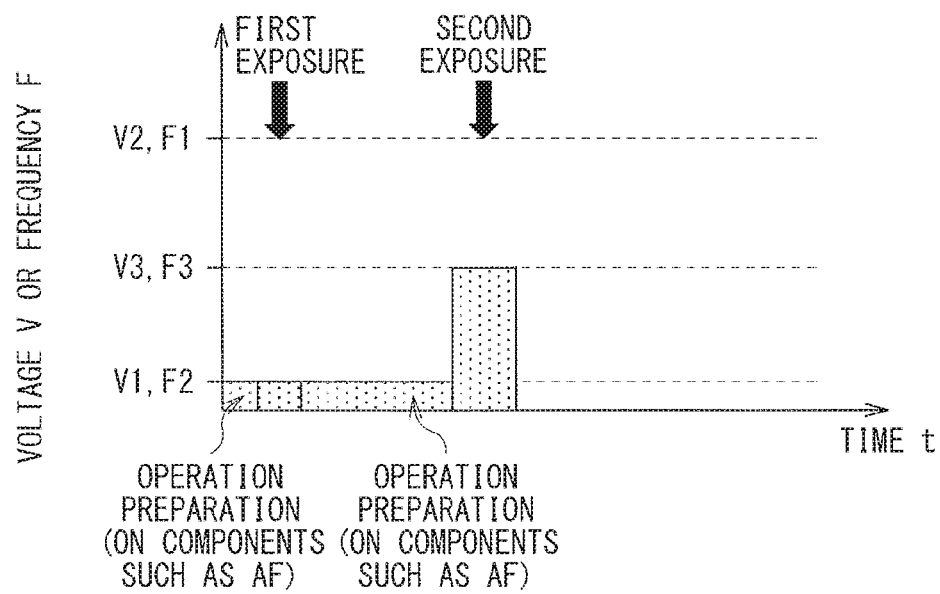
[ FIG. 30 ]
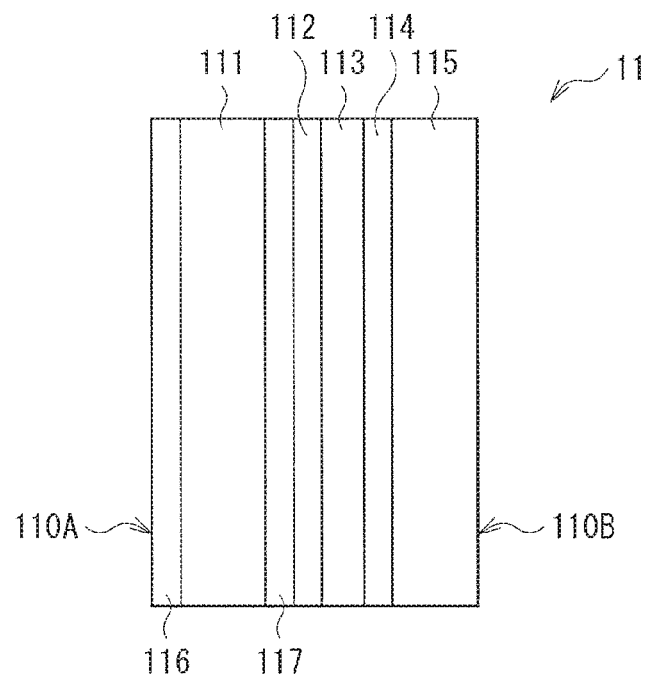

[ FIG. 31 ]
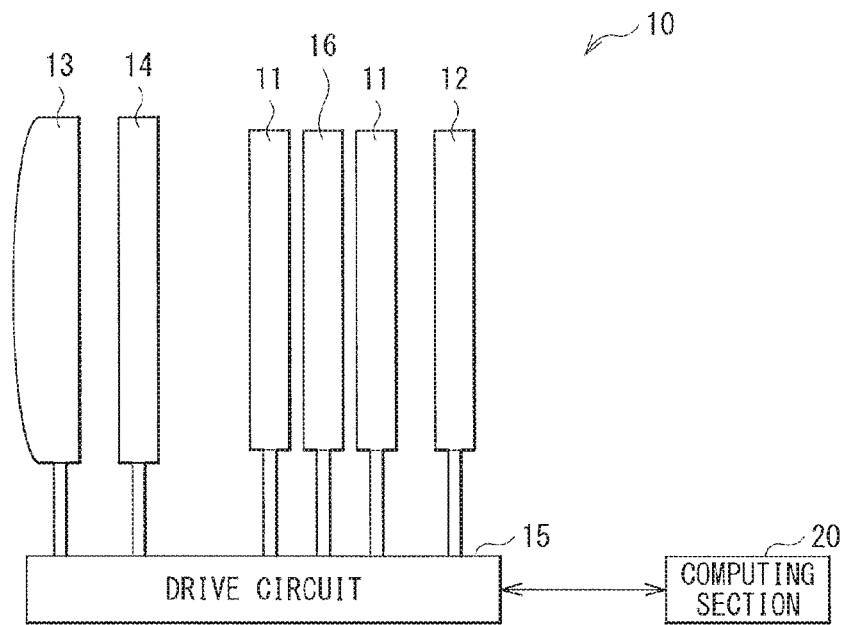
[ FIG. 32 ]
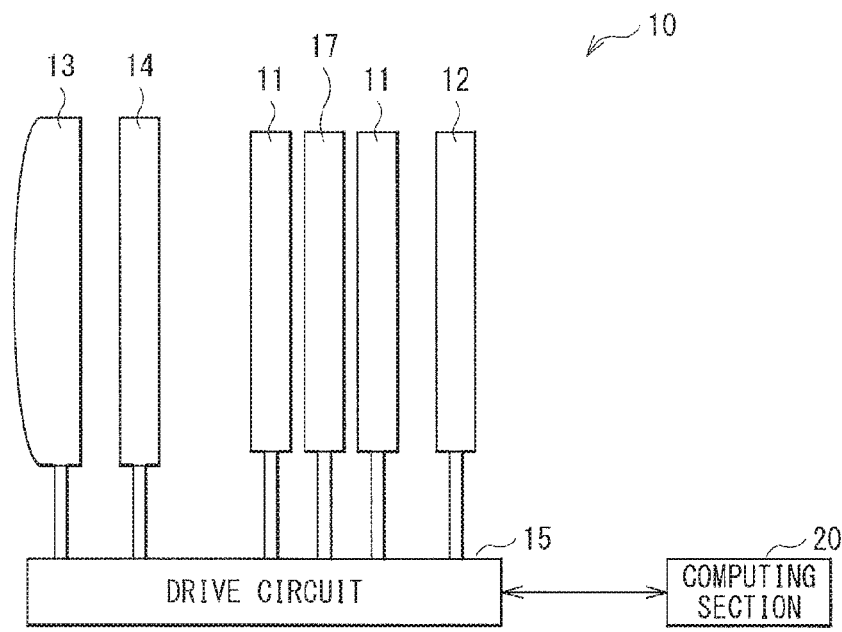

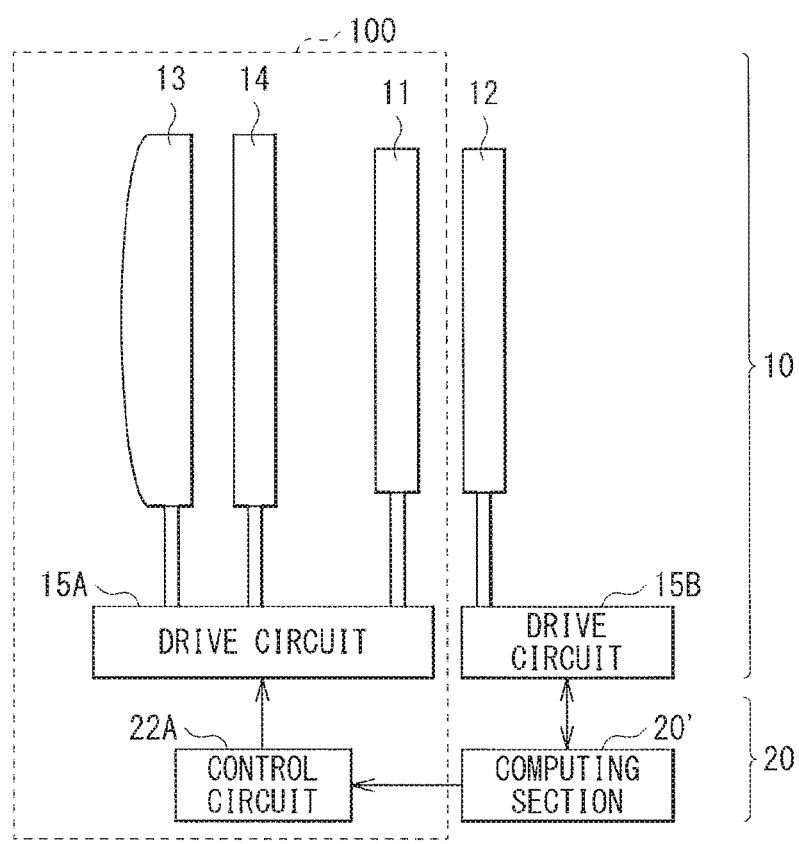
[ FIG. 33 ]

[ FIG. 34 ]
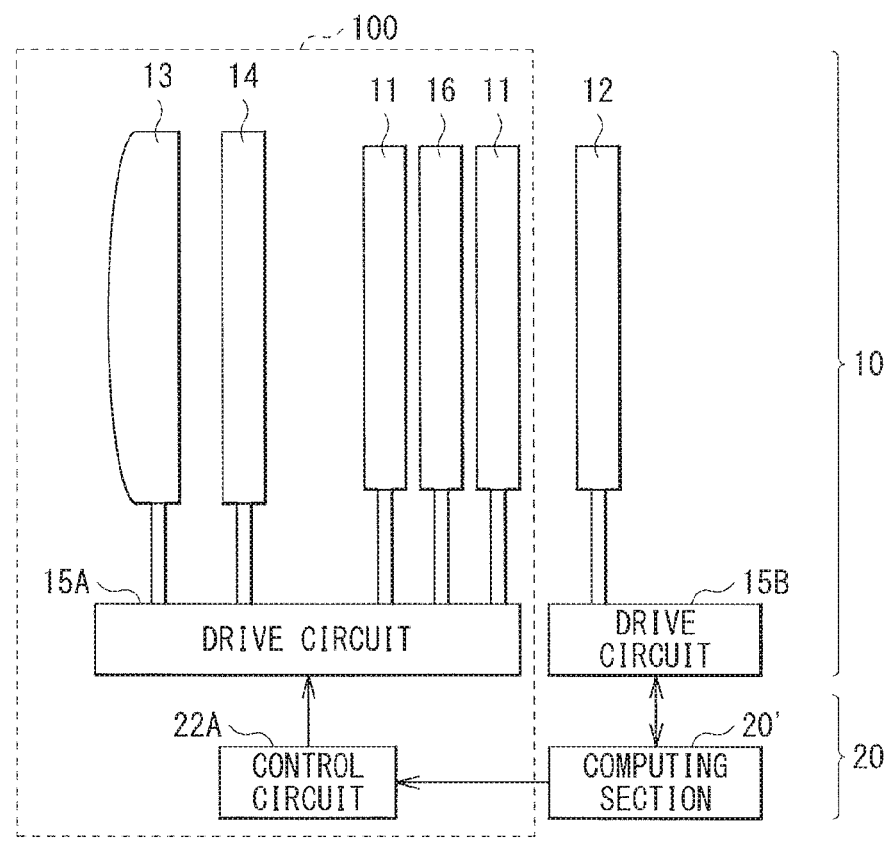

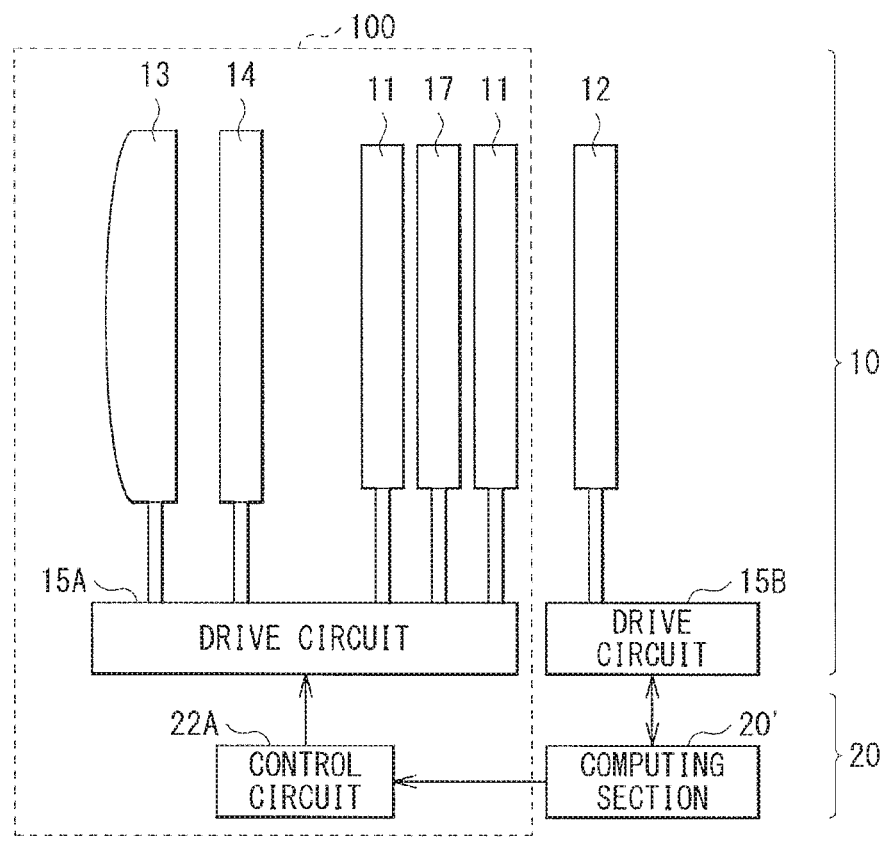
[ FIG. 35 ]

CONTROL UNIT, IMAGING UNIT, AND METHOD OF CONTROLLING LIQUID-CRYSTAL LOW PASS FILTER

CROSS REFERENCE TO RELATED APPLICATIONS

This application is a U.S. National Phase of International Patent Application No. PCT/JP2015/070955 filed on Jul. 23, 2015, which claims priority benefit of Japanese Patent Application No. JP 2014-161126 filed in the Japan Patent Office on Aug. 7, 2014. Each of the above-referenced applications is hereby incorporated herein by reference in its entirety.

TECHNICAL FIELD

The technology relates to a control unit having a controller that controls a liquid crystal layer of a liquid-crystal low pass filter, and to an imaging unit with the controller. The technology also relates to a method of driving a liquid-crystal low pass filter, the method controlling a liquid crystal layer of the liquid-crystal low pass filter.

BACKGROUND ART

For a digital camera or a video camera, which is one type of image-taking unit, a charge coupled device (CCD) image sensor or a complementary metal-oxide semiconductor (CMOS) image sensor is widely used as an imaging device. An imaging device includes an imaging element and a color filter array. The imaging element includes a plurality of photoelectric converters two-dimensionally arranged at predetermined intervals (hereinafter referred to as a "pixel pitch"). The color filter array is disposed on a light input surface of the imaging element. The imaging device obtains color image data by discretely sampling subject light coming in through a taking lens, with the imaging element and the color filter array.

The imaging device has a resolution limit (Nyquist frequency) determined by the pixel pitch of the imaging element and a color array pitch of the color filter array. For this reason, when subject light having a high-frequency component of the Nyquist frequency or more enters the imaging device, the high-frequency component of the Nyquist frequency or more becomes an aliasing component in real space. This generates a stripes-like pattern (moire) in which color and luminance of image data periodically vary. Usually, an optical low pass filter (OLPF; liquid-crystal low pass filter) with the Nyquist frequency set to a cut-off frequency is provided between the taking lens and the imaging element, thereby removing the high-frequency component of the light entering the imaging element.

In a camera enabling both of shooting a still image and shooting a moving image, a reading pitch in a still image mode and a reading pitch in a moving image mode are different, and the respective Nyquist frequencies are therefore different as well. Usually, the reading pitch in the moving image mode is larger than the reading pitch in the still image mode, while the Nyquist frequency in the moving image mode is less than the Nyquist frequency in the still image mode. This makes it easier to cause moire from a low-frequency domain in the moving image mode, than in the still image mode. However, in the past, a high priority is given to resolution of the still image, and therefore the cut-off frequency of the OLPF is set to the Nyquist frequency in the still image mode. In other words, an OLPF optimal for both of these modes has not been provided.

For such an issue, there is proposed to provide OLPFs having an optimal cut-off frequency for respective modes to perform switching between the OLFPs in accordance with the mode, as discussed in PTL 1. There is also proposed an OLPF in which a twisted nematic (TN) liquid crystal is interposed between a pair of liquid crystal plates, and the TN liquid crystal is driven to be turned on and off to change a ps separation width of transmitted light into two types, as discussed in PTLs 2 and 3. Note that it is possible to change the cut-off frequency by changing the ps separation width.

CITATION LIST

Patent Literature

PTL 1: Japanese Unexamined Patent Application Publication No. 2000-333049
PTL 2: WO2007/083783
PTL 3: Japanese Unexamined Patent Application Publication No. 2007-94276

SUMMARY OF INVENTION

In the above-described method, however, the cut-off frequency is a fixed value. For this reason, the cut-off frequency initially set is not allowed to be changed to a different cut-off frequency. This makes it considerably difficult, for example, to shoot still images continuously while changing the cut-off frequency.

It is therefore desirable to provide an imaging unit that makes it possible to shoot still images continuously while changing a cut-off frequency, and to provide a control unit and a method of controlling a liquid-crystal low pass filter that are suitably applicable to such an imaging unit.

A control unit according to an embodiment of the technology includes a controller controlling a polarization state of a liquid crystal layer of a liquid-crystal low pass filter to be any of a first polarization state, a second polarization state, and an intermediate polarization state between the first polarization state and the second polarization state. In output of a plurality of image data from an imaging element, the controller controls the polarization state of the liquid crystal layer to be the first polarization state or the second polarization state when first image data of the image data is outputted, and the controller controls the polarization state of the liquid crystal layer to be the intermediate polarization state when one or more of second and subsequent ones of the image data are outputted.

In the control unit according to the embodiment of the technology, in output of two image data of the image data from the imaging element, the controller may control the polarization state of the liquid crystal layer to be the first polarization state or the second polarization state when first image data of the two image data is outputted, and the controller may control the polarization state of the liquid crystal layer to be the intermediate polarization state when second image data of the two image data is outputted. Further, in the control unit according to the embodiment of the technology, in output of three or more image data of the image data from the imaging element, the controller may control the polarization state of the liquid crystal layer to be one state of the first polarization state and the second polarization state when first one of the image data is outputted. At this time, further, the controller may control the polarization state of the liquid crystal layer to be the other state, which is different from the polarization state when the first image data is outputted, of the first polarization state and the second polarization state when second image data of the three or more image data is outputted, and the controller may control the polarization state of the liquid crystal layer to be the intermediate polarization state when third and subsequent image data of the three or more image data are outputted.

In the control unit according to the embodiment of the technology, the first polarization state may indicate, for example, a state where light entering the liquid crystal layer is optically rotated 90 degrees, and the second polarization state may indicate, for example, a state where the light entering the liquid crystal layer is not optically rotated. Further, in the control unit according to the embodiment of the technology, a first drive signal to be applied to the liquid crystal layer by the controller to bring the liquid crystal layer into the first polarization state may be, for example, a signal of a voltage or a frequency at which a polarization conversion efficiency curve is near a maximum value of polarization conversion efficiency. A second drive signal to be applied to the liquid crystal layer by the controller to bring the liquid crystal layer into the second polarization state may be, for example, a signal of a voltage or a frequency at which the polarization conversion efficiency of the liquid crystal layer is near a minimum value of the polarization conversion efficiency curve.

An imaging unit according to an embodiment of the technology includes an imaging element outputting image data, a liquid-crystal low pass filter including a liquid crystal layer and disposed in a light entering path to the imaging element, and a controller controlling the imaging element and controlling the liquid crystal layer. In the imaging unit according to the embodiment of the technology, the controller has configuration elements identical to those of the controller included in the above-described control unit.

A method of controlling a liquid-crystal low pass filter according to an embodiment of the technology is a method of controlling a liquid-crystal low pass filter that includes a liquid crystal layer and is disposed in a light entering path to an imaging element. The method includes, in output of a plurality of image data from the imaging element, controlling a polarization state of the liquid crystal layer to be a first polarization state or a second polarization state when first image data of the image data is outputted, and controlling the polarization state of the liquid crystal layer to be an intermediate polarization state when one or more of second and subsequent image data of the image data are outputted.

In the control unit, the imaging unit, and the method of controlling the liquid-crystal low pass filter according to the respective embodiments of the disclosure, the polarization state of the liquid crystal layer of the liquid-crystal low pass filter changes, and therefore a peak value of point-image intensity distribution of light transmitted through the liquid-crystal low pass filter also changes. When the peak value of the point-image intensity distribution changes, a cut-off frequency of the liquid-crystal low pass filter also changes. In this way, in the technology, the cut-off frequency changes in a method (a peak-value modulation method) different from a typical method (a separation-width modulation method) of changing a ps separation width of transmitted light. In addition, in the technology, it is possible to change the cut-off frequency of the liquid-crystal low pass filter, by changing the peak value of the point-image intensity distribution of the transmitted light in accordance with the polarization state of the liquid crystal layer of the liquid-crystal low pass filter. It is therefore possible to set a cut-off frequency different from a cut-off frequency initially set, only by changing the polarization state of the liquid crystal layer of the liquid-crystal low pass filter.

Further, in the control unit, the imaging unit, and the method of controlling the liquid-crystal low pass filter according to the respective embodiments of the disclosure, in output of two or more image data of the image data from the imaging element, the polarization state of the liquid crystal layer becomes the first polarization state or the second polarization state when first image data of the two or more image data is outputted, and the polarization state of the liquid crystal layer becomes the intermediate polarization state when second image data of the two or more image data is outputted. This makes it possible to reduce a waiting time resulting from a response speed of a liquid crystal.

In the control unit, the imaging unit, and the method of controlling the liquid-crystal low pass filter according to the respective embodiments of the disclosure, the polarization state of the liquid crystal layer of the liquid-crystal low pass filter changes, and therefore it is possible to change the cut-off frequency. Moreover, in the control unit, the imaging unit, and the method of controlling the liquid-crystal low pass filter according to the respective embodiments of the disclosure, since it is possible to reduce the waiting time resulting from the response speed of the liquid crystal, it is possible to reduce a waiting time before start of next shooting when the cut-off frequency is changed. Accordingly, it is possible to shoot still images continuously while changing the cut-off frequency. It is to be noted that effects described here are not necessarily limitative, and one or more of effects described in the description may be provided.

BRIEF DESCRIPTION OF DRAWINGS

FIG. 1 is a diagram illustrating an example of a schematic configuration of an imaging unit according to an embodiment of the technology.

FIG. 2 is a diagram illustrating an example of a schematic configuration of an imaging device illustrated in FIG. 1.

FIG. 3 is a diagram illustrating an example of a schematic configuration of a computing section illustrated in FIG. 1.

FIG. 4 is a diagram illustrating an example of a schematic configuration of a liquid-crystal low pass filter illustrated in FIG. 1.

FIG. 5 is a diagram illustrating an example of an optic axis of each of a pair of birefringent plates illustrated in FIG. 4.

FIG. 6A is a diagram illustrating an example of a polarization conversion efficiency curve (a V-T curve) of a liquid crystal layer illustrated in FIG. 5.

FIG. 6B is a diagram illustrating an example of a polarization conversion efficiency curve (a F-T curve) of the liquid crystal layer illustrated in FIG. 5.

FIG. 7A is a diagram illustrating an example of action of the liquid-crystal low pass filter illustrated in FIG. 5.

FIG. 7B is a diagram illustrating an example of the action of the liquid-crystal low pass filter illustrated in FIG. 5.

FIG. 7C is a diagram illustrating an example of the action of the liquid-crystal low pass filter illustrated in FIG. 5.

FIG. 8A is a diagram illustrating an example of point-image intensity distribution of transmitted light illustrated in FIG. 7B, together with point-image expansion on an image.

FIG. 8B is a diagram illustrating an example of point-image intensity distribution of transmitted light illustrated in FIG. 7A, together with point-image expansion on an image.

FIG. 8C is a diagram illustrating an example of the point-image intensity distribution of the transmitted light illustrated in FIG. 7C, together with point-image expansion on an image.

FIG. 8D is a diagram illustrating an example of point-image intensity distribution of transmitted light illustrated in FIG. 7C, together with point-image expansion on an image.

FIG. 9 is a diagram illustrating an example of a modulation transfer function (MTF) illustrated in FIGS. 8A to 8D.

FIG. 10 is a diagram illustrating an example of an imaging procedure in the imaging unit illustrated in FIG. 1.

FIG. 11 is a diagram illustrating an example of temporal change in polarization conversion efficiency and applied voltage in the imaging procedure illustrated in FIG. 10.

FIG. 12 is a diagram illustrating an example of temporal change in polarization conversion efficiency and applied voltage in an imaging procedure according to a comparative example.

FIG. 13 is a diagram illustrating a modification example of the temporal change in the polarization conversion efficiency and the applied voltage in the imaging procedure illustrated in FIG. 10.

FIG. 14 is a diagram illustrating a modification example of the temporal change in the polarization conversion efficiency and the applied voltage in the imaging procedure illustrated in FIG. 10.

FIG. 15 is a diagram illustrating a modification example of the imaging procedure in the imaging unit illustrated in FIG. 1.

FIG. 16 is a diagram illustrating an example of temporal change in applied voltage in the imaging procedure illustrated in FIG. 15.

FIG. 17 is a diagram illustrating a modification example of the temporal change in the applied voltage in the imaging procedure illustrated in FIG. 15.

FIG. 18 is a diagram illustrating a modification example of the temporal change in the applied voltage in the imaging procedure illustrated in FIG. 15.

FIG. 19 is a diagram illustrating a modification example of the optic axis of each of the pair of birefringent plates illustrated in FIG. 1.

FIG. 20A is a diagram illustrating an example of action of the liquid-crystal low pass filter illustrated in FIG. 19.

FIG. 20B is a diagram illustrating an example of the action of the liquid-crystal low pass filter illustrated in FIG. 19.

FIG. 20C is a diagram illustrating an example of the action of the liquid-crystal low pass filter illustrated in FIG. 19.

FIG. 21A is a diagram illustrating a modification example of the polarization conversion efficiency curve (the V-T curve) of the liquid crystal layer illustrated in FIGS. 4 and 19.

FIG. 21B is a diagram illustrating a modification example of the polarization conversion efficiency curve (the F-T curve) of the liquid crystal layer illustrated in FIGS. 4 and 19.

FIG. 22 is a diagram illustrating an example of an imaging procedure in the imaging unit including the liquid crystal layer having the polarization conversion efficiency curve illustrated in FIG. 21A or 21B.

FIG. 23 is a diagram illustrating an example of temporal change in polarization conversion efficiency and applied voltage in the imaging procedure illustrated in FIG. 22.

FIG. 24 is a diagram illustrating a modification example of the temporal change in the polarization conversion efficiency and the applied voltage in the imaging procedure illustrated in FIG. 22.

FIG. 25 is a diagram illustrating a modification example of the temporal change in the polarization conversion efficiency and the applied voltage in the imaging procedure illustrated in FIG. 22.

FIG. 26 is a diagram illustrating a modification example of the imaging procedure in the imaging unit with the liquid crystal layer having the polarization conversion efficiency curve illustrated in FIG. 21A or 21B.

FIG. 27 is a diagram illustrating an example of temporal change in applied voltage in the imaging procedure illustrated in FIG. 26.

FIG. 28 is a diagram illustrating a modification example of the temporal change in the applied voltage in the imaging procedure illustrated in FIG. 26.

FIG. 29 is a diagram illustrating a modification example of the temporal change in the applied voltage in the imaging procedure illustrated in FIG. 26.

FIG. 30 is a diagram illustrating a modification example of the liquid-crystal low pass filter illustrated in FIGS. 4 and 19.

FIG. 31 is a diagram illustrating a modification example of the schematic configuration of the imaging device illustrated in FIG. 2.

FIG. 32 is a diagram illustrating a modification example of the schematic configuration of the imaging device illustrated in FIG. 2.

FIG. 33 is a diagram illustrating a modification example of the schematic configuration of the imaging device and the computing section illustrated in FIG. 2.

FIG. 34 is a diagram illustrating a modification example of the schematic configuration of the imaging device and the computing section illustrated in FIG. 31.

FIG. 35 is a diagram illustrating a modification example of the schematic configuration of the imaging device and the computing section illustrated in FIG. 32.

MODES FOR CARRYING OUT THE INVENTION

Some embodiments of the disclosure will be described below in detail with reference to the drawings. It is to be noted that the description will be provided in the following order.
1. Embodiment (an imaging unit)
  An example in which image separation directions in two birefringent plates are opposite to each other
  An example in which a TN liquid crystal is used
  An example in which one liquid-crystal low pass filter is used
  An example in which operation preparation is provided before first exposure
  An example in which number of exposures is three
2. Modification examples
  2.1 Modification example A: an example in which number of exposures is five
  2.2 Modification example B: an example in which number of exposures is two
  2.3 Modification example C: an example in which operation preparation is provided before each exposure
  2.4 Modification example D: an example in which an initial operation state is not taken over
  2.5 Modification example E: an example in which a third drive signal is used for shooting of all three or more images 2.6 Modification example F: an example in which the third drive signal is also used for second in shooting of three or more images 2.7 Modification example G: an example in which the third drive signal is also used for first in shooting of two images 2.8 Modification example H: an example in which image separation directions of two birefringent plates are aligned with each other 2.9 Modification example I: an example in which a VA liquid crystal is used 2.10 Modification example J: an example in which an initial operation preparation is not taken over 2.11 Modification example K: an example in which the third drive signal is used for shooting of all three or more images 2.12 Modification example L: an example in which the third drive signal is also used for second in shooting of three or more images 2.13 Modification example M: an example in which the third drive signal is also used for first in shooting of two images 2.14 Modification example N: an example in which an AR layer and other layer are added 2.15 Modification example O: an example in which two liquid-crystal low pass filters are used 2.16 Modification example P: an example in which a rise response time of the liquid crystal is short 2.17 Modification example Q: an example in which a fall response time of the liquid crystal is short 2.18 Modification example R: an example in which an overdrive signal is used 2.19 Modification example S: an example in which an optical unit is detachably attachable to an imaging unit 1. Embodiment

[Configuration]

FIG. 1 illustrates an example of a schematic configuration of an imaging unit 1 according to an embodiment of the technology. The imaging unit 1 may include, for example, an imaging device 10, a computing section 20, a display 30, a memory 40, and an input section 50.

(Imaging Device 10)

FIG. 2 illustrates an example of a schematic configuration of the imaging device 10. The imaging device 10 may include, for example, a liquid-crystal low pass filter 11, an imaging element 12, a lens 13, an iris 14, and a drive circuit 15. The lens 13 and the iris 14 are provided in a stage before the liquid-crystal low pass filter 11. The imaging element 12 is provided in a stage after the liquid-crystal low pass filter 11. In other words, the liquid-crystal low pass filter 11 is disposed in a light entering path to the imaging element 12. The liquid-crystal low pass filter 11 will be described later in detail.

The imaging element 12 may include, for example, a light receiver and a color filter array. The light receiver includes a plurality of photoelectric converters two-dimensionally arranged at predetermined intervals. The color filter array is disposed on a light input surface of the light receiver. For example, the imaging element 12 may obtain color image data, by discretely sampling subject light coming in through the lens 13, the iris 14, and the liquid-crystal low pass filter 11, with the light receiver and the color filter array. The lens 13 condenses the subject light and allows the subject light to enter a light input surface of the imaging element 12. The iris 14 adjusts an amount of the subject light entering the light input surface of the imaging element 12.

The drive circuit 15 mechanically drives the lens 13 and the iris 14. For example, the drive circuit 15 may adjust a focus, by changing a position of the lens 13 on an optic axis back and forth. For example, the drive circuit 15 may also adjust an aperture amount of the iris 14, thereby adjusting the amount of the subject light entering the light input surface of the imaging element 12.

In addition, the drive circuit 15 drives the liquid-crystal low pass filter 11 and the imaging element 12. The drive circuit 15 adjusts a cut-off frequency fc of the liquid-crystal low pass filter 11, by applying a voltage V (a constant frequency) or a voltage of a frequency F (a constant voltage value), between electrodes of the liquid-crystal low pass filter 11. Specifically, as will be described later in detail, the drive circuit 15 is allowed to apply a first voltage or a voltage of a first frequency, a second voltage or a voltage of a second frequency, and an intermediate voltage or a voltage of an intermediate frequency, between the electrodes of the liquid-crystal low pass filter 11. The drive circuit 15 controls a polarization state of a liquid crystal layer 113 (to be described later) of the liquid-crystal low pass filter 11 to be a first polarization state, by applying the first voltage or the voltage of the first frequency between the electrodes of the liquid-crystal low pass filter 11. The drive circuit 15 controls the polarization state of the liquid crystal layer 113 of the liquid-crystal low pass filter 11 to be a second polarization state, by applying the second voltage or the voltage of the second frequency between the electrodes of the liquid-crystal low pass filter 11. The drive circuit 15 controls the polarization state of the liquid crystal layer 113 of the liquid-crystal low pass filter 11 to be an intermediate polarization state, by applying the intermediate voltage or the voltage of the intermediate frequency between the electrodes of the liquid-crystal low pass filter 11. The drive circuit 15 acquires image data with the imaging element 12 and outputs the image data to outside, by driving the imaging element 12.

(Computing Section 20)

FIG. 3 illustrates an example of a schematic configuration of the computing section 20. The computing section 20 performs predetermined processing on image data Draw outputted from the imaging device 10. The computing section 20 may include, for example, a preprocessing circuit 21, a control circuit 22, a display processing circuit 23, a compression decompression circuit 24, and a memory control circuit 25.

The preprocessing circuit 21 performs optical correction processing such as shading correction, on the image data Draw outputted from the imaging device 10. The control circuit 22 may be, for example, a microcomputer that includes components such as a central processing unit (CPU), a read only memory (ROM), and a random access memory (RAM). For example, the control circuit 22 may perform various kinds of processing to be described below, on post-correction image data D outputted from the preprocessing circuit 21, by executing a program stored in the ROM. For example, the control circuit 22 may output image data in exposure to the display processing circuit 23. The control circuit 22 may output, for example, image data, which is image data in exposure as well as being image data to be shot, to the compression decompression circuit 24. The control circuit 22 will be described later in detail.

The display processing circuit 23 generates an image signal for display in the display 30, from the image data received from the control circuit 22, and sends the image signal to the display 30. The compression decompression circuit 24 may perform, for example, compression encoding processing with a still-image encoding method such as Joint Photographic Experts Group (JPEG), on image data of a still image received from the control circuit 22. In addition, the compression decompression circuit 24 may perform, for example, compression encoding processing with a moving-image encoding method such as Moving Picture Experts Group (MPEG), on image data of a moving image received from the control circuit 22. The memory control circuit 25 controls image data writing in and reading from the memory 40.

(Display 30, Memory 40, and Input Section 50)

The display 30 may be, for example, a liquid crystal display (LCD), and may display data such as image data in exposure and image data read from the memory 40. The memory 40 stores image data received from the memory control circuit 25. The input section 50 receives instructions from a user, and may include, for example, operation buttons and a keyboard.

(Liquid-Crystal Low Pass Filter 11)

Next, the liquid-crystal low pass filter 11 will be described in detail. FIG. 4 illustrates an example of a schematic configuration of the liquid-crystal low pass filter 11. The liquid-crystal low pass filter 11 removes a component of a high spatial frequency included in the subject light. The liquid-crystal low pass filter 11 is driven by the drive circuit 15 to change the cut-off frequency fc. The liquid-crystal low pass filter 11 changes the cut-off frequency fc, with a method (a peak-value modulation method) different from a typical method (a separation-width modulation method) of changing a ps separation width of transmitted light. The peak-value modulation method will be described later in detail.

The liquid-crystal low pass filter 11 includes a pair of birefringent plates 111 and 115 each having a birefringence property, and the liquid crystal layer 113 disposed between the pair of birefringent plates 111 and 115. The liquid-crystal low pass filter 11 further includes electrodes 112 and 114 that apply an electric field to the liquid crystal layer 113. The liquid-crystal low pass filter 11 may include, for example, an alignment film that regulates orientation of the liquid crystal layer 113. The electrodes 112 and 114 are disposed to face each other with the liquid crystal layer 113 provided therebetween. The electrodes 112 and 114 are each made of a sheet electrode. One or both of the electrode 112 and the electrode 114 may include a plurality of partial electrodes.

The electrodes 112 and 114 may each be, for example, a transparent conductive film such as indium tin oxide (ITO). The electrodes 112 and 114 may each be, for example, an inorganic conductive film having transparency, an organic conductive film having transparency, or a metal oxide film having transparency. The liquid-crystal low pass filter 11 may have a seal material that seals the liquid crystal layer 113. The seal material may include a plurality of spacers that maintain a clearance between the pair of birefringent plates 111 and 115, or may not include the plurality of spacers. Each of the spacers may be, for example, a glass spacer. Each of the spacers may be made of, for example, an inorganic substance having transparency, an organic substance having transparency, or a metal oxide having transparency. The plurality of spacers may also be provided in the liquid crystal layer 113, or may not be provided in the liquid crystal layer 113. In the liquid crystal layer 113, each of the spacers may preferably have a diameter of 7 μm or less. When the seal material includes the spacer, the pacer included in the seal material may have a diameter of 7 μm or more. In addition, in the liquid crystal layer 113, the number of the spacers may be preferably ten or less per square millimeter.

The birefringent plate 111 is disposed on a light input side of the liquid-crystal low pass filter 11. For example, an outer surface of the birefringent plate 111 may serve as a light input surface 110A. Input light L1 enters the light input surface 110A from a subject side. The birefringent plate 111 may be, for example, disposed in such a manner that an optic axis of the input light L1 is parallel to a normal 111A to the birefringent plate 111 (or the light input surface 110A). The birefringent plate 115 is disposed on a light output side of the liquid-crystal low pass filter 11. For example, an outer surface of the birefringent plate 115 may serve as a light output surface 110B. Transmitted light L2 of the liquid-crystal low pass filter 11 is outputted from the light output surface 110B to outside. The birefringent plate 111, the electrode 112, the liquid crystal layer 113, the electrode 114, and the birefringent plate 115 are stacked in this order from the light input side. A normal to each of the electrode 112, the liquid crystal layer 113, the electrode 114, and the birefringent plate 115 is parallel to the normal 111A.

FIG. 5 illustrates an example of an optic axis of each of the pair of birefringent plates 111 and 115 in the liquid-crystal low pass filter 11. The birefringent plates 111 and 115 have a birefringence property, and a uniaxial crystal structure. The birefringent plates 111 and 115 have a function of performing ps separation of circularly polarized light by utilizing the birefringence property. The birefringent plates 111 and 115 may be made of, for example, crystal, calcite, or lithium niobate. Here, a separation factor of the lithium niobate is 6.4 times larger than a separation factor of the crystal, when a wavelength of the lithium niobate is 589.3 nm (a d line). The lithium niobate is therefore allowed to have a smaller thickness necessary to obtain a same separation width, than the crystal.

In the birefringent plates 111 and 115, respective image separation directions are opposite to each other. An optic axis AX1 of the birefringent plate 111 and an optic axis AX2 of the birefringent plate 115 intersect each other in a plane parallel to the normal 111A to the light input surface 110A. An angle θ1 formed by the optic axis AX1 and the optic axis AX2 may be, for example, 90 degrees. Further, the optic axes AX1 and AX2 each obliquely intersect the normal 111A to the light input surface 110A. An angle θ2 formed by the optic axis AX1 and the normal 111A may be, for example, a counterclockwise angle of smaller than 90 degrees from the normal 111A. The angle θ2 may be, for example, 45 degrees. An angle θ3 formed by the optic axis AX2 and the normal 111A may be, for example, a counterclockwise angle of larger than 90 degrees and smaller than 180 degrees from the normal 111A. The angle θ3 may be, for example, 135 degrees (180 degrees−45 degrees).

FIG. 6A illustrates an example of a polarization conversion efficiency curve (a V-T curve) of the liquid crystal layer 113. FIG. 6B illustrates an example of a polarization conversion efficiency curve (a F-T curve) of the liquid crystal layer 113. In FIG. 6A, a horizontal axis indicates the voltage V applied between the electrodes 112 and 114 (the constant frequency). In FIG. 6B, a horizontal axis indicates the frequency F of the voltage applied between the electrodes 112 and 114 (the constant voltage). In each of FIG. 6A and FIG. 6B, a vertical axis indicates polarization conversion efficiency T. The polarization conversion efficiency T is determined by multiplying a value by 100. The value is determined by dividing a phase difference given to linearly polarized light by 90 degrees. The polarization conversion efficiency T being 0% indicates that no phase difference is given to the linearly polarized light. For example, the polarization conversion efficiency T being 0% may indicate that the linearly polarized light passes through a medium without changing a polarization direction thereof. The polarization conversion efficiency T being 100% indicates that a phase difference of 90 degrees is given to the linearly polarized light. For example, The polarization conversion efficiency T being 100% may indicate that the light passes through a medium after conversion from p-polarized light to s-polarized light or conversion from the s-polarized light to the p-polarized light. The polarization conversion efficiency T being 50% indicates that a phase difference of 45 degrees is given to the linearly polarized light. For example, the polarization conversion efficiency T being 50% may indicate that the light passes through a medium after conversion from the p-polarized light or the s-polarized light to the circularly polarized light.

The liquid crystal layer 113 controls the polarization on the basis of an electric field generated by a voltage between the electrodes 112 and 114. In the liquid crystal layer 113, as illustrated in FIG. 6A, the polarization conversion efficiency T becomes T2 when a voltage V1 is applied between the electrodes 112 and 114, and the polarization conversion efficiency T is T1 when a voltage V2 (V1<V2) is applied between the electrodes 112 and 114. T2 is 100%, and T1 indicates 0%. Further, as illustrated in FIG. 6A, when a voltage V3 (V1<V3<V2) is applied between the electrodes 112 and 114, the polarization conversion efficiency T becomes T3, in the liquid crystal layer 113. T3 is a value larger than 0% and smaller than 100%. FIG. 6A illustrates, as an example, a case where the voltage V3 is a voltage when T3 is 50%. Here, the voltage V1 is a voltage equal to or less than a voltage (the second voltage) at a fall position of the polarization conversion efficiency curve. Specifically, the voltage V1 indicates a voltage in a section where the polarization conversion efficiency is saturated near a maximum value in the polarization conversion efficiency curve. The voltage V2 is a voltage equal to or more than a voltage (the first voltage) at a rise position of the polarization conversion efficiency curve. Specifically, the voltage V2 indicates a voltage in a section where the polarization conversion efficiency is saturated near a minimum value in the polarization conversion efficiency curve. The voltage V3 is a voltage (the intermediate voltage) between the voltage (the first voltage) at the fall position of the polarization conversion efficiency and the voltage (the second voltage) at the rise position of the polarization conversion efficiency curve. Specifically, the voltage V3 is a voltage between the voltage in the section where the polarization conversion efficiency is saturated near the maximum value in the polarization conversion efficiency curve, and the voltage in the section where the polarization conversion efficiency is saturated near the minimum value in the polarization conversion efficiency curve.

In the liquid crystal layer 113, as illustrated in FIG. 6B, the polarization conversion efficiency T becomes T2 when a voltage of a frequency F2 is applied between the electrodes 112 and 114, and the polarization conversion efficiency T becomes T1 when a voltage of a frequency F1 (F1<F2) is applied between the electrodes 112 and 114. Further, in the liquid crystal layer 113, as illustrated in FIG. 6B, the polarization conversion efficiency T becomes T3 when a voltage of a frequency F3 (F1<F3<2) is applied between the electrodes 112 and 114. FIG. 6B illustrates, as an example, a case where the frequency F3 is a frequency when T3 is 50%. Here, the frequency F1 is a frequency equal to or less than a frequency (the first frequency) at a rise position of the polarization conversion efficiency curve. Specifically, the frequency F1 indicates a frequency in a section where the polarization conversion efficiency is saturated near a minimum value in the polarization conversion efficiency curve. The frequency F2 is a frequency equal to or more than a frequency (the second frequency) at a fall position of the polarization conversion efficiency curve. Specifically, the frequency F2 indicates a frequency in a section where the polarization conversion efficiency is saturated near a maximum value in the polarization conversion efficiency curve. The frequency F3 is a frequency (the intermediate frequency) between the frequency (the second frequency) at the fall position of the polarization conversion efficiency curve and the frequency (the first frequency) at the rise position of the polarization conversion efficiency curve. Specifically, the frequency F3 is a frequency between the frequency in the section where the polarization conversion efficiency is saturated near the maximum value in the polarization conversion efficiency curve, and the frequency in the section where the polarization conversion efficiency is saturated near the minimum value in the polarization conversion efficiency curve.

As described above, the liquid crystal layer 113 controls the polarization. Examples of the liquid crystal having the polarization conversion efficiency curve as described above may include a twisted nematic (TN) liquid crystal. The TN liquid crystal is configured of a chiral nematic liquid crystal. The TN liquid crystal has an optical rotation property of rotating a polarization direction of passing light by following rotation of a nematic liquid crystal.

Next, optical action of the liquid-crystal low pass filter 11 (specifically, the pair of birefringent plates 111 and 115 and the liquid crystal layer 113) will be described. FIGS. 7A, 7B, and 7C each illustrate an example of the action of the liquid-crystal low pass filter 11. In FIG. 7A, the voltage V between the electrodes 112 and 114 is the voltage V1, or the frequency F between the electrodes 112 and 114 is the frequency F2. In FIG. 7B, the voltage V between the electrodes 112 and 114 is the voltage V2, or the frequency F between the electrodes 112 and 114 is the frequency F1. In FIG. 7C, the voltage V between the electrodes 112 and 114 is the voltage V3, or the frequency F between the electrodes 112 and 114 is the frequency F3.

(Case where V=V1 or F=F2 (FIG. 7A))

When the input light L1 of the circularly polarized light enters the birefringent plate 111, the input light L1 is separated into the p-polarized light and the s-polarized light with a separation width d1, by the birefringence property of the birefringent plate 111. When a polarized component oscillating perpendicularly to the optic axis AX1 of the birefringent plate 111 is a component of the s-polarized light included in the input light L1, the s-polarized light resulting from the separation travels straight in the birefringent plate 111 without being affected by the birefringence, and exits from a back surface of the birefringent plate 111. A component of the p-polarized light included in the input light L1 oscillates in a direction orthogonal to the oscillation direction of the s-polarized light. The component of the p-polarized light therefore travels obliquely in the birefringent plate 111 by influence of the birefringence, and is then refracted at a position shifted by the separation width d1 on the back surface of the birefringent plate 111. The component of the p-polarized light then exits from the back surface of the birefringent plate 111. The birefringent plate 111 thus separates the input light L1 into the transmitted light L2 of the p-polarized light and the transmitted light L2 of the s-polarized light, with the separation width d1.

When the p-polarized light resulting from the separation at the birefringent plate 111 enters the liquid crystal layer 113 where the polarization conversion efficiency is T2, the p-polarized light is converted into the s-polarized light. The s-polarized light then travels straight in the liquid crystal layer 113, and then exists from a back surface of the liquid crystal layer 113. When the s-polarized light resulting from the separation at the birefringent plate 111 enters the liquid crystal layer 113 where the polarization conversion efficiency is T2, the s-polarized light is converted into the p-polarized light. The p-polarized light then travels straight in the liquid crystal layer 113 and then exits from the back surface of the liquid crystal layer 113. The liquid crystal layer 113 therefore performs ps conversion, while keeping the separation width constant, with respect to the p-polarized light and the s-polarized light resulting from the separation at the birefringent plate 111. A polarization state (a state where the light entering the liquid crystal layer 113 is optically rotated 90 degrees) of the liquid crystal layer 113 at this time corresponds to a specific example of a "first polarization state" of the technology.

When the s-polarized light and the p-polarized light enter the birefringent plate 115 after passing through the liquid crystal layer 113, the separation width of the s-polarized light and the p-polarized light changes by the birefringence property of the birefringent plate 115. When a polarized component oscillating perpendicularly to the optic axis AX2 of the birefringent plate 115 is the s-polarized light, the s-polarized light travels straight in the birefringent plate 115 without being affected by the birefringence. The s-polarized light then exists from a back surface of the birefringent plate 115. The p-polarized light oscillates in a direction orthogonal to the oscillation direction of the s-polarized light. The p-polarized light therefore travels obliquely in the birefringent plate 115 in a direction opposite to the image separation direction in the birefringent plate 111, by influence of the birefringence. Further, the p-polarized light is refracted at a position shifted by a separation width d2 on the back surface of the birefringent plate 115, and then exists from the back surface of the birefringent plate 115. The birefringent plate 115 therefore separates the s-polarized light and the p-polarized light having passed through the liquid crystal layer 113 into the transmitted light L2 of the s-polarized light and the transmitted light L2 of the p-polarized light, with the separation width (d1+d2).

(Case where V=V2 or F=F1 (FIG. 7B))

Action of the birefringent plate 111 for the input light L1 is similar to the action described above. Action of the liquid crystal layer 113 and the birefringent plate 115 will be therefore described below. When the p-polarized light and the s-polarized light resulting from the separation at the birefringent plate 111 enter the liquid crystal layer 113 where the polarization conversion efficiency is T1, the p-polarized light and the s-polarized light travel straight in the liquid crystal layer 113 without being subjected to polarization conversion by the liquid crystal layer 113. The p-polarized light and the s-polarized light then exist from the back surface of the liquid crystal layer 113. The liquid crystal layer 113 therefore does not optically act on the p-polarized light and the s-polarized light resulting from the separation at the birefringent plate 111. A polarization state (a state where the light entering the liquid crystal layer 113 is not optically rotated) of the liquid crystal layer 113 at this time corresponds to a specific example of a "second polarization state" of the technology.

When the s-polarized light and the p-polarized light enter the birefringent plate 115 after passing through the liquid crystal layer 113, the separation width of the s-polarized light and the p-polarized light changes by the birefringence property of the birefringent plate 115. When a polarized component oscillating perpendicularly to the optic axis AX2 of the birefringent plate 115 is the s-polarized light, the s-polarized light travels straight in the birefringent plate 115 without being affected by the birefringence. The s-polarized light then exists from the back surface of the birefringent plate 115. The p-polarized light oscillates in a direction orthogonal to the oscillation direction of the s-polarized light. The p-polarized light therefore obliquely travels in the birefringent plate 115 in a direction opposite to the image separation direction in the birefringent plate 111, by the influence of the birefringence. The p-polarized light is then refracted at a position shifted by the separation width d2 on the back surface of the birefringent plate 115, and then exists from the back surface of the birefringent plate 115. The birefringent plate 115 therefore separates the s-polarized light and the p-polarized light having passed through the liquid crystal layer 113 into the transmitted light L2 of the s-polarized light and the transmitted light L2 of the p-polarized light, with the separation width (|d1−d2|). Here, in a case where d1=d2, the transmitted light L2 of the s-polarized light and the transmitted light L2 of the p-polarized light exist from a same position on the back surface of the birefringent plate 115. Hence, in this case, the birefringent plate 115 combines the s-polarized light and the p-polarized light having passed through the liquid crystal layer 113.

(Case where V=V3 or F=F3 (FIG. 7C))

Action of the birefringent plate 111 for the input light L1 is similar to the action described above. Action of the liquid crystal layer 113 and the birefringent plate 115 will be therefore described below. When the p-polarized light resulting from the separation at the birefringent plate 111 enters the liquid crystal layer 113 where the polarization conversion efficiency is T3 (=50%), the p-polarized light is converted into the circularly polarized light, and travels straight in the liquid crystal layer 113. The p-polarized light then exists from the back surface of the liquid crystal layer 113. When the s-polarized light resulting from the separation at the birefringent plate 111 enters the liquid crystal layer 113 where the polarization conversion efficiency is T3 (=50%), the s-polarized light is also converted into the circularly polarized light, and travels straight in the liquid crystal layer 113. The s-polarized light then exits from the back surface of the liquid crystal layer 113. The liquid crystal layer 113 thus converts the p-polarized light and the s-polarized light resulting from the separation at the birefringent plate 111 into the circularly polarized light, while keeping the separation width constant. A polarization state of the liquid crystal layer 113 at this time corresponds to a specific example of an "intermediate polarization state" of the technology.

When the circularly polarized light outputted from the liquid crystal layer 113 enters the birefringent plate 115, the circularly polarized light is separated into the p-polarized light and the s-polarized light with the separation width d2, by the birefringence property of the birefringent plate 115. When a polarized component oscillating perpendicularly to the optic axis AX2 of the birefringent plate 115 is the s-polarized light, the s-polarized light travels straight in the birefringent plate 115 without being affected by the birefringence. The s-polarized light then exists from the back surface of the birefringent plate 115. The p-polarized light oscillates in a direction orthogonal to the oscillation direction of the s-polarized light. The p-polarized light therefore obliquely travels in the birefringent plate 115 in a direction opposite to the image separation direction in the birefringent plate 111, by the influence of the birefringence. The p-polarized light is then refracted at a position shifted by the separation width d2 on the back surface of the birefringent plate 115, and then exists from the back surface of the birefringent plate 115. The birefringent plate 115 thus separates each of the circularly polarized light converted from the p-polarized light at the liquid crystal layer 113 and the circularly polarized light converted from the s-polarized light at the liquid crystal layer 113, into the transmitted light L2 of the s-polarized light and the transmitted light L2 of the p-polarized light, with the separation width d2.

Here, in the case where d1=d2, the p-polarized light separated from the circularly polarized light converted from the p-polarized light at the liquid crystal layer 113 and the s-polarized light separated from the circularly polarized light converted from the s-polarized light at the liquid crystal layer 113 exit from a same position on the back surface of the birefringent plate 115. In this case, the transmitted light L2 of the circularly polarized light exits from the back surface of the birefringent plate 115. In this case, the birefringent plate 115 therefore separates the two circularly polarized lights outputted from the liquid crystal layer 113 with the separation width (d2+d2) into the transmitted light L2 of the p-polarized light and the transmitted light L2 of the s-polarized light. After the separation, the birefringent plate 115 combines the p-polarized light and the s-polarized light, at a position between the transmitted light L2 of the p-polarized light and the transmitted light L2 of the s-polarized light.

Next, point-image intensity distribution of the transmitted light of the liquid-crystal low pass filter 11 will be described. FIG. 8A illustrates an example of point-image intensity distribution of the transmitted light illustrated in FIG. 7B, together with point-image expansion on an image. FIG. 8B illustrates an example of point-image intensity distribution of the transmitted light illustrated in FIG. 7A. FIG. 8C illustrates an example of point-image intensity distribution of the transmitted light illustrated in FIG. 7C. FIG. 8D illustrates an example of point-image intensity distribution of the transmitted light when d1≠d2 in FIG. 7C.

When the voltage V2 or the voltage of the frequency F1 is applied between the electrodes 112 and 114, the liquid-crystal low pass filter 11 may cause one peak p1 in the point-image intensity distribution of the transmitted light of the liquid-crystal low pass filter 11, as illustrated in FIG. 8A, for example. The peak p1 may be, for example, formed by one transmitted light L2 outputted from the birefringent plate 115, as illustrated in FIG. 7B. When the voltage V1 or the voltage of the frequency F2 is applied between the electrodes 112 and 114, the liquid-crystal low pass filter 11 may cause two peaks p2 and p3 in the point-image intensity distribution of the transmitted light of the liquid-crystal low pass filter 11, as illustrated in FIG. 8B, for example. The two peaks p2 and p3 may be, for example, formed by two transmitted lights L2 outputted from the birefringent plate 115, as illustrated in FIG. 7A.

When the voltage V3 or the voltage of the frequency F3 is applied between the electrodes 112 and 114 and d1=d2, the liquid-crystal low pass filter 11 may cause three peaks p1, p2, and p3 in the point-image intensity distribution of the transmitted light of the liquid-crystal low pass filter 11, as illustrated in FIG. 8C, for example. The three peaks p1, p2, and p3 may be, for example, formed by three transmitted lights L2 outputted from the birefringent plate 115, as illustrated in FIG. 7C. When the voltage V3 or the voltage of the frequency F3 is applied between the electrodes 112 and 114 and d1≠d2, the liquid-crystal low pass filter 11 may cause four peaks p1, p2, p3, and p4 in the point-image intensity distribution of the transmitted light of the liquid-crystal low pass filter 11, as illustrated in FIG. 8D, for example. Although not illustrated, the four peaks p1, p2, p3, and p4 may be, for example, formed by four transmitted lights L2 outputted from the birefringent plate 115.

As described above, when the voltage V3 or the voltage of the frequency F3 is applied between the electrodes 112 and 114, the liquid-crystal low pass filter 11 causes the three peaks p1 to p3 or the four peaks p1 to p4 in the point-image intensity distribution of the transmitted light of the liquid-crystal low pass filter 11. Here, in the liquid-crystal low pass filter 11, when a magnitude of the voltage V3 or the frequency F3 applied between the electrodes 112 and 114 changes, values of the three peaks p1 to p3 or the four peaks p1 to p4 described above change. In other words, in the liquid-crystal low pass filter 11, the point-image intensity distribution of the transmitted light changes, when the magnitude of the voltage V3 or the frequency F3 applied between the electrodes 112 and 114 changes.

In this way, the liquid-crystal low pass filter 11 changes the point-image intensity distribution of the transmitted light, by changing the magnitude of the voltage V or the frequency F applied between the electrodes 112 and 114. Here, a peak value (a peak height) of each of the three peaks p1 to p3 and a peak value (a peak height) of each of the four peaks p1 to p4 described above change in accordance with the magnitude of the voltage V or the frequency F applied between the electrodes 112 and 114. On the other hand, a peak position of each of the three peaks p1 to p3 and a peak position of each of the four peaks p1 to p4 described above are determined in accordance with the separation widths d1 and d2. The separation widths d1 and d2 are constant regardless of the magnitude of the voltage V3 or the frequency F3 applied between the electrodes 112 and 114. Hence, the peak position of each of the three peaks p1 to p3 and the peak position of each of the four peaks p1 to p4 described above are constant regardless of the magnitude of the voltage V3 or the frequency F3 applied between the electrodes 112 and 114.

Next, a relationship between the point-image intensity distribution of the transmitted light and the cut-off frequency fc will be described. FIG. 9 illustrates an example of a MTF illustrated in each of FIGS. 8A to 8D. A horizontal axis indicates spatial frequency, and a vertical axis indicates standardized contrast. In FIG. 8A, the liquid-crystal low pass filter 11 does not have a light-ray separation effect. The MTF in FIG. 8A therefore matches with a MTF of a lens (e.g., the lens 13) disposed in a stage before the liquid-crystal low pass filter 11. In FIG. 8B, a distance between the peaks is longer than a distance between the peaks in each of FIG. 8C and FIG. 8D, and has a largest light-ray separation effect. For this reason, a cut-off frequency fc1 of the MTF illustrated in FIG. 8B is smaller than a cut-off frequency fc2 of the MTF illustrated in each of FIG. 8C and FIG. 8D.

In each of FIG. 8C and FIG. 8D, the separation width is equal to the separation width in FIG. 8B; however, the number of the peaks is larger than the number of the peaks in FIG. 8B, and the distance between the peaks is smaller than the distance between the peaks in FIG. 8B. In each of FIG. 8C and FIG. 8D, a light-ray separation effect is therefore smaller than the light-ray separation effect illustrated in FIG. 8B. Accordingly, the cut-off frequency fc2 of the MTF illustrated in each of FIG. 8C and FIG. 8D is larger than the cut-off frequency fc1 of the MTF illustrated in FIG. 8B.

The cut-off frequency fc2 of the MTF illustrated in each of FIG. 8C and FIG. 8D changes in accordance with the magnitude of the voltage V3 or the frequency F3 applied between the electrodes 112 and 114, and therefore may take any frequency larger than the cut-off frequency fc1 of the MTF illustrated in FIG. 8B. This allows the liquid-crystal low pass filter 11 to set the cut-off frequency fc, to any value equal to or more than a cut-off frequency at a maximum of the light-ray separation effect, by changing the magnitude of the voltage V or the frequency F applied between the electrodes 112 and 114.

Next, stepwise exposure in the imaging unit 1 will be described.

FIG. 10 illustrates an example of an imaging procedure in the imaging unit 1. Specifically, FIG. 10 illustrates an example of a procedure of performing the stepwise exposure while variably controlling a blur amount of an image. FIG. 10 illustrates an example of a procedure of the stepwise exposure when three image data Draw are sequentially outputted from the imaging element 12. FIG. 11 illustrates an example of temporal change in the polarization conversion efficiency and the applied voltage in the imaging procedure illustrated in FIG. 10. Described below is an example of a procedure of performing the stepwise exposure while variably controlling the cut-off frequency fc that is one of parameters defining the blur amount of the image. Image data D1, D2, and D3 in the figure and the following paragraphs are image data generated by the preprocessing circuit 21, and correspond to three image data D that have different blur amounts of the image.

First, the imaging unit 1 performs operation preparation (step S101). The operation preparation indicates preparation necessary for output of the image data Draw from the imaging element 12. Examples of the operation preparation may include setting a condition for an autofocus (AF) and a condition for the iris 14. Specifically, the control circuit 22 instructs the imaging device 10 to perform the operation preparation on components such as the AF. In accordance with the instruction from the control circuit 22, the drive circuit 15 performs the operation preparation on one or a plurality of optical components (e.g., the lens 13 and the iris 14), before the first image data Draw is outputted. For example, the drive circuit 15 may set each of the condition for the focus of the lens 13 and the condition for the iris 14, to a predetermined value. At this time, the drive circuit 15 causes the imaging device 10 to execute the operation preparation on components such as the AF, after disabling optical action of the liquid-crystal low pass filter 11. For example, in accordance with the instruction from the control circuit 22, the drive circuit 15 may apply a drive signal (a first drive signal) that is the voltage V2 or the frequency F1, between the electrodes 112 and 114. The first drive signal is a signal to be applied to the liquid crystal layer 113 by the drive circuit 15 to bring the liquid crystal layer 113 into the first polarization state.

Next, the imaging unit 1 acquires the image data D1 under a condition A1 (step S102). The condition A1 indicates setting a signal, which is identical to a preparation voltage to be applied between the electrodes 112 and 114 when the operation preparation is performed on the one or the plurality of optical components (e.g., the lens 13) before output of the first image data Draw, or a signal of a voltage closest to the preparation voltage, as the voltage to be applied between the electrodes 112 and 114. In addition, the condition A1 indicates setting a signal, which is identical to a preparation frequency to be applied between the electrodes 112 and 114 when the operation preparation is performed on the one or the plurality of optical components (e.g., the lens 13) before output of the first image data Draw, or a signal of a frequency closest to the preparation frequency, as the frequency to be applied between the electrodes 112 and 114. In the present embodiment, the condition A1 indicates setting the drive signal (the first drive signal) that is the voltage V2 or the frequency F1, as the voltage V or the frequency F to be applied between the electrodes 112 and 114.

Specifically, the control circuit 22 instructs the imaging device 10 to set the condition A1. Then, in accordance with the instruction from the control circuit 22, the drive circuit 15 applies the drive signal (the first drive signal) that is the voltage V2 or the frequency F1, between the electrodes 112 and 114. This causes the polarization conversion efficiency of the liquid crystal layer 113 to be T1, and changes the polarization state of the liquid crystal layer 113 to the first polarization state. Further, the control circuit 22 instructs the imaging element 12 to perform imaging. Specifically, the control circuit 22 instructs the imaging element 12 to perform the imaging in a stage where the polarization conversion efficiency of the liquid crystal layer 113 becomes T1. As a result, the control circuit 22 acquires the image data D1 under the condition A1, through the preprocessing circuit 21. The imaging unit 1 then stores the image data D1 (step S103). Specifically, the control circuit 22 stores the image data D1 in the memory 40.

The imaging unit 1 subsequently acquires the image data D2 under a condition A2 (step S104). The condition A2 indicates setting a signal different from the signal (the condition A1) when the first image data Draw is outputted from the imaging element 12, as the voltage or the frequency to be applied between the electrodes 112 and 114. In the present embodiment, the condition A2 indicates setting a drive signal (a second drive signal) that is the voltage V1 or the frequency F2, as the voltage or the frequency to be applied between the electrodes 112 and 114. In other words, the condition A2 indicates setting the second drive signal out of the first drive signal and the second drive signal, as the voltage or the frequency to be applied between the electrodes 112 and 114. The second drive signal is a signal to be applied to the liquid crystal layer 113 by the drive circuit 15 to bring the liquid crystal layer 113 into the second polarization state.

Specifically, the control circuit 22 instructs the imaging device 10 to set the condition A2. Then, in accordance with the instruction from the control circuit 22, the drive circuit 15 applies the drive signal (the second drive signal) that is the voltage V1 or the frequency F2, between the electrodes 112 and 114. This changes the polarization conversion efficiency of the liquid crystal layer 113 from T1 to T2, and the polarization state of the liquid crystal layer 113 transitions from the first polarization state to the second polarization state. Further, the control circuit 22 instructs the imaging element 12 to perform imaging. Specifically, the control circuit 22 instructs the imaging element 12 to perform the imaging in a stage where the polarization conversion efficiency of the liquid crystal layer 113 becomes T2. As a result, the control circuit 22 acquires the image data D2 under the condition A2, through the preprocessing circuit 21. The imaging unit 1 then stores the image data D2 (step S105). Specifically, the control circuit 22 stores the image data D2 in the memory 40.

Finally, the imaging unit 1 acquires the image data D3 under a condition A3 (step S106). The condition A3 indicates setting the intermediate voltage or the intermediate frequency, as the voltage or the frequency to be applied between the electrodes 112 and 114. In the present embodiment, the condition A3 indicates setting a drive signal (a third drive signal) that is the voltage V3 or the frequency F3, as the voltage or the frequency to be applied between the electrodes 112 and 114. The third drive signal is a signal to be applied to the liquid crystal layer 113 by the drive circuit 15 to bring the liquid crystal layer 113 into the intermediate polarization state.

Specifically, the control circuit 22 instructs the imaging device 10 to set the condition A3. Then, in accordance with the instruction from the control circuit 22, the drive circuit 15 applies the drive signal (the third drive signal) that is the voltage V3 or the frequency F3, between the electrodes 112 and 114. This changes the polarization conversion efficiency of the liquid crystal layer 113 from T2 to T3, and the polarization state of the liquid crystal layer 113 transitions from the second polarization state to the intermediate polarization state. Further, the control circuit 22 instructs the imaging element 12 to perform imaging. Specifically, the control circuit 22 instructs the imaging element 12 to perform the imaging in a stage where the polarization conversion efficiency of the liquid crystal layer 113 becomes T3. As a result, the control circuit 22 acquires the image data D3 under the condition A3, through the preprocessing circuit 21. The imaging unit 1 then stores the image data D3 (step S107). Specifically, the control circuit 22 stores the image data D3 in the memory 40. Finally, the control circuit 22 outputs the acquired image data D1, D2, and D3 to the display processing circuit 23, thereby allowing the display 30 to display these image data (step S108). It is to be noted that after storing the image data D1 and before acquiring the image data D2, the control circuit 22 may output the image data D1 to the display processing circuit 23, thereby allowing the display 30 to display the image data D1. Similarly, after storing the image data D2 and before acquiring the image data D3, the control circuit 22 may output the image data D2 to the display processing circuit 23, thereby allowing the display 30 to display the image data D2. The stepwise exposure is thus executed in the imaging unit 1. It is to be noted that the imaging unit 1 may perform the above-described stepwise exposure as bracket shooting to be performed automatically in accordance with an instruction (e.g., a press of the shutter button) from a user. In addition, the imaging unit 1 may perform the above-described stepwise exposure as continuous shooting to be performed in accordance with manual operation by the user.

[Effects]

Next, effects of the imaging unit 1 will be described with reference to FIGS. 7C, 8C, 8D, 9, 11, and 12. FIG. 12 illustrates an example of temporal change in the polarization conversion efficiency and the applied voltage in the imaging procedure according to a comparative example.

In the imaging unit 1, when the voltage V3 or the voltage of the frequency F3 is applied between the electrodes 112 and 114, the pair of birefringent plates 111 and 115 and the liquid crystal layer 113 cause the three peaks p1 to p3 or the four peaks p1 to p4 in the point-image intensity distribution of the transmitted light. When the magnitude of the voltage V3 or the frequency F3 applied between the electrodes 112 and 114 is changed, the polarization conversion efficiency of the liquid crystal layer 113 changes, and therefore the peak value of the point-image intensity distribution also changes. When the peak value of the point-image intensity distribution changes, the cut-off frequency fc of the liquid-crystal low pass filter 11 also changes. In this way, in the liquid-crystal low pass filter 11, the cut-off frequency fc changes in the method (the peak-value modulation method) different from the typical method (the separation-width modulation method) of changing the ps separation width of the transmitted light.

In addition, in the imaging unit 1, it is possible to change the cut-off frequency fc of the liquid-crystal low pass filter 11, by changing the value of each of the three peaks p1 to p3 or the four peaks p1 to p4 caused in the point-image intensity distribution of the transmitted light, in accordance with the magnitude of the voltage V3 or the frequency F3 applied between the electrodes 112 and 114. It is therefore possible to set a cut-off frequency different from the cut-off frequency initially set, only by changing the magnitude of the voltage V3 or the frequency F3 applied between the electrodes 112 and 114. Hence, the liquid-crystal low pass filter 11 has a configuration that makes it possible to change the cut-off frequency fc without preparing a new optical component.

Moreover, when the three image data Draw are sequentially outputted from the imaging element 12 in the imaging unit 1, the third drive signal is applied to the electrodes 112 and 114 after the first drive signal and the second drive signal are applied to the electrodes 112 and 114. This makes it possible to reduce the waiting time resulting from the response speed of the liquid crystal, as compared with, for example, a case where the voltages are applied to the electrodes 112 and 114 in order of the first drive signal, the third drive signal, and the second drive signal (see FIG. 12). This allows a shooting time ΔT1 illustrated in FIG. 11 to be much shorter than a shooting time ΔT2 illustrated in FIG. 12. It is therefore possible to perform the continuous shooting of still images easily, while changing the cut-off frequency fc.

2. Modification Examples

Next, various modification examples of the imaging unit 1 according to the above-described embodiment will be described.

2.1 Modification Example A (First Drive Signal+Second Drive Signal+Three or more Third Drive Signals)

FIG. 13 illustrates a modification example of the temporal change in the polarization conversion efficiency and the applied voltage in the imaging procedure illustrated in FIG. 10. In the present modification example, three or more third drive signals are applied to the electrodes 112 and 114, after the first drive signal and the second drive signal are applied to the electrodes 112 and 114. In other words, in the present modification example, three or more image data Draw are sequentially outputted from the imaging element 12.

Specifically, when the third image data Draw is outputted from the imaging element 12, the drive circuit 15 may apply, to the electrodes 112 and 114, one third drive signal of a plurality of third drive signals. The one third drive signal is closest to the voltage or the frequency of the signal applied to the electrodes 112 and 114 when the second image data Draw is outputted from the imaging element 12. For example, when the third image data Draw is outputted from the imaging element 12, the drive circuit 15 may apply, to the electrodes 112 and 114, one third drive signal (V3a or F3a), which is closest to the voltage V1 or the frequency F2, of the plurality of third drive signals (V3a or F3a, V3b or F3b, and V3c or F3c). Further, the drive circuit 15 applies the plurality of third drive signals to the electrodes 112 and 114, in order of closeness to the voltage or the frequency of the signal applied to the electrodes 112 and 114 when the second image data Draw is outputted from the imaging element 12. The drive circuit 15 may apply, for example, the plurality of third drive signals (V3a or F3a, V3b or F3b, and V3c or F3c) to the electrodes 112 and 114 in order of closeness to the voltage V1 or the frequency F2. This makes it possible to greatly reduce the time necessary for the stepwise exposure.

2.2 Modification Example B (First Drive Signal+Third Drive Signal)

FIG. 14 illustrates a modification example of the temporal change in the polarization conversion efficiency and the applied voltage in the imaging procedure illustrated in FIG. 10. In the present modification example, two image data Draw are sequentially outputted from the imaging element 12. The drive circuit 15 applies the first drive signal to the electrodes 112 and 114 when the first image data Draw is outputted from the imaging element 12. Further, the drive circuit 15 applies the third drive signal to the electrodes 112 and 114 when the second image data Draw is outputted from the imaging element 12. This makes it possible to greatly reduce the time necessary for the stepwise exposure, as compared with a case where the first drive signal is applied to the electrodes 112 and 114 after the third drive signal is applied to the electrodes 112 and 114.

(First Drive Signal+Second Drive Signal)
(Second Drive Signal+First Drive Signal)

It is to be noted that, in the present modification example, the drive circuit 15 may apply one of the first drive signal and the second drive signal to the electrodes 112 and 114 when the first image data Draw is outputted from the imaging element 12. When the second image data Draw is outputted from the imaging element 12, the drive circuit 15 may apply, to the electrodes 112 and 114, the other signal, which is different from the signal applied when the first image data Draw is outputted from the imaging element 12, of the first drive signal and the second drive signal.

2.3 Modification Example C (First Drive Signal+Second Drive Signal+Third Drive Signal)

FIG. 15 illustrates an example of an imaging procedure in the imaging unit 1 illustrated in FIG. 1. Specifically, FIG. 15 illustrates an example of a procedure of performing the stepwise exposure while variably controlling a blur amount of an image. FIG. 15 illustrates an example of a procedure of the stepwise exposure when three image data Draw are sequentially outputted from the imaging element 12. FIG. 16 illustrates an example of temporal change in the polarization conversion efficiency and the applied voltage in the imaging procedure illustrated in FIG. 15. Described below is a modification example of a procedure of performing the stepwise exposure while variably controlling the cut-off frequency fc that is one of parameters defining the blur amount of the image.

In the present modification example, in the imaging procedure illustrated in FIG. 10, the control circuit 22 instructs the imaging device 10 to perform the operation preparation on components such as the AF, before each of the image data Draw is outputted (steps S101, S109, and S110). In accordance with the instruction from the control circuit 22, the drive circuit 15 performs the operation preparation on one or a plurality of optical components (e.g., the lens 13 and the iris 14), before each of the image data Draw is outputted. At this time, the drive circuit 15 causes the imaging device 10 to execute the operation preparation on components such as the AF, after disabling optical action of the liquid-crystal low pass filter 11. In accordance with the instruction from the control circuit 22, the drive circuit 15 applies the drive signal (the first drive signal) that is the voltage V2 or the frequency F1, between the electrodes 112 and 114.

In the present modification example, when three image data Draw are sequentially outputted from the imaging element 12, the third drive signal is applied to the electrodes 112 and 114 after the first drive signal and the second drive signal are applied to the electrodes 112 and 114, as in the embodiment described above. This makes it possible to reduce the waiting time resulting from the response speed of the liquid crystal, as compared with, for example, a case where the voltages are applied to the electrodes 112 and 114 in order of the first drive signal, the third drive signal, and the second drive signal (see FIG. 12). This allows the shooting time $\Delta T1$ illustrated in FIG. 16 to be greatly reduced. It is therefore possible to perform the continuous shooting of still images easily, while changing the cut-off frequency fc.

(First Drive Signal+Second Drive Signal+Three or more Third Drive Signals)

FIG. 17 illustrates a modification example of the temporal change in the applied voltage in the imaging procedure illustrated in FIG. 16. In FIG. 17, a plurality of third drive signals are applied to the electrodes 112 and 114, after the first drive signal and the second drive signal are applied to the electrodes 112 and 114. In other words, in FIG. 17, three or more image data Draw are sequentially outputted from the imaging element 12.

Specifically, when the third image data Draw is outputted from the imaging element 12, the drive circuit 15 applies, to the electrodes 112 and 114, one third drive signal of the plurality of third drive signals. The one third signal is a signal identical to the preparation voltage or a signal of a voltage closest to the preparation voltage. Further, when the third image data Draw is outputted from the imaging element 12, the drive circuit 15 applies, to the electrodes 112 and 114, one third signal of the plurality of third drive signals. The one third signal is a signal identical to the preparation frequency or a signal of a frequency closest to the preparation frequency. For example, when the third image data Draw is outputted from the imaging element 12, the drive circuit 15 may apply, to the electrodes 112 and 114, one third drive signal (V3a or F3a), which is closest to the voltage V2 or the frequency F1, of the plurality of third drive signals (V3a or F3a, V3b or F3b, and V3c or F3c). Further, the drive circuit 15 applies the plurality of third drive signals to the electrodes 112 and 114, in order of closeness to the voltage or the frequency of the signal applied to the electrodes 112 and 114 when the second image data Draw is outputted from the imaging element 12. The drive circuit 15 may apply, for example, the plurality of third drive signals (V3a or F3a, V3b or F3b, and V3c or F3c) to the electrodes 112 and 114 in order of closeness to the voltage V2 or the frequency F1. This makes it possible to greatly reduce the time necessary for the stepwise exposure.

(First Drive Signal+Third Drive Signal)

FIG. 18 illustrates a modification example of the temporal change in the applied voltage in the imaging procedure illustrated in FIG. 16. In FIG. 18, two image data Draw are sequentially outputted from the imaging element 12. The drive circuit 15 applies the first drive signal to the electrodes 112 and 114 when the first image data Draw is outputted from the imaging element 12. Further, the drive circuit 15 applies the third drive signal to the electrodes 112 and 114 when the second image data Draw is outputted from the imaging element 12. This makes it possible to greatly reduce the time necessary for the stepwise exposure, as compared with a case where the first drive signal is applied to the electrodes 112 and 114 after the third drive signal is applied to the electrodes 112 and 114.

2.4 Modification Example D (Second Drive Signal+First Drive Signal+Third Drive Signal)

In the embodiment and modification examples (the modification examples A to C) described above, the drive circuit 15 may perform as follows, when three or more image data Draw are outputted from the imaging element 12. The drive circuit 15 may apply the second drive signal between the electrodes 112 and 114, when the first image data Draw is outputted from the imaging element 12. Further, the drive circuit 15 may apply the first drive signal to the electrodes 112 and 114, when the second image data Draw is outputted from the imaging element 12.

(Second Drive Signal+Third Drive Signal)

In addition, in the above-described modification examples B and C, the drive circuit 15 may perform as follows, when two image data Draw are outputted from the imaging element 12. The drive circuit 15 may apply the second drive signal between the electrodes 112 and 114, when the first image data Draw is outputted from the imaging element 12. Further, the drive circuit 15 may apply the third drive signal to the electrodes 112 and 114, when the second image data Draw is outputted from the imaging element 12.

2.5 Modification Example E (Third Drive Signal (close to First Drive Signal)+Third Drive Signal (close to Second Drive Signal)+Subsequent Drive Signals)

In the embodiment and modification examples A and C described above, the drive circuit 15 may perform as follows, when three or more image data Draw are outputted from the imaging element 12. The drive circuit 15 may apply a signal of a voltage, which is in a range of voltages selectable as the third drive signal, between the electrodes 112 and 114, when the first image data Draw is outputted from the imaging element 12. The voltage of the signal to be applied is close to a voltage selectable as the first drive signal, as compared with a voltage outputted from the drive circuit 15 when the third or subsequent image data Draw is outputted from the imaging element 12. Further, the drive circuit 15 may apply a signal of a voltage, which is in the range of voltages selectable as the third drive signal, between the electrodes 112 and 114, when the second image data Draw is outputted from the imaging element 12. The voltage of the signal to be applied is close to a voltage selectable as the second drive signal, as compared with the voltage outputted from the drive circuit 15 when the third or subsequent image data Draw is outputted from the imaging element 12.

(Third Drive Signal (close to First Drive Signal)+Third Drive Signal (close to Second Drive Signal)+Subsequent Drive Signals)

In the embodiment and modification examples A and C described above, the drive circuit 15 may perform as follows, when three or more image data Draw are outputted from the imaging element 12. The drive circuit 15 may apply a signal of a frequency, which is in a range of frequencies selectable as the third drive signal, between the electrodes 112 and 114, when the first image data Draw is outputted from the imaging element 12. The frequency of the signal to be applied is close to a frequency selectable as the first drive signal, as compared with a frequency outputted from the drive circuit 15 when the third or subsequent image data Draw is outputted from the imaging element 12. Further, the drive circuit 15 may apply a signal of a frequency, which is in the range of frequencies selectable as the third drive signal, between the electrodes 112 and 114, when the second image data Draw is outputted from the imaging element 12. The frequency of the signal to be applied is close to a frequency selectable as the second drive signal, as compared with the frequency outputted from the drive circuit 15 when the third or subsequent image data Draw is outputted from the imaging element 12.

(Third Drive Signal (close to Second Drive Signal)+Third Drive Signal (close to First Drive Signal)+Subsequent Drive Signals)

In the modification example D described above, the drive circuit 15 may perform as follows, when three or more image data Draw are outputted from the imaging element 12. The drive circuit 15 may apply a signal of a voltage, which is in a range of voltages selectable as the third drive signal, between the electrodes 112 and 114, when the first image data Draw is outputted from the imaging element 12. The voltage of the signal to be applied is close to a voltage selectable as the second drive signal, as compared with a voltage outputted from the drive circuit 15 when the third or subsequent image data Draw is outputted from the imaging element 12. Further, the drive circuit 15 may apply a signal of a voltage, which is in the range of voltages selectable as the third drive signal, between the electrodes 112 and 114, when the second image data Draw is outputted from the imaging element 12. The voltage of the signal to be applied is close to a voltage selectable as the first drive signal, as compared with the voltage outputted from the drive circuit 15 when the third or subsequent image data Draw is outputted from the imaging element 12.

(Third Drive Signal (close to Second Drive Signal)+Third Drive Signal (close to First Drive Signal)+Subsequent Drive Signals)

In the modification example D described above, the drive circuit 15 may perform as follows, when three or more image data Draw are outputted from the imaging element 12. The drive circuit 15 may apply a signal of a frequency, which is in a range of frequencies selectable as the third drive signal, between the electrodes 112 and 114, when the first image data Draw is outputted from the imaging element 12. The frequency of the signal to be applied is close to a frequency selectable as the second drive signal, as compared with a frequency outputted from the drive circuit 15 when the third or subsequent image data Draw is outputted from the imaging element 12. Further, the drive circuit 15 may apply a signal of a frequency, which is in the range of frequencies selectable as the third drive signal, between the electrodes 112 and 114, when the second image data Draw is outputted from the imaging element 12. The frequency of the signal to be applied is close to a frequency selectable as the first drive signal, as compared with the frequency outputted from the drive circuit 15 when the third or subsequent image data Draw is outputted from the imaging element 12.

2.6 Modification Example F (First Drive Signal+Third Drive Signal (close to Second Drive Signal)+Subsequent Drive Signals)

In the embodiment and modification examples A and C described above, the drive circuit 15 may perform as follows, when three or more image data Draw are outputted from the imaging element 12. The drive circuit 15 may apply a signal of a voltage, which is in a range of voltages selectable as the third drive signal, between the electrodes 112 and 114, when the second image data Draw is outputted from the imaging element 12. The voltage of the signal to be applied is close to a voltage selectable as the second drive signal, as compared with a voltage outputted from the drive circuit 15 when the third or subsequent image data Draw is outputted from the imaging element 12. Further, in the embodiment and modification examples A and C described above, the drive circuit 15 may perform as follows, when three or more image data Draw are outputted from the imaging element 12. The drive circuit 15 may apply a signal of a frequency, which is in a range of frequencies selectable as the third drive signal, between the electrodes 112 and 114, when the second image data Draw is outputted from the imaging element 12. The frequency of the signal to be applied is close to a frequency selectable as the second drive signal, as compared with a frequency outputted from the drive circuit 15 when the third or subsequent image data Draw is outputted from the imaging element 12.

(Second Drive Signal+Third Drive Signal (close to First Drive Signal)+Subsequent Drive Signals)

In the modification example D described above, the drive circuit 15 may perform as follows, when three or more image data Draw are outputted from the imaging element 12. The drive circuit 15 may apply a signal of a voltage, which is in a range of voltages selectable as the third drive signal, between the electrodes 112 and 114, when the second image data Draw is outputted from the imaging element 12. The voltage of the signal to be applied is close to a voltage selectable as the first drive signal, as compared with a voltage outputted from the drive circuit 15 when the third or subsequent image data Draw is outputted from the imaging element 12. Further, in the modification example D described above, the drive circuit 15 may perform as follows, when three or more image data Draw are outputted from the imaging element 12. The drive circuit 15 may apply a signal of a frequency, which is in a range of frequencies selectable as the third drive signal, between the electrodes 112 and 114, when the second image data Draw is outputted from the imaging element 12. The frequency of the signal to be applied is close to a frequency selectable as the first drive signal, as compared with a frequency outputted from the drive circuit 15 when the third or subsequent image data Draw is outputted from the imaging element 12.

2.7 Modification Example G (Third Drive Signal (close to First Drive Signal)+Third Drive Signal (close to Second Drive Signal))

In the modification examples B and C described above, the drive circuit 15 may perform as follows, when two image data Draw are outputted from the imaging element 12. The drive circuit 15 may apply a signal of a voltage, which is in a range of voltages selectable as the third drive signal, between the electrodes 112 and 114, when the first image data Draw is outputted from the imaging element 12. The voltage of the signal to be applied is close to a voltage selectable as the first drive signal, as compared with a voltage outputted from the drive circuit 15 when the second image data Draw is outputted from the imaging element 12. In other words, in the modification examples B and C described above, the drive circuit 15 may perform as follows, when the two image data Draw are outputted from the imaging element 12. The drive circuit 15 may apply a signal of a voltage, which is in a range of voltages selectable as the third drive signal, between the electrodes 112 and 114, when the first image data Draw is outputted from the imaging element 12. The voltage of the signal to be applied is relatively close to the voltage selectable as the first drive signal.

Further, in the modification examples B and C described above, the drive circuit 15 may perform as follows, when the two image data Draw are outputted from the imaging element 12. The drive circuit 15 may apply a signal of a voltage, which is in the range of voltages selectable as the third drive signal, between the electrodes 112 and 114, when the second image data Draw is outputted from the imaging element 12. The voltage of the signal to be applied is close to a voltage selectable as the second drive signal, as compared with a voltage outputted from the drive circuit 15 when the first image data Draw is outputted from the imaging element 12. In other words, in the modification examples B and C described above, the drive circuit 15 may perform as follows, when the two image data Draw are outputted from the imaging element 12. The drive circuit 15 may apply a signal of a voltage, which is in the range of voltages selectable as the third drive signal, between the electrodes 112 and 114, when the second image data Draw is outputted from the imaging element 12. The voltage of the signal to be applied is relatively close to the voltage selectable as the second drive signal.

(Third Drive Signal (close to First Drive Signal)+Third Drive Signal (close to Second Drive Signal))

In the modification examples B and C described above, the drive circuit 15 may perform as follows, when the two image data Draw are outputted from the imaging element 12. The drive circuit 15 may apply a signal of a frequency, which is in a range of frequencies selectable as the third drive signal, between the electrodes 112 and 114, when the first image data Draw is outputted from the imaging element 12. The frequency of the signal to be applied is close to a frequency selectable as the first drive signal, as compared with a frequency outputted from the drive circuit 15 when the second image data Draw is outputted from the imaging element 12. In other words, in the modification examples B and C described above, the drive circuit 15 may perform as follows, when the two image data Draw are outputted from the imaging element 12. The drive circuit 15 may apply a signal of a frequency, which is in the range of frequencies selectable as the third drive signal, between the electrodes 112 and 114, when the first image data Draw is outputted from the imaging element 12. The frequency of the signal to be applied is relatively close to the frequency selectable as the first drive signal.

Further, in the modification examples B and C described above, the drive circuit 15 may perform as follows, when the two image data Draw are outputted from the imaging element 12. The drive circuit 15 may apply a signal of a frequency, which is in a range of frequencies selectable as the third drive signal, between the electrodes 112 and 114, when the second image data Draw is outputted from the imaging element 12. The frequency of the signal to be applied is close to a frequency selectable as the second drive signal, as compared with the frequency outputted from the drive circuit 15 when the first image data Draw is outputted from the imaging element 12. In other words, in the modification examples B and C described above, the drive circuit 15 may perform as follows, when the two image data Draw are outputted from the imaging element 12. The drive circuit 15 may apply a signal of a frequency, which is in the range of frequencies selectable as the third drive signal, between the electrodes 112 and 114, when the second image data Draw is outputted from the imaging element 12. The frequency of the signal to be applied is relatively close to the frequency selectable as the second drive signal.

(Third Drive Signal (close to Second Drive Signal)+Third Drive Signal (close to First Drive Signal))

In the modification example D described above, the drive circuit 15 may perform as follows, when two image data Draw are outputted from the imaging element 12. The drive circuit 15 may apply a signal of a voltage, which is in a range of voltages selectable as the third drive signal, between the electrodes 112 and 114, when the first image data Draw is outputted from the imaging element 12. The voltage of the signal to be applied is close to a voltage selectable as the second drive signal, as compared with a voltage outputted from the drive circuit 15 when the second image data Draw is outputted from the imaging element 12. In other words, in the modification example D described above, the drive circuit 15 may perform as follows, when the two image data Draw are outputted from the imaging element 12. The drive circuit 15 may apply a signal of a voltage, which is in the range of voltages selectable as the third drive signal, between the electrodes 112 and 114, when the first image data Draw is outputted from the imaging element 12. The voltage of the signal to be applied is relatively close to the voltage selectable as the second drive signal.

Further, in the modification example D described above, the drive circuit 15 may perform as follows, when the two image data Draw are outputted from the imaging element 12. The drive circuit 15 may apply a signal of a voltage, which is in a range of voltages selectable as the third drive signal, between the electrodes 112 and 114, when the second image data Draw is outputted from the imaging element 12. The voltage of the signal to be applied is close to a voltage selectable as the first drive signal, as compared with a voltage outputted from the drive circuit 15 when the first image data Draw is outputted from the imaging element 12. In other words, in the modification example D described above, the drive circuit 15 may perform as follows, when the two image data Draw are outputted from the imaging element 12. The drive circuit 15 may apply a signal of a voltage, which is in the range of voltages selectable as the third drive signal, between the electrodes 112 and 114, when the second image data Draw is outputted from the imaging element 12. The voltage of the signal to be applied is relatively close to the voltage selectable as the first drive signal.

(Third Drive Signal (close to Second Drive Signal)+Third Drive Signal (close to First Drive Signal))

In the modification example D described above, the drive circuit 15 may perform as follows, when two image data Draw are outputted from the imaging element 12. The drive circuit 15 may apply a signal of a frequency, which is in a range of frequencies selectable as the third drive signal, between the electrodes 112 and 114, when the first image data Draw is outputted from the imaging element 12. The frequency of the signal to be applied is close to a frequency selectable as the second drive signal, as compared with a frequency outputted from the drive circuit 15 when the second image data Draw is outputted from the imaging element 12. In other words, in the modification example D described above, the drive circuit 15 may perform as follows, when the two image data Draw are outputted from the imaging element 12. The drive circuit 15 may apply a signal of a frequency, which is in the range of frequencies selectable as the third drive signal, between the electrodes 112 and 114, when the first image data Draw is outputted from the imaging element 12. The frequency of the signal to be applied is relatively close to the frequency selectable as the second drive signal.

Further, in the modification example D described above, the drive circuit 15 may perform as follows, when the two image data Draw are outputted from the imaging element 12. The drive circuit 15 may apply a signal of a frequency, which is in a range of frequencies selectable as the third drive signal, between the electrodes 112 and 114, when the second image data Draw is outputted from the imaging element 12. The frequency of the signal to be applied is close to a frequency selectable as the first drive signal, as compared with a frequency outputted from the drive circuit 15 when the first image data Draw is outputted from the imaging element 12. In other words, in the modification example D described above, the drive circuit 15 may perform as follows, when the two image data Draw are outputted from the imaging element 12. The drive circuit 15 may apply a signal of a frequency, which is in the range of frequencies selectable as the third drive signal, between the electrodes 112 and 114, when the second image data Draw is outputted from the imaging element 12. The frequency of the signal to be applied is relatively close to the frequency selectable as the first drive signal.

2.8 Modification Example H

FIG. 19 illustrates a modification example of the optic axes AX1 and AX2 of the birefringent plates 11 and 15. In the birefringent plates 111 and 115 of the present modification example, the image separation directions are identical. The optic axis AX1 of the birefringent plate 111 and the optic axis AX2 of the birefringent plate 115 are parallel to each other in a plane parallel to the normal 111A to the light input surface 110A. The optic axes AX1 and AX2 obliquely intersect the normal 111A to the light input surface 110A. An angle θ2 formed by the optic axis AX1 and the normal 11A may be, for example, a counterclockwise angle of smaller than 90 degrees from the normal 111A. The angle θ2 may be, for example, 45 degrees. An angle θ3 formed by the optic axis AX2 and the normal 111A may be, for example, a counterclockwise angle of smaller than 90 degrees from the normal 111A. The angle θ3 may be, for example, 45 degrees.

Described next is optical action of the liquid-crystal low pass filter 11 (specifically, the pair of birefringent plates 111 and 115 and the liquid crystal layer 113) according to the present modification example. FIGS. 20A, 20B, and 20C each illustrate an example of action of the liquid-crystal low pass filter 11 according to the present modification example. In FIG. 20A, the voltage V between the electrodes 112 and 114 is the voltage V1, or the frequency F between the electrodes 112 and 114 is the frequency F2. In FIG. 20B, the voltage V between the electrodes 112 and 114 is the voltage V2, or the frequency F between the electrodes 112 and 114 is the frequency F1. In FIG. 20C, the voltage V between the electrodes 112 and 114 is the voltage V3, or the frequency F between the electrodes 112 and 114 is the frequency F3.

(Case where V=V1 or F=F2 (FIG. 20A))

Action of the birefringent plate 111 for the input light L1 and action for the p-polarized light and the s-polarized light resulting from separation at the birefringent plate 111 are similar to those described above. Action of the birefringent plate 115 therefore will be described below. When the s-polarized light and the p-polarized light enter the birefringent plate 115 after passing through the liquid crystal layer 113, the separation width of the s-polarized light and the p-polarized light changes by the birefringence property of the birefringent plate 115. When a polarized component oscillating perpendicularly to the optic axis AX2 of the birefringent plate 115 is the s-polarized light, the s-polarized light travels straight in the birefringent plate 115 without being affected by the birefringence. The s-polarized light then exits from the back surface of the birefringent plate 115. The p-polarized light oscillates in a direction orthogonal to the oscillation direction of the s-polarized light. The p-polarized light therefore obliquely travels, in the birefringent plate 115, in a direction same as the image separation direction in the birefringent plate 111, by the influence of the birefringence. Further, the p-polarized light is refracted at a position shifted by the separation width d2 on the back surface of the birefringent plate 115. The p-polarized light then exists from the back surface of the birefringent plate 115. The birefringent plate 115 therefore separates the s-polarized light and the p-polarized light having passed through the liquid crystal layer 113 into the transmitted light L2 of the s-polarized light and the transmitted light L2 of the p-polarized light, with a separation width (d1−d2). Here, in the case where d1=d2, the transmitted light L2 of the s-polarized light and the transmitted light L2 of the p-polarized light exit from a same position on the back surface of the birefringent plate 115. In this case, the birefringent plate 115 therefore combines the s-polarized light and the p-polarized light having passed through the liquid crystal layer 113.

(Case where V=V2 or F=F1 (FIG. 20B))

Action of the birefringent plate 111 for the input light L1 and action for the p-polarized light and the s-polarized light resulting from separation at the birefringent plate 111 are similar to those described above. Action of the birefringent plate 115 therefore will be described below. When the s-polarized light and the p-polarized light enter the birefringent plate 115 after passing through the liquid crystal layer 113, the separation width of the s-polarized light and the p-polarized light changes by the birefringence property of the birefringent plate 115. When a polarized component oscillating perpendicularly to the optic axis AX2 of the birefringent plate 115 is the s-polarized light, the s-polarized light travels straight in the birefringent plate 115 without being affected by the birefringence. The s-polarized light then exits from the back surface of the birefringent plate 115. The p-polarized light oscillates in a direction orthogonal to the oscillation direction of the s-polarized light. The p-polarized light therefore obliquely travels, in the birefringent plate 115, in a direction same as the image separation direction in the birefringent plate 111, by the influence of the birefringence. Further, the p-polarized light is refracted at a position shifted by the separation width d2 on the back surface of the birefringent plate 115. The p-polarized light then exists from the back surface of the birefringent plate 115. The birefringent plate 115 therefore separates the s-polarized light and the p-polarized light having passed through the liquid crystal layer 113 into the transmitted light L2 of the s-polarized light and the transmitted light L2 of the p-polarized light, with a separation width (d1+d2).

(Case where V=V3 or F=F3 (FIG. 20C))

Action of the birefringent plate 111 for the input light L1 and action for the p-polarized light and the s-polarized light resulting from separation at the birefringent plate 111 are similar to those described above. Action of the birefringent plate 115 therefore will be described below. When the circularly polarized light outputted from the liquid crystal layer 113 enters the birefringent plate 115, the circularly polarized light is separated into the p-polarized light and the s-polarized light with the separation width d2, by the birefringence property of the birefringent plate 115. When a polarized component oscillating perpendicularly to the optic axis AX2 of the birefringent plate 115 is the s-polarized light, the s-polarized light travels straight in the birefringent plate 115 without being affected by the birefringence. The s-polarized light then exits from the back surface of the birefringent plate 115. The p-polarized light oscillates in a direction orthogonal to the oscillation direction of the s-polarized light. The p-polarized light therefore obliquely travels, in the birefringent plate 115, in a direction same as the image separation direction in the birefringent plate 111, by the influence of the birefringence. Further, the p-polarized light is refracted at a position shifted by the separation width d2 on the back surface of the birefringent plate 115. The p-polarized light then exists from the back surface of the birefringent plate 115. The birefringent plate 115 therefore separates each of the circularly polarized light converted from the p-polarized light and the circularly polarized light converted from the s-polarized light into the transmitted light L2 of the s-polarized light and the transmitted light L2 of the p-polarized light, with the separation width d2.

Here, in the case where d1=d2, the p-polarized light separated from the circularly polarized light converted from the p-polarized light at the liquid crystal layer 113 and the s-polarized light separated from the circularly polarized light converted from the s-polarized light at the liquid crystal layer 113 exit from a same position on the back surface of the birefringent plate 115. In this case, the transmitted light L2 of the circularly polarized light exits from the back surface of the birefringent plate 115. In this case, the birefringent plate 115 therefore separates the two circularly polarized lights outputted from the liquid crystal layer 113 with a separation width (d2+d2) into the transmitted light L2 of the p-polarized light and the transmitted light L2 of the s-polarized light. After the separation, the birefringent plate 115 combines the p-polarized light and the s-polarized light, at a position between the transmitted light L2 of the p-polarized light and the transmitted light L2 of the s-polarized light.

In the present modification example as well, the cut-off frequency fc changes in the method (the peak-value modulation method) different from the typical method (the separation-width modulation method) of changing the ps separation width of the transmitted light. Further, in the present modification example as well, it is possible to change the cut-off frequency fc, by changing the value of each of the three peaks p1 to p3 or the four peaks p1 to p4 caused in the point-image intensity distribution of the transmitted light, in accordance with the magnitude of the voltage V3 or the frequency F3 applied between the electrodes 112 and 114. It is therefore possible to set a cut-off frequency different from the cut-off frequency initially set, only by changing the magnitude of the voltage V3 or the frequency F3 applied between the electrodes 112 and 114. Hence, the liquid-crystal low pass filter 11 according to the present modification example has a configuration that makes it possible to change the cut-off frequency fc without preparing a new optical component.

2.9 Modification Example I

FIG. 21A illustrates an example of the polarization conversion efficiency curve (the V-T curve) of the liquid crystal layer 113. FIG. 21B illustrates an example of the polarization conversion efficiency curve (the F-T curve) of the liquid crystal layer 113. In FIG. 21A, a horizontal axis indicates the voltage V applied between the electrodes 112 and 114 (the constant frequency). In FIG. 21B, a horizontal axis indicates the frequency F of the voltage applied between the electrodes 112 and 114 (the constant voltage). In each of FIG. 21A and FIG. 21B, a vertical axis indicates the polarization conversion efficiency T.

In the liquid crystal layer 113 according to the present modification example, when the voltage V1 is applied between the electrodes 112 and 114, the polarization conversion efficiency T becomes T1, as illustrated in FIG. 21A. T1 is 0%. When the p-polarized light and the s-polarized light enter the liquid crystal layer 113 where the polarization conversion efficiency is T1, the p-polarized light and the s-polarized light travel straight in the liquid crystal layer 113 without being subjected to polarization conversion by the liquid crystal layer 113, and then exit from the back surface of the liquid crystal layer 113. The liquid crystal layer 113 therefore does not optically act on the p-polarized light and the s-polarized light. A polarization state (a state where the light entering the liquid crystal layer 113 is not optically rotated) of the liquid crystal layer 113 at this time corresponds to a specific example of the "second polarization state" of the technology. In the liquid crystal layer 113 according to the present modification example, as illustrated in FIG. 21A, the polarization conversion efficiency T becomes T2 when the voltage V2 (V1<V2) is applied between the electrodes 112 and 114. T2 is 100%. When the p-polarized light enters the liquid crystal layer 113 where the polarization conversion efficiency is T2, the p-polarized light is converted into the s-polarized light. This s-polarized light travels straight in the liquid crystal layer 113, and then exists from the back surface of the liquid crystal layer 113. When the s-polarized light resulting from the separation at the birefringent plate 111 enters the liquid crystal layer 113 where the polarization conversion efficiency is T2, the s-polarized light is converted into the p-polarized light. This p-polarized light travels straight in the liquid crystal layer 113 and then exits from the back surface of the liquid crystal layer 113. The liquid crystal layer 113 therefore performs the ps conversion on the p-polarized light and the s-polarized light resulting from the separation at the birefringent plate 111. A polarization state (a state where the light entering the liquid crystal layer 113 is optically rotated 90 degrees) of the liquid crystal layer 113 at this time corresponds to a specific example of the "first polarization state" of the technology. Further, as illustrated in FIG. 21A, when the voltage V3 (V1<V3<V2) is applied between the electrodes 112 and 114, the polarization conversion efficiency T becomes T3 in the liquid crystal layer 113. T3 is a value greater than 0% and smaller than 100%. FIG. 21A illustrates, as an example, a case where the voltage V3 is a voltage when T3 is 50%. When the p-polarized light enters the liquid crystal layer 113 where the polarization conversion efficiency is T3 (=50%), the p-polarized light is converted into the circularly polarized light. This circularly polarized light travels straight in the liquid crystal layer 113, and then exists from the back surface of the liquid crystal layer 113. When the s-polarized light resulting from the separation at the birefringent plate 111 enters the liquid crystal layer 113 where the polarization conversion efficiency is T3 (=50%), the s-polarized light is also converted into the circularly polarized light. This circularly polarized light also travels straight in the liquid crystal layer 113, and then exits from the back surface of the liquid crystal layer 113. The liquid crystal layer 113 thus converts the p-polarized light and the s-polarized light into the circularly polarized light. A polarization state of the liquid crystal layer 113 at this time corresponds to a specific example of a "third polarization state" of the technology. Here, the voltage V1 is a voltage equal to or less than a voltage at a rise position of the polarization conversion efficiency curve. Specifically, the voltage V1 indicates a voltage in a section where the polarization conversion efficiency is saturated near a minimum value in the polarization conversion efficiency curve. The voltage V2 is a voltage equal to or more than a voltage at a fall position of the polarization conversion efficiency curve. Specifically, the voltage V2 indicates a voltage in a section where the polarization conversion efficiency is saturated near a maximum value in the polarization conversion efficiency curve. The voltage V3 is a voltage larger than the voltage at the rise position of the polarization conversion efficiency curve and smaller than the voltage at the fall position of the polarization conversion efficiency curve. The voltage V3 is a voltage between a rise and a fall of the polarization conversion efficiency curve (i.e., the intermediate voltage).

In the liquid crystal layer 113, as illustrated in FIG. 21B, the polarization conversion efficiency T becomes T1 when the voltage of the frequency F2 is applied between the electrodes 112 and 114. Further, the polarization conversion efficiency T becomes T2 when the voltage of the frequency F1 (F1<F2) is applied between the electrodes 112 and 114. Furthermore, in the liquid crystal layer 113, the polarization conversion efficiency T becomes T3 when the voltage of the frequency F3 (F1<F3<F2) is applied between the electrodes 112 and 114, as illustrated in FIG. 21B. FIG. 21B illustrates, as an example, a case where the frequency F3 is a frequency when T3 is 50%. Here, the frequency F1 is a frequency equal to or less than a frequency at a fall position of the polarization conversion efficiency curve. Specifically, the frequency F1 indicates a frequency in a section where the polarization conversion efficiency is saturated near a maximum value in the polarization conversion efficiency curve. The frequency F2 is a frequency equal to or more than a frequency at a rise position of the polarization conversion efficiency curve. Specifically, the frequency F2 indicates a frequency in a section where the polarization conversion efficiency is saturated near a minimum value in the polarization conversion efficiency curve. The frequency F3 is a frequency larger than the frequency at the fall position of the polarization conversion efficiency curve and smaller than the frequency at the rise position of the polarization conversion efficiency curve. The frequency F3 is a frequency between a rise and a fall of the polarization conversion efficiency curve (i.e., the intermediate voltage).

As described above, the liquid crystal layer 113 controls the polarization. Examples of the liquid crystal having the polarization conversion efficiency curve as described above may include a vertical alignment (VA) liquid crystal. The VA liquid crystal is configured of a negative nematic liquid crystal. In the VA liquid crystal, it is possible to change a polarization direction of passing light, by changing a phase of the passing light with use of the birefringence property of the nematic liquid crystal. The liquid-crystal low pass filter 11 may have, for example, a film made of an inorganic substance represented by silicon oxide, as an alignment film that regulates the orientation of the liquid crystal layer 113.

Next, the stepwise exposure in the imaging unit 1 according to the present modification example will be described.

FIG. 22 illustrates an example of an imaging procedure in the imaging unit 1 according to the present modification example. Specifically, FIG. 22 illustrates an example of a procedure of performing the stepwise exposure while variably controlling a blur amount of an image. FIG. 22 illustrates an example of a procedure of the stepwise exposure when three image data Draw are sequentially outputted from the imaging element 12. FIG. 23 illustrates an example of temporal change in the polarization conversion efficiency and the applied voltage in the imaging procedure illustrated in FIG. 22. Described below is an example of a procedure of performing the stepwise exposure while variably controlling the cut-off frequency fc that is one of parameters defining the blur amount of the image. The image data D1, D2, and D3 in the figure and the following paragraphs are image data generated by the preprocessing circuit 21, and correspond to the three image data D that have different blur amounts of the image.

First, the imaging unit 1 according to the present modification example performs operation preparation (step S201). Specifically, the control circuit 22 instructs the imaging device 10 to perform the operation preparation on components such as the AF. Then, in accordance with the instruction from the control circuit 22, the drive circuit 15 performs the operation preparation on one or a plurality of optical components (e.g., the lens 13 and the iris 14), before the first image data Draw is outputted. For example, the drive circuit 15 may set each of the condition for the focus of the lens 13 and the condition for the iris 14, to a predetermined value. At this time, the drive circuit 15 causes the imaging device 10 to execute the operation preparation on components such as the AF, after disabling optical action of the liquid-crystal low pass filter 11. For example, in accordance with the instruction from the control circuit 22, the drive circuit 15 may apply a drive signal (the second drive signal) that is the voltage V1 or the frequency F2, between the electrodes 112 and 114.

Next, the imaging unit 1 according to the present modification example acquires the image data D1 under a condition A1 (step S202). The condition A1 indicates setting a signal, which is identical to the preparation voltage or the preparation frequency to be applied between the electrodes 112 and 114 when the operation preparation is performed on one or a plurality of optical components (e.g., the lens 13) before output of the first image data Draw, or a signal of a voltage or a frequency closest to the preparation voltage or the preparation frequency, as the voltage or the frequency to be applied between the electrodes 112 and 114. In the present modification example, the condition A1 indicates setting the drive signal (the first drive signal) that is the voltage V1 or the frequency F2, as the voltage V or the frequency F to be applied between the electrodes 112 and 114.

Specifically, the control circuit 22 instructs the imaging device 10 to set the condition A1. Then, in accordance with the instruction from the control circuit 22, the drive circuit 15 applies the drive signal (the second drive signal) that is the voltage V1 or the frequency F2, between the electrodes 112 and 114. This causes the polarization conversion efficiency of the liquid crystal layer 113 to be T1. Further, the control circuit 22 instructs the imaging element 12 to perform imaging. Specifically, the control circuit 22 instructs the imaging element 12 to perform the imaging in a stage where the polarization conversion efficiency of the liquid crystal layer 113 becomes T1. As a result, the control circuit 22 acquires the image data D1 under the condition A1, through the preprocessing circuit 21. The imaging unit 1 then stores the image data D1 (step S203). Specifically, the control circuit 22 stores the image data D1 in the memory 40.

The imaging unit 1 subsequently acquires the image data D2 under a condition A2 (step S204). The condition A2 indicates setting a signal different from the signal (the condition A1) when the first image data Draw is outputted from the imaging element 12, as the voltage or the frequency to be applied between the electrodes 112 and 114. In the present modification example, the condition A2 indicates setting a drive signal (the first drive signal) that is the voltage V2 or the frequency F1, as the voltage or the frequency to be applied between the electrodes 112 and 114. In other words, the condition A2 indicates setting the first drive signal out of the first drive signal and the second drive signal, as the voltage or the frequency to be applied between the electrodes 112 and 114.

Specifically, the control circuit 22 instructs the imaging device 10 to set the condition A2. Then, in accordance with the instruction from the control circuit 22, the drive circuit 15 applies the drive signal (the first drive signal) that is the voltage V2 or the frequency F1, between the electrodes 112 and 114. This changes the polarization conversion efficiency of the liquid crystal layer 113 from T1 to T2. Further, the control circuit 22 instructs the imaging element 12 to perform imaging. Specifically, the control circuit 22 instructs the imaging element 12 to perform the imaging in a stage where the polarization conversion efficiency of the liquid crystal layer 113 becomes T2. As a result, the control circuit 22 acquires the image data D2 under the condition A2, through the preprocessing circuit 21. The imaging unit 1 then stores the image data D2 (step S205). Specifically, the control circuit 22 stores the image data D2 in the memory 40.

Finally, the imaging unit 1 acquires the image data D3 under a condition A3 (step S206). The condition A3 indicates setting the intermediate voltage or the intermediate frequency, as the voltage or the frequency to be applied between the electrodes 112 and 114. In the present modification example, the condition A3 indicates setting a drive signal (the third drive signal) that is the voltage V3 or the frequency F3, as the voltage or the frequency to be applied between the electrodes 112 and 114.

Specifically, the control circuit 22 instructs the imaging device 10 to set the condition A3. Then, in accordance with the instruction from the control circuit 22, the drive circuit 15 applies the drive signal (the third drive signal) that is the voltage V3 or the frequency F3, between the electrodes 112 and 114. This changes the polarization conversion efficiency of the liquid crystal layer 113 from T2 to T3. Further, the control circuit 22 instructs the imaging element 12 to perform imaging. Specifically, the control circuit 22 instructs the imaging element 12 to perform the imaging in a stage where the polarization conversion efficiency of the liquid crystal layer 113 becomes T3. As a result, the control circuit 22 acquires the image data D3 under the condition A3, through the preprocessing circuit 21. The imaging unit 1 then stores the image data D3 (step S207). Specifically, the control circuit 22 stores the image data D3 in the memory 40. Finally, the control circuit 22 outputs the acquired image data D1, D2, and D3 to the display processing circuit 23, thereby allowing the display 30 to display these image data (step S208). The stepwise exposure is thus executed in the imaging unit 1. It is to be noted that the imaging unit 1 may perform the above-described stepwise exposure as bracket shooting to be performed automatically in accordance with an instruction (e.g., a press of the shutter button) from a user. In addition, the imaging unit 1 may perform the above-described stepwise exposure as continuous shooting to be performed in accordance with manual operation by the user.

Next, effects of the imaging unit 1 according to the present modification example will be described. In the present modification example as well, the cut-off frequency fc changes in the method (the peak-value modulation method) different from the typical method (the separation-width modulation method) of changing the ps separation width of the transmitted light. Further, in the present modification example as well, it is possible to change the cut-off frequency fc, by changing the value of each of the three peaks p1 to p3 or the four peaks p1 to p4 caused in the point-image intensity distribution of the transmitted light, in accordance with the magnitude of the voltage V3 or the frequency F3 applied between the electrodes 112 and 114. It is therefore possible to set a cut-off frequency different from the cut-off frequency initially set, only by changing the magnitude of the voltage V3 or the frequency F3 applied between the electrodes 112 and 114. Hence, the liquid-crystal low pass filter 11 according to the present modification example has a configuration that makes it possible to change the cut-off frequency fc without preparing a new optical component.

FIG. 24 illustrates a modification example of the temporal change in the polarization conversion efficiency and the applied voltage in the imaging procedure illustrated in FIG. 22. In FIG. 24, a plurality of third drive signals are applied to the electrodes 112 and 114, after the first drive signal and the second drive signal are applied to the electrodes 112 and 114. In other words, in FIG. 24, three or more image data Draw are sequentially outputted from the imaging element 12.

Specifically, when the third image data Draw is outputted from the imaging element 12, the drive circuit 15 applies, to the electrodes 112 and 114, one third drive signal of the plurality of third drive signals. The one third drive signal is closest to a voltage or a frequency of a signal applied to the electrodes 112 and 114 when the second image data Draw is outputted from the imaging element 12. For example, when the third image data Draw is outputted from the imaging element 12, the drive circuit 15 may apply, to the electrodes 112 and 114, one third drive signal (V3a or F3a), which is closest to the voltage V2 or the frequency F1, of the plurality of third drive signals (V3a or F3a, V3b or F3b, and V3c or F3c). Furthermore, the drive circuit 15 applies the plurality of third drive signals to the electrodes 112 and 114, in order of closeness to the voltage or the frequency of the signal applied to the electrodes 112 and 114 when the second image data Draw is outputted from the imaging element 12. The drive circuit 15 may apply, for example, the plurality of third drive signals (V3a or F3a, V3b or F3b, and V3c or F3c) to the electrodes 112 and 114 in order of closeness to the voltage V2 or the frequency F1. This makes it possible to greatly reduce the time necessary for the stepwise exposure.

FIG. 25 illustrates a modification example of the temporal change in the polarization conversion efficiency and the applied voltage in the imaging procedure illustrated in FIG. 22. In FIG. 25, two image data Draw are sequentially outputted from the imaging element 12. The drive circuit 15 applies the second drive signal to the electrodes 112 and 114, when the first image data Draw is outputted from the imaging element 12. Further, the drive circuit 15 applies the third drive signal to the electrodes 112 and 114, when the second image data Draw is outputted from the imaging element 12. This makes it possible to greatly reduce the time necessary for the stepwise exposure, as compared with a case where the second drive signal is applied to the electrodes 112 and 114 after the third drive signal is applied to the electrodes 112 and 114.

FIG. 26 illustrates an example of an imaging procedure in the imaging unit including the liquid crystal layer having the polarization conversion efficiency curve illustrated in FIG. 21A or FIG. 21B. Specifically, FIG. 26 illustrates an example of a procedure of performing the stepwise exposure while variably controlling a blur amount of an image. FIG. 26 illustrates an example of a procedure of the stepwise exposure when three image data Draw are sequentially outputted from the imaging element 12. FIG. 27 illustrates an example of temporal change in the applied voltage in the imaging procedure illustrated in FIG. 26. Described below is a modification example of a procedure of performing the stepwise exposure while variably controlling the cut-off frequency fc that is one of parameters defining the blur amount of the image.

In the present modification example, in the imaging procedure illustrated in FIG. 26, the control circuit 22 instructs the imaging device 10 to perform the operation preparation on components such as the AF, before each of the image data Draw is outputted (steps S201, S209, and S210). In accordance with the instruction from the control circuit 22, the drive circuit 15 performs the operation preparation on one or a plurality of optical components (e.g., the lens 13 and the iris 14), before each of the image data Draw is outputted. At this time, the drive circuit 15 causes the imaging device 10 to execute the operation preparation on components such as the AF, after disabling optical action of the liquid-crystal low pass filter 11. In accordance with the instruction from the control circuit 22, the drive circuit 15 applies the drive signal (the second drive signal) that is the voltage V1 or the frequency F2, between the electrodes 112 and 114.

In the present modification example, when three image data Draw are sequentially outputted from the imaging element 12, the third drive signal is applied to the electrodes 112 and 114 after the first drive signal and the second drive signal are applied to the electrodes 112 and 114, as in the embodiment described above. This makes it possible to reduce the waiting time resulting from the response speed of the liquid crystal, as compared with, for example, a case where the voltages are applied to the electrodes 112 and 114 in order of the first drive signal, the third drive signal, and the second drive signal (see FIG. 12). This allows the shooting time ΔT1 illustrated in FIG. 27 to be greatly reduced. It is therefore possible to perform the continuous shooting of still images easily, while changing the cut-off frequency fc.

FIG. 28 illustrates a modification example of the temporal change in the applied voltage in the imaging procedure illustrated in FIG. 26. In FIG. 28, a plurality of third drive signals are applied to the electrodes 112 and 114, after the first drive signal and the second drive signal are applied to the electrodes 112 and 114. In other words, in FIG. 28, three or more image data Draw are sequentially outputted from the imaging element 12.

Specifically, when the third image data Draw is outputted from the imaging element 12, the drive circuit 15 applies, to the electrodes 112 and 114, one third drive signal of the plurality of third drive signals. The one third signal is a signal identical to the preparation voltage or the preparation frequency, or a signal of a voltage or a frequency closest to the preparation voltage or the preparation frequency. For example, when the third image data Draw is outputted from the imaging element 12, the drive circuit 15 may apply, to the electrodes 112 and 114, the third drive signal (V3a or F3a), which is closest to the voltage V1 or the frequency F2, of the plurality of third drive signals (V3a or F3a, V3b or F3b, and V3c or F3c). Furthermore, the drive circuit 15 applies the plurality of third drive signals to the electrodes 112 and 114, in order of closeness to the voltage or the frequency of the signal applied to the electrodes 112 and 114 when the second image data Draw is outputted from the imaging element 12. The drive circuit 15 may apply, for example, the plurality of third drive signals (V3a or F3a, V3b or F3b, and V3c or F3c) to the electrodes 112 and 114 in order of closeness to the voltage V1 or the frequency F2. This makes it possible to greatly reduce the time necessary for the stepwise exposure.

FIG. 29 illustrates a modification example of the temporal change in the applied voltage in the imaging procedure illustrated in FIG. 26. In FIG. 29, two image data Draw are sequentially outputted from the imaging element 12. The drive circuit 15 applies the second drive signal to the electrodes 112 and 114, when the first image data Draw is outputted from the imaging element 12. Further, the drive circuit 15 applies the third drive signal to the electrodes 112 and 114, when the second image data Draw is outputted from the imaging element 12. This makes it possible to greatly reduce the time necessary for the stepwise exposure, as compared with a case where the second drive signal is applied to the electrodes 112 and 114 after the third drive signal is applied to the electrodes 112 and 114.

2.10 Modification Example J

In the modification example H described above, the drive circuit 15 may apply the first drive signal between the electrodes 112 and 114, when the first image data Draw is outputted from the imaging element 12. Further, the drive circuit 15 may apply the second drive signal to the electrodes 112 and 114, when the second image data Draw is outputted from the imaging element 12.

2.11 Modification Example K

In the modification example I described above, the drive circuit 15 may perform as follows, when three or more image data Draw are outputted from the imaging element 12. The drive circuit 15 may apply a signal of a voltage or a frequency, which is in a range of voltages or frequencies selectable as the third drive signal, between the electrodes 112 and 114, when the first image data Draw is outputted from the imaging element 12. The voltage or the frequency of the signal to be applied is close to a voltage or a frequency selectable as the second drive signal, as compared with a voltage or a frequency outputted from the drive circuit 15 when the third or subsequent image data Draw is outputted from the imaging element 12. Further, the drive circuit 15 may apply a signal of a voltage or a frequency, which is in the range of voltages or frequencies selectable as the third drive signal, between the electrodes 112 and 114, when the second image data Draw is outputted from the imaging element 12. The voltage or the frequency of the signal to be applied is close to a voltage or a frequency selectable as the first drive signal, as compared with the voltage or the frequency outputted from the drive circuit 15 when the third or subsequent image data Draw is outputted from the imaging element 12.

2.12 Modification Example L

In the modification example I described above, the drive circuit 15 may perform as follows, when three or more image data Draw are outputted from the imaging element 12. The drive circuit 15 may apply a signal of a voltage or a frequency, which is in a range of voltages or frequencies selectable as the third drive signal, between the electrodes 112 and 114, when the second image data Draw is outputted from the imaging element 12. The voltage or the frequency of the signal to be applied is close to a voltage or a frequency selectable as the first drive signal, as compared with a voltage or a frequency outputted from the drive circuit 15 when the third or subsequent image data Draw is outputted from the imaging element 12.

2.13 Modification Example M

In the modification example I described above, the drive circuit 15 may perform as follows, when two image data Draw are outputted from the imaging element 12. The drive circuit 15 may apply a signal of a voltage or a frequency, which is in a range of voltages or frequencies selectable as the third drive signal, between the electrodes 112 and 114, when the first image data Draw is outputted from the imaging element 12. The voltage or the frequency of the signal to be applied is close to a voltage or a frequency selectable as the second drive signal, as compared with a voltage or a frequency outputted from the drive circuit 15 when the second image data Draw is outputted from the imaging element 12. Further, in the modification example I described above, the drive circuit 15 may apply a signal of a voltage or a frequency, which is in the range of voltages or frequencies selectable as the third drive signal, between the electrodes 112 and 114, when the first image data Draw is outputted from the imaging element 12. The voltage or the frequency of the signal to be applied is close to a voltage or a frequency selectable as the first drive signal, as compared with the voltage or the frequency outputted from the drive circuit 15 when the second image data Draw is outputted from the imaging element 12.

2.14 Modification Example N

FIG. 30 illustrates a modification example of the liquid-crystal low pass filter 11 illustrated in FIGS. 4 and 19. The liquid-crystal low pass filter 11 according to the present modification example may include, for example, an anti-reflection (AR) layer 116 on a light input side of the birefringent plate 111. At this time, the outer surface of the birefringent plate 111 serves as the light input surface 110A. The AR layer 116 decreases reflection at the light input surface 110A, thereby improving transmittance. The liquid-crystal low pass filter 11 according to the present modification example may include, for example, a low reflective layer 117, between the birefringent plate 111 and the electrode 112. The low reflective layer 117 reduces reflection at an interface. Providing the AR layer 116 and the low reflective layer 117 makes it possible to improve a light uptake rate of the imaging element provided in a stage after the liquid-crystal low pass filter 11. The low reflective layer 117 may be, for example, a dielectric multilayer film made of a material such as $SiO_2$ or $TiO_2$.

The liquid-crystal low pass filter 11 according to the present modification example may include, for example, an infrared (IR) cut layer, in place of the AR layer 116. The IR cut layer reflects infrared rays and allows visible light to pass therethrough. Providing the IR cut layer makes it possible to remove sensitive infrared rays in the imaging element provided in the stage after the liquid-crystal low pass filter 11.

2.15 Modification Example O

FIG. 31 illustrates a modification example of the schematic configuration of the imaging device 10. In the present modification example, the imaging device 10 further includes one more liquid-crystal low pass filter 11 and a phase cancelling plate 16. In the present modification example, the two liquid-crystal low pass filters 11 are provided in a stage before an imaging element 12. The phase cancelling plate 16 is provided between these two liquid-crystal low pass filters 11. The drive circuit 15 drives these two liquid-crystal low pass filters 11. The phase cancelling plate 16 converts the transmitted light L2 of the liquid-crystal low pass filter 11 in an upstream stage into circularly polarized light. The phase cancelling plate 16 may be, for example, a λ/4 retardation film.

The liquid-crystal low pass filter 11 in the upstream stage may be disposed, for example, to perform image separation in a vertical direction. Further, the liquid-crystal low pass filter 11 in a downstream stage may be disposed, for example, to perform image separation in a horizontal direction. These two liquid-crystal low pass filters 11 and the phase cancelling plate 16 perform the image separation in the vertical direction and the horizontal direction.

In the imaging device 10 according to the present modification example as well, the cut-off frequency fc changes in the method (the peak-value modulation method) different from the typical method (the separation-width modulation method) of changing the ps separation width of the transmitted light L2, as in the above-described embodiment. Further, it is possible to change the cut-off frequency fc of each of the liquid-crystal low pass filters 11, by changing the value of each of three or four peaks caused in the point-image intensity distribution of the transmitted light L2, in accordance with the magnitude of the voltage V3 or the intermediate frequency F3 applied between the electrodes 112 and 114. It is therefore possible to set a cut-off frequency different from the cut-off frequency initially set, only by changing the magnitude of the intermediate voltage V3 or the frequency F3 applied between the electrodes 112 and 114. Hence, each of the liquid-crystal low pass filters 11 has a configuration that makes it possible to change the cut-off frequency fc without preparing a new optical component.

In the present modification example, for example, a birefringent plate 17 may be provided in place of the phase cancelling plate 16, as illustrated in FIG. 32. The birefringent plate 17 has a birefringence property and a uniaxial crystal structure. The birefringent plate 17 may be made of, for example, crystal, calcite, or lithium niobate. The birefringent plate 17 separates an image in a direction inclined 45 degrees from the image separation direction in the birefringent plates 111 and 115. When the birefringent plate 17 is provided in place of the phase cancelling plate 16, the two liquid-crystal low pass filters 11 and the birefringent plate 17 are allowed to perform the image separation in the vertical direction and the horizontal direction.

2.16 Modification Example P

Assume that, in each of the embodiment and modification examples thereof described above, a rise response time, at which the signal applied to the electrodes 112 and 114 is changed from the first drive signal to the third drive signal, is shorter than a fall response time, at which the signal applied to the electrodes 112 and 114 is changed from the second drive signal to the third drive signal. The rise response time tends to become shorter than the fall response time when a temperature of the liquid crystal layer 113 is relatively low. At this time, the drive circuit 15 applies the second drive signal, the first drive signal, and the third drive signal to the electrodes 112 and 114 in this order, when the three or more image data Draw are sequentially outputted from the imaging element (see FIGS. 11, 13, 16, and 17). In the present modification example, the input section 50 may include a temperature element that measures the temperature of the liquid crystal layer 113, or a temperature corresponding to the temperature of the liquid crystal layer 113. In this case, the control circuit 22 may instruct the drive circuit 15 on the basis of an output of the temperature element to apply the second drive signal, the first drive signal, and the third drive signal in this order to the electrodes 112 and 114.

2.17 Modification Example Q

Assume that, in each of the embodiment and modification examples thereof described above, a fall response time, at which the signal applied to the electrodes 112 and 114 is changed from the second drive signal to the third drive signal, is shorter than a rise response time, at which the signal applied to the electrodes 112 and 114 is changed from the first drive signal to the third drive signal. The fall response time tends to become shorter than the rise response time when the temperature of the liquid crystal layer 113 is relatively high. At this time, the drive circuit 15 applies the first drive signal, the second drive signal, and the third drive signal to the electrodes 112 and 114 in this order, when the three or more image data Draw are sequentially outputted from the imaging element (see FIGS. 23, 24, 27, and 28). In the present modification example, the input section 50 may include a temperature element that measures the temperature of the liquid crystal layer 113, or a temperature corresponding to the temperature of the liquid crystal layer 113. In this case, the control circuit 22 may instruct the drive circuit 15 on the basis of an output of the temperature element to apply the first drive signal, the second drive signal, and the third drive signal in this order to the electrodes 112 and 114.

2.18 Modification Example R

In each of the embodiment and modification examples thereof described above, the drive circuit 15 may apply an overdrive signal to the electrodes 112 and 114, when shifting the signal applied to the electrodes 112 and 114 from the first drive signal to the second drive signal. At this time, the overdrive signal is a signal of a high voltage in a range of voltages adoptable as the voltage V2, or a signal of a low frequency in a range of frequencies adoptable as the frequency F1. Further, in each of the embodiment and modification examples thereof described above, the drive circuit 15 may apply an overdrive signal to the electrodes 112 and 114, when shifting the signal applied to the electrodes 112 and 114 from the second drive signal to the first drive signal. At this time, the overdrive signal is a signal of a low voltage in a range of voltages adoptable as the voltage V1, or a signal of a high frequency in a range of frequencies adoptable as the frequency F2. This makes it possible to reduce the waiting time resulting from the response speed of the liquid crystal layer 113, almost without varying the polarization conversion efficiency T between a time when the overdrive signal is applied and a time when the overdrive signal is not applied (i.e., without affecting image quality). As a result, it possible to greatly reduce the time necessary for the stepwise exposure, as compared with a case where the overdrive signal is not used.

2.19 Modification Example S

In each of the embodiment and modification examples thereof described above, the drive circuit 15 may be, for example, separated into a drive circuit 15A and a drive circuit 15B, as illustrated in FIGS. 33, 34, and 35. The drive circuit 15A drives the liquid-crystal low pass filter 11, the lens 13, and the iris 14. The drive circuit 15B generates the image data D, by driving the imaging element 12 and performing predetermined processing on the image data Draw outputted from the imaging element 12. Further, in each of the embodiment and modification examples thereof described above, the computing section 20 may be, for example, separated into a control circuit 22A that controls the drive circuit 15A, and a computing section 20' that controls the drive circuit 15B, as illustrated in FIGS. 33, 34, and 35. The control circuit 22A operates in accordance with a control signal from the computing section 20'.

The drive circuit 15A may be, for example, allowed to apply the first voltage or the voltage of the first frequency, the second voltage or the voltage of the second frequency, and the intermediate voltage or the voltage of the intermediate frequency, between the electrodes 112 and 114. The drive circuit 15A may apply, for example, the first drive signal, the second drive signal, or the third drive signal between the electrodes 112 and 114, in accordance with an instruction from the control circuit 22A. For example, the control circuit 22A may instruct the drive circuit 15A to output the first drive signal, the second drive signal, or the third drive signal to the electrodes 112 and 114.

In each of the embodiment and modification examples thereof described above, an optical unit 100 includes the one or the plurality of liquid-crystal low pass filters 11, the lens 13, the iris 14, the drive circuit 15A, and the control circuit 22A. The optical unit 100 may be, for example, detachably attachable to the imaging unit 1.

Although the technology is described above using the embodiment and modification examples thereof, the technology is not limited thereto and may be modified in a variety of ways. It is to be noted that the effects described in the description are merely examples, and effects achieved by the technology are not limited thereto. The technology may have effects other than the effects described in the description.

It is to be noted that the technology may have the following configurations.

(1)
A control unit, including:
a controller controlling a polarization state of a liquid crystal layer of a liquid-crystal low pass filter to be any of a first polarization state, a second polarization state, and an intermediate polarization state between the first polarization state and the second polarization state,
wherein, in output of a plurality of image data from an imaging element, the controller controls the polarization state of the liquid crystal layer to be the first polarization state or the second polarization state when first image data of the image data is outputted, and the controller controls the polarization state of the liquid crystal layer to be the intermediate polarization state when one or more of second and subsequent image data of the image data are outputted.

(2)
The control unit according to (1), wherein, in output of two image data of the image data from the imaging element, the controller controls the polarization state of the liquid crystal layer to be the first polarization state or the second polarization state when first image data of the two image data is outputted, and the controller controls the polarization state of the liquid crystal layer to be the intermediate polarization state when second image data of the two image data is outputted.

(3)
The control unit according to (1), wherein, in output of three or more image data of the image data from the imaging element, the controller controls the polarization state of the liquid crystal layer to be one state of the first polarization state or the second polarization state when first image data of the three or more image data is outputted, the controller controls the polarization state of the liquid crystal layer to be the other state, which is different from the polarization state when the first image data is outputted, of the first polarization state and the second polarization state when second image data of the three or more image data is outputted, and the controller controls the polarization state of the liquid crystal layer to be the intermediate polarization state when third and subsequent image data of the three or more image data are outputted.

(4)
The control unit according to any one of (1) to (3), wherein
the first polarization state indicates a state where light entering the liquid crystal layer is optically rotated 90 degrees, and
the second polarization state indicates a state where the light entering the liquid crystal layer is not optically rotated.

(5)
The control unit according to (4), wherein
a first drive signal to be applied to the liquid crystal layer by the controller to bring the liquid crystal layer into the first polarization state is a signal of a voltage or a frequency in a section where a polarization conversion efficiency curve of the liquid crystal layer is saturated near one value of a maximum value and a minimum value of polarization conversion efficiency, and
a second drive signal to be applied to the liquid crystal layer by the controller to bring the liquid crystal layer into the second polarization state is a signal of a voltage or a frequency in a section where the polarization conversion efficiency curve of the liquid crystal layer is saturated near the other value, which is different from the value for the first drive signal, of the maximum value and the minimum value of the polarization conversion efficiency.

(6)
The control unit according to any one of (1) to (5), wherein the output of the plurality of image data is continuous shooting.

(7)
The control unit according to any one of (1) to (5), wherein the output of the plurality of image data is used for bracket shooting.

(8)
The control unit according to any one of (1) to (7), wherein, when the first image data is outputted from the imaging element, the controller applies a signal to the liquid crystal layer, the signal being identical to a preparation voltage or a preparation frequency to be applied to the liquid crystal layer when operation preparation necessary for output of the image data from the imaging element is performed, before output of the first image data, on one or a plurality of optical components provided in a stage before the liquid-crystal low pass filter, or being a signal of a voltage or a frequency closest to the preparation voltage or the preparation frequency.

(9)
The control unit according to (8), wherein, in sequential output of three or more image data of the image data from the imaging element, when third image data of the three or more image data is outputted from the imaging element, the controller applies one third drive signal of a plurality of third drive signals to the liquid crystal layer, the plurality of third drive signals to be applied to the liquid crystal layer to bring the liquid crystal layer into the intermediate polarization state in output of the third and subsequent image data of the three or more image data from the imaging element, the one third drive signal being closest to a voltage or a frequency of a signal to be applied to the liquid crystal layer when second image data of the three or more image data is outputted from the imaging element.

(10)

The control unit according to (9), wherein, wherein, in sequential output of the three or more image data from the imaging element, the controller applies, to the liquid crystal layer, the plurality of third drive signals to be applied to the liquid crystal layer in output of the third and subsequent image data from the imaging element in order of closeness to the voltage or the frequency of the signal to be applied to the liquid crystal layer when the second image data is outputted from the imaging element.

(11)

The control unit according to (8), wherein
the controller performs the operation preparation on the one or the plurality of optical components before output of each of the image data, and
in sequential output of three or more image data of the image data from the imaging element, when third image data of the three or more image data is outputted from the imaging element, the controller applies one signal of a plurality of third drive signals to the liquid crystal layer, the plurality of third drive signals to be applied to the liquid crystal layer to bring the liquid crystal layer into the intermediate polarization state in output of the third and subsequent image data of the three or more image data from the imaging element, the one signal being identical to the preparation voltage or the preparation frequency or being a signal of a voltage or a frequency closest to the preparation voltage or the preparation frequency.

(12)

The control unit according to (11), wherein, in sequential output of the three or more image data from the imaging element, the controller applies, to the liquid crystal layer, the plurality of third drive signals to be applied to the liquid crystal layer in output of the third and subsequent image data from the imaging element in order of closeness to a voltage or a frequency of a signal to be applied to the liquid crystal layer when second image data of the three or more image data is outputted from the imaging element.

(13)

The control unit according to any one of (1) to (12), wherein, in sequential output of three or more image data of the image data from the imaging element, when a rise response time when the polarization state of the liquid crystal layer is changed from the first polarization state to the intermediate polarization state is shorter than a fall response time when the polarization state of the liquid crystal layer is changed from the second polarization state to the intermediate polarization state, the controller changes the polarization state of the liquid crystal layer in order of the second polarization state, the first polarization state, and the intermediate polarization state.

(14)

The control unit according to any one of (1) to (12), wherein, in sequential output of three or more image data of the image data from the imaging element, when a fall response time when the polarization state of the liquid crystal layer is changed from the second polarization state to the intermediate polarization state is shorter than a rise response time when the polarization state of the liquid crystal layer is changed from the first polarization state to the intermediate polarization state, the controller changes the polarization state of the liquid crystal layer in order of the first polarization state, the second polarization state, and the intermediate polarization state.

(15)

An imaging unit, including:
an imaging element outputting image data;
a liquid-crystal low pass filter including a liquid crystal layer and disposed in a light entering path to the imaging element; and
a controller controlling the imaging element and controlling the liquid crystal layer,
wherein the controller controls a polarization state of the liquid crystal layer to be any of a first polarization state, a second polarization state, and an intermediate polarization state between the first polarization state and the second polarization state, and
in output of a plurality of image data from an imaging element, the controller controls the polarization state of the liquid crystal layer to be the first polarization state or the second polarization state when first image data of the image data is outputted, and the controller controls the polarization state of the liquid crystal layer to be the intermediate polarization state when one or more of second and subsequent image data of the image data are outputted.

(16)

A method of controlling a liquid-crystal low pass filter, the liquid-crystal low pass filter including a liquid crystal layer and disposed in a light entering path to an imaging element, the method including:
in output of a plurality of image data from the imaging element, controlling a polarization state of the liquid crystal layer to be a first polarization state or a second polarization state when first image data of the image data is outputted, and controlling the polarization state of the liquid crystal layer to be an intermediate polarization state when one or more of second and subsequent image data of the image data are outputted.

The present application is based on and claims priority from Japanese Patent Application No. 2014-161126 filed in the Japan Patent Office on Aug. 7, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A control unit, comprising:
a controller configured to:
control a polarization state of a liquid crystal layer of a liquid-crystal low pass filter to be one of a first polarization state, a second polarization state, or an intermediate polarization state, wherein the intermediate polarization state is between the first polarization state and the second polarization state;
set the polarization state of the liquid crystal layer to one of the first polarization state or the second polarization state for output of first image data of a plurality of image data from an imaging element; and
set the polarization state of the liquid crystal layer to the intermediate polarization state for output of at least one of second image data of the plurality of image data or third image data subsequent to the second image data,
   wherein the intermediate polarization state is a state where light that enters the liquid crystal layer is optically rotated at an angle greater than 0 degrees and less than 90 degrees.

2. The control unit according to claim 1, wherein the controller is further configured to:
   set, in output of two image data of the plurality of image data, the polarization state of the liquid crystal layer to one of the first polarization state or the second polarization state for the output of the first image data of the two image data; and
   set the polarization state of the liquid crystal layer to the intermediate polarization state for the output of the second image data of the two image data.

3. The control unit according to claim 1, wherein the controller is further configured to:
   set, in output of at least three image data of the plurality of image data the polarization state of the liquid crystal layer to a first of one of the first polarization state or the second polarization state for the output of the first image data of the at least three image data;
   set the polarization state of the liquid crystal layer to a second of one of the first polarization state or the second polarization state for the output of the second image data of the at least three image data; and
   set the polarization state of the liquid crystal layer to the intermediate polarization state for output at least one of the third image data of the at least three image data or fourth image data subsequent to the third image data.

4. The control unit according to claim 1, wherein
   the first polarization state indicates a state where the light that enters the liquid crystal layer is optically rotated at 90 degrees, and
   the second polarization state indicates a state where the light that enters the liquid crystal layer is not optically rotated.

5. The control unit according to claim 4, wherein the controller is further configured to:
   apply a first drive signal to the liquid crystal layer;
   set the polarization state of the liquid crystal layer to the first polarization state based on the application of the first drive signal to the liquid crystal layer,
   wherein the first drive signal corresponds to a voltage or a frequency in a first section where a polarization conversion efficiency curve of the liquid crystal layer is saturated within a proximity of a first value of one of a maximum value of a polarization conversion efficiency or a minimum value of the polarization conversion efficiency;
   apply a second drive signal to the liquid crystal layer; and
   set the polarization state of the liquid crystal layer to the second polarization state based on the application of the second drive signal to the liquid crystal layer,
   wherein the second drive signal corresponds to the voltage or the frequency in a second section where the polarization conversion efficiency curve of the liquid crystal layer is saturated within a proximity of a second value of one of the maximum value of the polarization conversion efficiency or the minimum value of the polarization conversion efficiency.

6. The control unit according to claim 1, wherein the output of the plurality of image data is by a continuous shooting process.

7. The control unit according to claim 1, wherein the controller is further configured to execute a bracket shooting process based on the output of the plurality of image data.

8. The control unit according to claim 1, wherein the controller is further configured to:
   execute an operation preparation on at least one of a plurality of optical components, wherein the one of the plurality of optical components is at a stage before the liquid-crystal low pass filter;
   apply a first signal to the liquid crystal layer based on the execution of the operation preparation, wherein the first signal is one of:
      identical to at least one of a preparation voltage or a preparation frequency, or
      a signal of at least one of a first voltage that is within a proximity of the preparation voltage or a first frequency that is within a proximity of the preparation frequency; and
   output the first image data from the imaging element based on the application of the first signal and the operation preparation.

9. The control unit according to claim 8, wherein, in sequential output of at least three image data of the plurality of image data from the imaging element, the controller is further configured to:
   apply a second signal to the liquid crystal layer;
   output, from the imaging element, the second image data of the at least three image data based on the application of the second signal;
   apply one of a plurality of third drive signals to the liquid crystal layer;
   set the polarization state of the liquid crystal layer to the intermediate polarization state based on the application of the one of the plurality of third drive signals;
   output, from the imaging element, the third image data of the at least three image data based on the application of the one of the plurality of third drive signals;
   apply the plurality of third drive signals to the liquid crystal layer;
   set the polarization state of the liquid crystal layer to the intermediate polarization state based on the application of the plurality of third drive signals to the liquid crystal layer; and
   output fourth image data subsequent to the third image data of the at least three image data from the imaging element based on the application of the plurality of third drive signals,
   wherein the one of the plurality of third drive signals is within a proximity of at least one of a second voltage of the second signal or a second frequency of the second signal.

10. The control unit according to claim 9, wherein, in the sequential output of the at least three image data from the imaging element, the controller is further configured to:
    output, from the imaging element, at least one of the third image data or the fourth image data subsequent to the third image data, and
    wherein the plurality of third drive signals is applied to the liquid crystal layer based on proximity of each of the plurality of third drive signals to at least one of the second voltage of the second signal or the second frequency of the second signal.

11. The control unit according to claim 8, wherein the controller is further configured to:
    execute the operation preparation on the at least one of the plurality of optical components before output of each of the plurality of image data;

apply, in sequential output of at least three image data of the plurality of image data from the imaging element, a second signal to the liquid crystal layer;

output, from the imaging element, the second image data of the at least three image data based on the application of the second signal;

apply one of a plurality of third drive signals to the liquid crystal layer;

set the polarization state of the liquid crystal layer to the intermediate polarization state based on the application of the one of the plurality of third drive signals;

output the third image data of the at least three image data based on the application of the one of the plurality of third drive signals;

apply the plurality of third drive signals to the liquid crystal layer;

set the polarization state of the liquid crystal layer to the intermediate polarization state based on the application of the plurality of third drive signals; and output fourth image data subsequent to the third image data of the at least three image data based on the application of the plurality of third drive signals, wherein the one of the plurality of third drive signals is one of:
identical to at least one of the preparation voltage or the preparation frequency, or
the signal of at least one of the first voltage or the first frequency.

12. The control unit according to claim 11, wherein the controller is further configured to:
output, from the imaging element, at least one of the third image data or the fourth image data subsequent to the third image data based on the application of the plurality of third drive signals,
wherein the plurality of third drive signals are applied to the liquid crystal layer based on proximity of each of the plurality of third drive signals to at least one of a second voltage of the second signal or a second frequency of the second signal.

13. The control unit according to claim 1, wherein, in sequential output of at least three image data of the plurality of image data from the imaging element, the controller is further configured to
change the polarization state of the liquid crystal layer in order of the second polarization state, the first polarization state, and the intermediate polarization state based on a rise response time that is shorter than a fall response time,
wherein the rise response time is based on a change of the polarization state of the liquid crystal layer from the first polarization state to the intermediate polarization state, and the fall response time is based on a change of the polarization state of the liquid crystal layer from the second polarization state to the intermediate polarization state.

14. The control unit according to claim 1, wherein, in sequential output of at least three image data of the plurality of image data from the imaging element, the controller is further configured to
change the polarization state of the liquid crystal layer in order of the first polarization state, the second polarization state, and the intermediate polarization state based on a fall response time that is shorter than a rise response time,
wherein the fall response time is based on a change of the polarization state of the liquid crystal layer from the second polarization state to the intermediate polarization state, and the rise response time is based on a change of the polarization state of the liquid crystal layer from the first polarization state to the intermediate polarization state.

15. An imaging unit, comprising:
an imaging element configured to output image data;
a liquid-crystal low pass filter including a liquid crystal layer, wherein the liquid-crystal low pass filter is in a light entering path of the imaging element; and
a controller configured to:
control a polarization state of the liquid crystal layer to be one of a first polarization state, a second polarization state, or an intermediate polarization state, wherein the intermediate polarization state is between the first polarization state and the second polarization state;
set the polarization state of the liquid crystal layer to one of the first polarization state or the second polarization state for output of first image data of a plurality of image data; and
set the polarization state of the liquid crystal layer to the intermediate polarization state for output of at least of second image data of the plurality of image data or third image data subsequent to the second image data,
wherein the intermediate polarization state is a state where light that enters the liquid crystal layer is optically rotated at an angle greater than 0 degrees and less than 90 degrees.

16. A method of controlling a liquid-crystal low pass filter, the method comprising:
in output of a plurality of image data from an imaging element,
setting a polarization state of a liquid crystal layer of the liquid-crystal low pass filter to one of a first polarization state or a second polarization state for output of first image data of the plurality of image data; and
setting the polarization state of the liquid crystal layer to an intermediate polarization state for output of at least one of second image data of the plurality of image data or third image data subsequent to the second image data,
wherein the intermediate polarization state is a state where light that enters the liquid crystal layer is optically rotated at an angle greater than 0 degrees and less than 90 degrees.

* * * * *